(12) United States Patent
Li et al.

(10) Patent No.: US 10,778,928 B2
(45) Date of Patent: Sep. 15, 2020

(54) DEVICE AND METHOD FOR INPUTTING NOTE INFORMATION INTO IMAGE OF PHOTOGRAPHED OBJECT

(71) Applicant: SAMSUNG ELECTRONICS CO., LTD., Suwon-si (KR)

(72) Inventors: Guozhen Li, Beijing (CN); Li Zhang, Beijing (CN); Shan Guo, Beijing (CN); Yan Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 15/550,913

(22) PCT Filed: Feb. 11, 2016

(86) PCT No.: PCT/KR2016/001408
§ 371 (c)(1),
(2) Date: Aug. 14, 2017

(87) PCT Pub. No.: WO2016/129940
PCT Pub. Date: Aug. 18, 2016

(65) Prior Publication Data
US 2018/0027206 A1 Jan. 25, 2018

(30) Foreign Application Priority Data
Feb. 12, 2015 (CN) .......................... 2015 1 0077202

(51) Int. Cl.
*G06F 3/044* (2006.01)
*H04N 5/445* (2011.01)
(Continued)

(52) U.S. Cl.
CPC ....... *H04N 5/44504* (2013.01); *G06F 3/0304* (2013.01); *G06F 3/0425* (2013.01);
(Continued)

(58) Field of Classification Search
CPC ............ H04N 5/44504; H04N 5/23293; G06F 3/04883; G06F 3/04842; G06F 17/242;
(Continued)

(56) References Cited

U.S. PATENT DOCUMENTS 6,339,431 B1 * 1/2002 Ohmori ................. G06F 3/0481
345/585
7,551,187 B2 * 6/2009 Agrawala ........... G06F 3/04883
345/667
(Continued)

FOREIGN PATENT DOCUMENTS

| CN | 102165394 A | 8/2011 |
| CN | 102436330 A | 5/2012 |

(Continued)

OTHER PUBLICATIONS

Communication dated Jan. 26, 2018, issued by the European Patent Office in counterpart European application No. 16749480.6.
(Continued)

*Primary Examiner* — Twyler L Haskins
*Assistant Examiner* — Wesley J Chiu
(74) *Attorney, Agent, or Firm* — Sughrue Mion, PLLC

(57) ABSTRACT

Provided are an apparatus and a method of inputting note information to an image of a shot object in order to display an image of a shot object in which the note information has been reflected.

13 Claims, 81 Drawing Sheets

(51) Int. Cl.

| | |
|---|---|
| *G06F 3/0488* | (2013.01) |
| *G06F 3/0484* | (2013.01) |
| *G06F 3/03* | (2006.01) |
| *G06F 3/042* | (2006.01) |
| *G06Q 10/10* | (2012.01) |
| *G06F 40/171* | (2020.01) |
| *H04N 5/232* | (2006.01) |
| *G06T 7/73* | (2017.01) |
| *G06K 9/00* | (2006.01) |

(52) U.S. Cl.
CPC ...... *G06F 3/04842* (2013.01); *G06F 3/04883* (2013.01); *G06F 40/171* (2020.01); *G06Q 10/101* (2013.01); *H04N 5/23293* (2013.01); *G06K 9/00402* (2013.01); *G06K 2209/01* (2013.01); *G06T 7/73* (2017.01); *H04N 5/23251* (2013.01); *H04N 5/23264* (2013.01)

(58) Field of Classification Search
CPC ... G06K 2209/01; G06K 9/00402; G06T 7/73
See application file for complete search history.

(56) References Cited

U.S. PATENT DOCUMENTS

| | | | | |
|---|---|---|---|---|
| 9,424,241 | B2* | 8/2016 | Hicks | G06F 3/0482 |
| 9,430,141 | B1* | 8/2016 | Lu | G06F 17/241 |
| 2002/0010707 | A1* | 1/2002 | Chang | G06F 40/169 |
| | | | | 715/205 |
| 2002/0049787 | A1* | 4/2002 | Keely | G06F 40/171 |
| | | | | 715/205 |
| 2002/0057836 | A1* | 5/2002 | Lui | G06F 40/114 |
| | | | | 382/181 |
| 2003/0063136 | A1 | 4/2003 | J'maev | |
| 2004/0139391 | A1 | 7/2004 | Stumbo et al. | |
| 2004/0194021 | A1* | 9/2004 | Marshall | G06F 40/169 |
| | | | | 715/232 |
| 2004/0252888 | A1* | 12/2004 | Bargeron | G06F 40/171 |
| | | | | 382/188 |
| 2005/0183005 | A1* | 8/2005 | Denoue | G06F 17/241 |
| | | | | 715/202 |
| 2005/0188306 | A1* | 8/2005 | MacKenzie | G06F 16/93 |
| | | | | 715/268 |
| 2006/0017810 | A1 | 1/2006 | Kurzweil et al. | |
| 2006/0050969 | A1* | 3/2006 | Shilman | G06F 40/171 |
| | | | | 382/224 |
| 2006/0221064 | A1* | 10/2006 | Sawada | G06F 40/171 |
| | | | | 345/173 |
| 2007/0005849 | A1 | 1/2007 | Oliver | |
| 2008/0276176 | A1 | 11/2008 | Wahba et al. | |
| 2010/0079369 | A1 | 4/2010 | Hartmann et al. | |
| 2011/0039598 | A1* | 2/2011 | Tang | H04N 5/772 |
| | | | | 455/556.1 |
| 2011/0141066 | A1* | 6/2011 | Shimotani | G01C 21/3664 |
| | | | | 345/177 |
| 2011/0273474 | A1* | 11/2011 | Iwayama | G06T 11/60 |
| | | | | 345/636 |
| 2013/0259377 | A1 | 10/2013 | Goktekin | |
| 2014/0049652 | A1 | 2/2014 | Moon et al. | |
| 2014/0118801 | A1 | 5/2014 | Miller | |
| 2014/0143721 | A1* | 5/2014 | Suzuki | G06F 3/04842 |
| | | | | 715/810 |
| 2015/0067483 | A1* | 3/2015 | Demiya | G06F 40/103 |
| | | | | 715/249 |
| 2015/0067485 | A1* | 3/2015 | Kim | G06F 40/151 |
| | | | | 715/256 |
| 2015/0149883 | A1* | 5/2015 | Masuko | G06T 11/00 |
| | | | | 715/232 |
| 2015/0220490 | A1* | 8/2015 | Barber | G06F 17/212 |
| | | | | 715/234 |
| 2015/0229848 | A1* | 8/2015 | Aggarwal | H04N 5/23296 |
| | | | | 348/240.2 |
| 2015/0302246 | A1* | 10/2015 | Kapinos | G06K 9/3258 |
| | | | | 348/61 |
| 2015/0339050 | A1* | 11/2015 | Vong | H04L 65/403 |
| | | | | 345/173 |
| 2015/0363908 | A1* | 12/2015 | Cudak | G06T 3/40 |
| | | | | 345/634 |
| 2016/0140387 | A1* | 5/2016 | Sugiura | G06F 3/03545 |
| | | | | 382/189 |
| 2017/0024370 | A1 | 1/2017 | Hartmann et al. | |

FOREIGN PATENT DOCUMENTS

| | | |
|---|---|---|
| CN | 102890827 A | 1/2013 |
| CN | 104199566 A | 12/2014 |
| KR | 10-0576370 B1 | 5/2006 |
| WO | 2010039349 A2 | 4/2010 |
| WO | 2012/122706 A1 | 9/2012 |
| WO | 2013/028279 A1 | 2/2013 |

OTHER PUBLICATIONS

International Search Report and Written Opinion (PCT/ISA/210 & PCT/ISA/237), issued by International Searching Authority in International Application No. PCT/KR2016/001408, dated May 13, 2016.

Communication dated Jul. 11, 2018, issued by the State Intellectual Property Office of People's Republic of China in counterpart Application No. 201510077202.0.

Communication dated Mar. 6, 2019 issued by the State Intellectual Property Office of P.R. China in counterpart Chinese Patent Application No. 201510077202.0.

* cited by examiner

POSITION OF TIP OF WRITING UTENSIL

POSITION OF TIP OF WRITING UTENSIL

FIG. 12A

Instant Office at the ready

For the first six weeks John Slater sat alone in an office
Featured Speaker

In 1978 xxxxxxxxxxxxxxxx xxxxxxx xxxxxxx xxxxxxxxxxxxx xxxxxxxxxx xxxxxxxxxxxxxxxxx Xxxxxxxxxx xxxxxxxx
xxxxx xxxxxxxxxxxx
xxxxxxxxxx xxxxxxxx
xxxxxxx xxxxxxxxxxx
xxxxxxxxxxx xxxxxxx
xxxxxxxx xxxx xxxxx
xxxxxxxxxx xxxxxxxx
xxxxxxxxxxxxxx

FIG. 19C

An X company reported fourth-quarter earnings of 53 trillion won in sales and 6 trillion won in profits for the year of 2015

Earnings as compared with the previous quarter

Sales increased by one trillion won as compared with 52 trillion won for the previous quarter, and profits declined by one trillion won as compared with 7 trillion won for the previous quarter. ★

OOOOOOOOOOOOOOOOOOOOOO
OOOOOOOOOOOOOOOOOOOOOOOOOOOOO
OOOOOOOOOOOOOOOOOOOOOOOOOOOO
OOOOOOOOOOOO

DEVICE AND METHOD FOR INPUTTING NOTE INFORMATION INTO IMAGE OF PHOTOGRAPHED OBJECT

TECHNICAL FIELD

The present disclosure relates to multimedia techniques, and more particularly, to an apparatus and a method for inputting note information to an image of a shot object.

BACKGROUND ART

With the continuous development of technologies, mobile terminals such as smart phone, tablet computer are more and more popular. More and more functions of the mobile terminals also emerge. People can talk with each other, take pictures (or shoot videos), listen to music, play games and surf the Internet using the mobile terminal, which are very convenient.

Utilizing the camera function of the mobile terminal, people may shoot an object that he likes or requires very conveniently. For example, readers usually are not allowed to write on books in libraries or take the books home arbitrarily, and cannot tear down pages, either. Therefore, when reading books in libraries, readers may shoot pages of important contents using the camera function of the mobile terminal and save the shot pages in the mobile terminal for subsequent checking. Compared with hand-copy manner, the shooting of the important contents using the mobile terminal is more convenient and facilitates the operation of the user.

However, readers can only obtain images of the relevant pages through shooting the important contents. It is not explicit which contents in the image are those the user desires to record or mark, i.e., the requirement of the user for taking note on the contents of the book cannot be met by merely shooting the relevant page using the mobile terminal.

For another example, a user who cherishes books gets a new book. He does not want to write anything on the new book and hopes the new book to be clean, but he also wants to take notes on some exciting contents of the new book. At this time, the owner of the new book either writes on the new book against his will, or gives up the note on the exciting contents.

Even if the reader is allowed to write on the book to take notes, the reader has to open the book to check the note he has made. If the reader does not take the book with him, it is almost impossible to check the note he has made.

Therefore, there is a need to provide a solution to meet the requirement of people for taking note and facilitate user to check the note having been made.

DETAILED DESCRIPTION OF THE INVENTION

Technical Problem

The present disclosure provides an apparatus and a method of inputting note information to an image of a shot object in order to display an image of a shot object in which the note information has been reflected. Additional aspects will be set forth in part in the description which follows and, in part, will be apparent from the description, or may be learned by practice of the presented embodiments.

Technical Solution

The present disclosure provides an apparatus and a method for inputting note information to the image of the shot object, so as to meet the user's requirement for taking note on books and facilitate the user to view the note information.

According to an aspect of the present invention, there is provided an apparatus for inputting note information to an image of a shot object, the apparatus including a shooting unit configured to obtain an image of a shot object; a processor configured to detect a taking-note operation of a user on the shot object to obtain note information made on the shot object; and a display configured to display an image of the shot object in which the obtained note information has been reflected.

The processor may detect the taking-note operation of the user on the shot object or a screen on which the shot object is displayed, and determine the note information made on the shot object corresponding to the detected taking-note operation.

The processor may trace a position of a finger top or a nib of a writing utensil to detect an operation of the finger top or the nib on the shot object as the taking-note operation.

The processor may detect incremental information between image frames of the shot object as the taking-note operation.

The processor may determine a position of the note information made on the shot object, and reflect content of the note information in the image of the shot object, based on the determined position of the note information. The display may display an image of the shot object in which the note information has been reflected.

The processor may obtain a global image and a local image of the shot object, perform character recognition to each of the global image and the local image, and determine a relative position of the note information with respect to content of the global image as the position of the note information made on the shot object, based on a character recognizing result on each of the global image and the local image.

If at least one of vibration of the shot object, vibration of the apparatus for inputting the note information to the image of the shot object, and vibration of a writing utensil is detected, the processor may perform a deviation calibration processing on the note information.

The processor may adjust content of the image of the shot object, based on the note information, according to a content adjusting instruction, and the display may display an image of the shot object including the adjusted content The processor may search in content of the image of the shot object, based on designated information, according to a searching instruction, and the display may display an image of the shot object on which a search result is shown.

The apparatus for inputting note information to an image of a shot object may further include a storage configured to associatively save the note information with at least one of: the image of the shot object shot in real time, a character recognizing result of the image of the shot object shot in real time, and the relative position of the note information made on the shot object.

According to another aspect of the present invention, there is provided a method of inputting note information to an image of a shot object, the method including: obtaining an image of a shot object; detecting a taking-note operation of a user on the shot object to obtain note information made on the shot object; and reflecting the obtained note information in the image of the shot object and displaying an image of the shot object in which the obtained note information has been reflected.

The obtaining of the note information may include detecting the taking-note operation of the user on the shot object or a screen on which the shot object is displayed; and determining the note information made on the shot object corresponding to the detected taking-note operation.

The detecting of the note operation may include tracing a position of a finger top or a nib of a writing utensil to detect an operation of the finger top or the nib on the shot object as the taking-note operation.

The detecting of the taking-note operation may include detecting incremental information between image frames of the shot object as the taking-note operation.

The displaying may include determining a position of the note information made on the shot object; reflecting content of the note information in the image of the shot object, based on the determined position of the note information; and displaying an image of the shot object in which the note information has been reflected.

The determining of the position of the note information may include obtaining a global image and a local image of the shot object; performing character recognition to each of the global image and the local image; and determining a relative position of the note information with respect to content of the global image as the position of the note information made on the shot object, based on a character recognizing result on each of the global image and the local image.

If at least one of vibration of the shot object, vibration of the apparatus for inputting the note information to the image of the shot object, and vibration of a writing utensil is detected, the method may further include performing a deviation calibration processing on the note information.

The method may further include adjusting content of the image of the shot object, based on the note information, according to a content adjusting instruction. The displaying may include displaying an image of the shot object including the adjusted content.

The method may further include searching in content of the image of the shot object, based on designated information, according to a searching instruction, and the displaying may include displaying an image of the shot object on which a search result is shown.

According to another aspect of the present invention, there is provided a non-transitory computer-readable recording medium having recorded thereon a computer program, which, when executed by a computer, performs the above-described method.

In the apparatus and the method of inputting note information to an image of a shot object, provided by the present disclosure, the apparatus obtains the note information made by the user on the shot object when shooting the shot object in real time, and associates and displays the shot object and the note information. This meets a user's requirement for taking note on the shoot object, such as a book. In particular, if the book cannot be taken away or it is not allowed to write on the book, the user is still able to take note conveniently. User convenience with respect to taking note is greatly increased. In addition, the user is able to view the note having been made using the terminal device, which is very convenient for the user.

Other aspects and advantages of the present disclosure will become apparent upon review of the following detailed description of the disclosure or upon implementation of the present disclosure.

Advantageous Effects

A user's requirement for taking note on a shot object is satisfied. Even if a book cannot be taken away or it is not allowed to write on a book, the user is still able to take note conveniently, which brings great convenience to the user. In addition, the user is able to view a note made later, which is very convenient for the user.

DESCRIPTION OF THE DRAWINGS

The above and/or other aspects and merits of the present disclosure will be apparent upon review of the following detailed description of the disclosure accompanying with the following drawings, in which:

FIG. 12A is schematic diagram illustrating captured object obtained by real-time shooting according to a fourth embodiment of the present disclosure;

FIG. 19C is schematic diagram illustrating the applying of the adaptive layout to the note information after the rotation of the screen according to the sixth embodiment of the present disclosure;

BEST MODE

Figure 1:
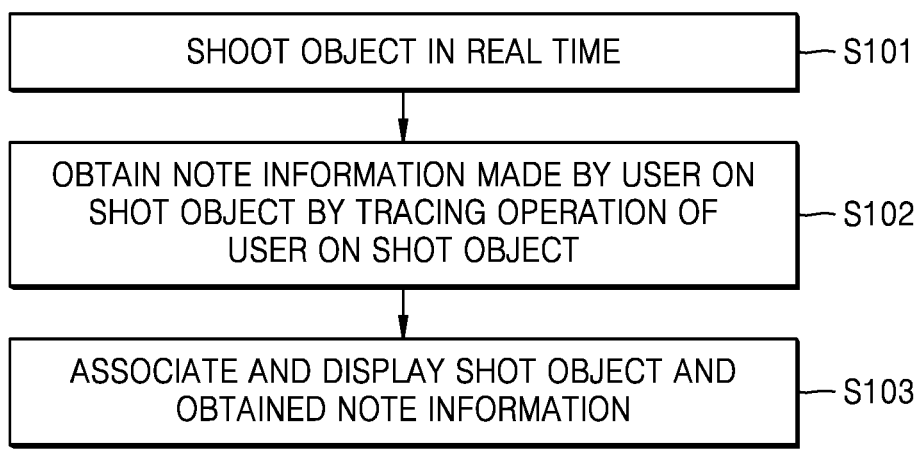
FIG. 1 is a flowchart illustrating a method for inputting note information to an image of a shot object according to a first embodiment of the present disclosure.

An apparatus for inputting note information to an image of a shot object includes a shooting unit configured to obtain an image of a shot object; a processor configured to detect a taking-note operation of a user on the shot object to obtain note information made on the shot object; and a display configured to display an image of the shot object in which the obtained note information has been reflected.

Mode of the Invention

The present disclosure will be described in further detail hereinafter with reference to accompanying drawings, in which like reference characters refer to like parts throughout. The following embodiments are merely some embodiments of the present disclosure, but do not form all embodiments of the present disclosure.

It should be understood by those with ordinary skill in the art that, without prejudice, the singular "a", "an", "the", "said" include plural referents unless the context clearly dictates otherwise. It should also be understood that, the term "include" used in the present disclosure refers to include but is not limited to a feature, integer, step, operation, element and/or component, one or more other features, integers, steps, operations, elements, components and/or combinations of them may also be included. It should be understood that, when it is mentioned that one element is "connected" or "coupled" to another element, the element may be connected or coupled to the other element directly, or via an intervening element. In addition, the "connection" or "coupling" used herein may refer to a wireless connection or a wireless coupling. The terms "and/or" include all or any one or any combination of listed associated items.

Those skilled in the art will appreciate that, unless otherwise defined, all terms (including technical and scientific terms) have the general understanding of the present invention terms) belongs to the field of ordinary skill in the same sense. It should also be understood that generic terms such as those defined in the dictionary should be understood as meaning consistent with the context of the prior art in the sense, and unless the same definitions as here, not with an idealized or overly formal sense to explanation.

Those skilled in the art will appreciate that, the "terminal" and "intelligent device" used herein not only include devices with wireless signal receiver, i.e., devices with merely a wireless signal receiver without transmission function, but also include devices including both receiving and transmitting hardware which may perform bidirectional receiving and transmitting on a bidirectional communication link. The device may include: cellular or other communication devices which may include a single line display or multi-line display or not include a multi-line display; Personal Communications Service (PCS) which may include voice, data processing, fax and/or data communication functions; Personal Digital Assistant (PDA) which may include radio frequency receiver, pager, internet/intranet visit, network browser, notebook calendar and/or Global Positioning System (GPS) receiver; conventional laptop and/or palm computer or other devices, including conventional laptop and/or palm computer or other devices equipped with radio frequency receiver. The "terminal" and "intelligent device" used herein may be portable, transportable, and can be installed in a vehicle (aviation, maritime and/or land), or may be applicable for and/or configured as operating locally, and/or operating in a distributed manner at any position of the earth and/or space. The "terminal" and "intelligent device" used herein may also refer to a communication terminal, an Internet terminal, a music/video player terminal, e.g. PDA, Mobile Internet Device (MID), and/or a mobile phone with a music/video playing function, or may be intelligent glasses, smart bracelet, smart watch, etc.

The inventor of the present disclosure finds that, people always take along with terminal devices equipped with a camera such as cell phone in daily life. Therefore, the inventor considers that a user may shoot in real-time using the camera of the terminal device to obtain note information that the user writes on a shot object such as a book. Then, the terminal device associates the shot object such as the book and the obtained note information and displays them on a screen of the terminal device. Thus, the requirement of the user to take note on the shot object such as the book is met. Especially when the book cannot be taken away or it is not allowed to write on the book, the user is still able to take note conveniently on the book. The convenience for taking note is improved greatly. Further, the user may view the note using the terminal device conveniently, which brings great convenience for the user.

Hereinafter, the technical solution of the present disclosure is described with reference to accompanying drawings.

In the present disclosure, the note information may include: mark symbol and/or edit information.

The mark symbol may include at least one of: background color, underline, dotted line, wavy line, rectangle, bullet points, brackets, triangle symbol, star, star symbol, number symbol.

The edit information may include at least one of: inserted content, insertion symbol, delete symbol, position adjustment symbol, emphasis symbol, and annotation.

It is provided in the present disclosure that, the user may take note on the shot object such as a book via any one of: operating on the shot object, operating on the screen, and inputting voice. The terminal device is able to obtain the note information made by the user on the shot object via the above operations of the user and display the note information and the shot object in association.

In addition, the user may also take note on the shot object firstly. When the user shoots the shot object in real-time, the terminal device recognizes the note made by the user and obtains the note information.

Embodiment 1

In the first embodiment of the present disclosure, the terminal device may obtain the note information through tracing in real-time the operation of the user via a writing utensil, wherein the operation of the user via the writing utensil includes an operation on the shot object and an operation on a screen. The first embodiment of the present disclosure describes the method for inputting note information to the image of the shot object through tracing the operation of the user on the shot object in real-time. As shown in FIG. 1, the method includes the following blocks S101 to S103.

At block S101, the terminal device shoots an object in real-time.

In embodiments of the present disclosure, the terminal device may include mobile terminal device with a camera such as cell phone, tablet computer, wearable device (e.g., intelligent glasses), or a fixed terminal device connected with a camera. The shot object refers to an object having character information or graphic information, such as book, newspaper, magazine, business card, webpage, etc.

The terminal device may start a video function or camera function (or referred to as real-time preview function) after receiving a real-time note trigger instruction. In the embodiments of the present disclosure, the camera function and the video function of the terminal device are referred to as shooting in general. The terminal device shoots an object on which the note is made in real-time via a shooting tool such as a camera to obtain the note information of the user.

The real-time note trigger instruction may be generated via various manners, including at least one of: voice, button, gesture, augmented reality human-computer interaction interface, and external controller (e.g. a device with a remote control function such as a stylus pen associated with the terminal device).

For example, in the case that the real-time note trigger instruction is voice, if the user emits a voice instruction "start to take note in real-time", the terminal device receives the voice instruction and starts voice recognizing to the voice instruction, so as to determine that the voice instruction is a real-time note trigger instruction. Therefore, the terminal device starts a real-time shooting operation. A corresponding relationship between the voice instruction and the real-time note trigger instruction may be stored in the terminal device in form of, e.g. a correspondence table, to associate the following voice instructions with the real-time note trigger instruction: "start to take note in real-time", "real-time note starts" and other instructions in Chinese or in English or in any other languages. Certainly, the voice instructions are not restricted to the above examples. It may also be other information configured in advance by the user, if only the user and the terminal device know that the information is the voice instruction corresponding to the real-time note trigger instruction.

Figure 2A:
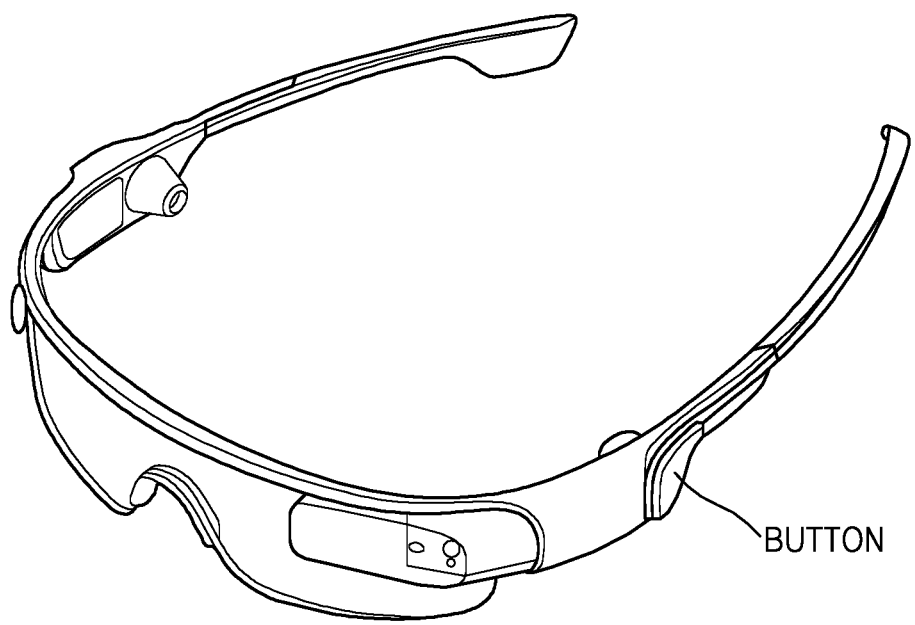
FIG. 2A is a schematic diagram illustrating an example in which a real-time note trigger instruction is a button according to the first embodiment of the present disclosure.

If the real-time note trigger instruction is triggered via a button, the button may be a hardware button on the terminal device, e.g., home button, sound adjustment button, power button, program adjustment button, newly-added button. As shown in FIG. 2A, the terminal device is the intelligent glasses. The button may also be a virtual button on a User Interface (UI) of the terminal device. If the user presses the button following a predefined manner, the terminal device determines that the real-time note trigger instruction is received. The predefined manner may include: short press, long press, short press for predefined times, alternate short and long presses, etc.

If the real-time note trigger instruction is a gesture, the gesture may be implemented by one hand or by two hands. The gesture may include: wave hand, draw a circle, draw a rectangle, draw a triangle, draw a star, etc. The terminal device may detect and recognize the gesture using an existing gesture detecting device.

Figure 2B:
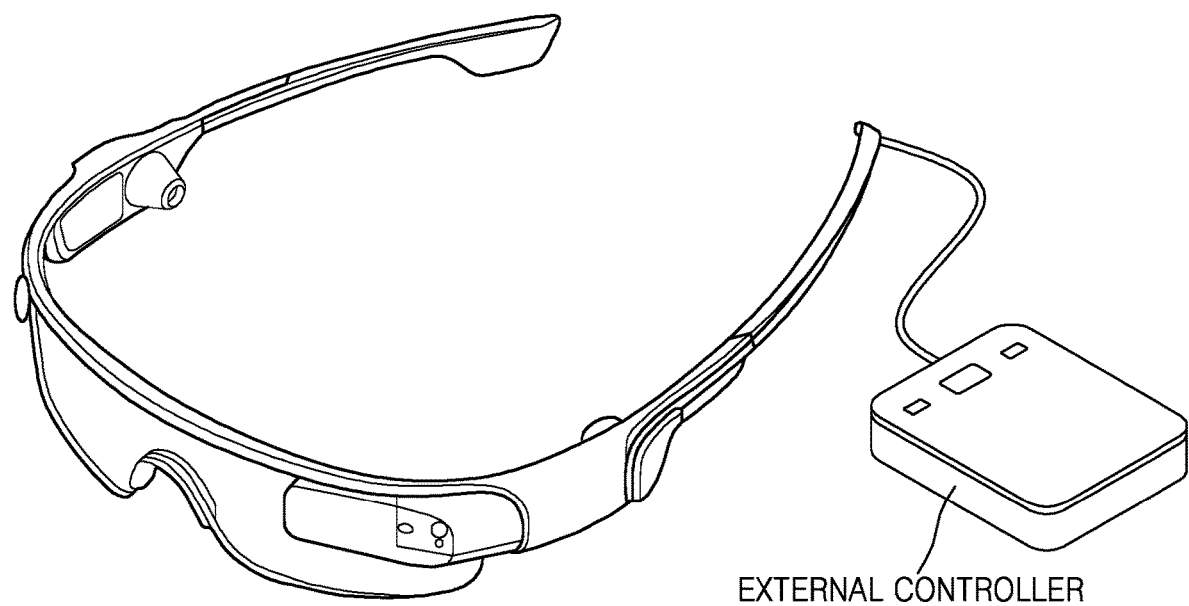
FIG. 2B is a schematic diagram illustrating an example in which the real-time note trigger instruction is from an external controller according to the first embodiment of the present disclosure.

If the real-time note trigger instruction is from the external controller, e.g., when the terminal device which shoots the object in real-time is connected with a stylus pen, if the terminal device receives from the stylus pen an instruction for shooting in real-time, the terminal device starts to shoot the object in real-time. The connection may be a physical connection (as shown in FIG. 2B, wherein the terminal device is the intelligent glasses), or a wireless connection via at least one of the following networks: Bluetooth, ultra-wideband, ZigBee, Wireless Fidelity (WiFi), macro network, etc. The instruction may be an infrared instruction, or a message transmitted by the external controller.

In the embodiments of the present disclosure, the real-time note trigger instruction may also not be used. The terminal device is always in the state of shooting the object in real-time to obtain the note information.

During the real-time shooting, since the terminal may need to analyze the image of the shot object in real-time to obtain the note information made by the user on the shot object, the terminal device may cache the shot image of the shot object.

If the terminal device starts the video function, the terminal device may cache the each image frame in the shot video of the shot object, and analyze each image frame in real-time to obtain the note information made by the user.

If the terminal device starts the real-time preview function, the camera of the terminal device is in a preview state. In the first embodiment of the present disclosure, when the camera of the terminal device is in the preview state, the terminal device may also cache the image of the shot object collected by the camera. The terminal device may cache the image of the shot object collected by the camera in real-time according to a predefined caching time interval, wherein the caching time interval may be consistent with the time interval for caching images when the camera is used for shooting, or may be configured by the user, or may be configured according to processing resources of the terminal device. For example, if there are a lot of redundant processing resources, a small time interval may be configured. If the terminal device has less redundant processing resources, a large time interval may be configured.

At block S102, the terminal device obtains the note information made by the user on the shot object through tracing the operation of the user on the shot object.

The operation of the user on the shot object may be a traceless operation or a traceable operation. The traceless operation refers to an operation that does not leave a trace like handwriting on the shot object. The traceable operation refers to an operation that leaves a trace like handwriting on the shot object.

In the first embodiment of the present disclosure, the user may perform a traceless operation on the shot object via a traceless writing utensil such as finger or stylus pen. For example, the user draws a wavy line under a line of characters in the book using his finger or a stylus pen. The drawing operation does not leave a trace like handwriting on the shot object and therefore is a traceless operation. In addition, the user may also perform a traceless operation when using a traceable writing utensil (such as a pencil or a ball pen). In particular, when the user takes note using the traceable writing utensil on the shot object, the traceable writing utensil does not touch the shot object and is in a floating state. At this time, although the user takes note on the shot object using the traceable writing utensil, no trace like handwriting is left on the shot object. Therefore, the operation is a traceless operation.

The user may perform a traceable operation on the shot object via a traceable writing utensil (such as pencil or ball pen). For example, the user draws a wavy line under a line of characters in the book using a pencil. The drawing operation leaves a trace on the book and therefore is a traceable operation. In addition, the user may also perform the traceable operation when using a traceless writing utensil (such as finger or stylus pen). In particular, if the shot object is made of a material that a trace is generated once being touched, a trace will be left on the shot object even if the user takes note using the traceless writing utensil. Therefore, the operation is a traceable operation.

The writing utensil is a utensil used for writing on a writing surface. The traceable writing utensil includes pencil, fountain pen, ball pen, etc. The traceless writing utensil includes finger, stylus pen, etc. The handwriting refers to lines with certain length, thickness and color or a set of lines generated by the writing utensil when writing on the writing surface. The lines may be straight or curved. The writing surface may be any surface on which the writing utensil can write, e.g., paper. In the embodiments of the present disclosure, the writing surface is a surface of the shot object or a surface of the screen.

In the first embodiment of the present disclosure, when shooting the shot object in real-time, the terminal device caches the images of the shot object obtained by shooting and analyzes the cached images. The terminal device may obtain the note information made by the user on the shot object through analyzing the images shot in real-time continuously.

1. If the operation of the user on the shot object is a traceless operation, the terminal device may trace a nib position of the writing utensil and detect the operation of the nib on the shot object to obtain the note information. The nib of the writing utensil refers to a tip of the writing utensil used for a marking operation, e.g. finger top, tip of the pencil, etc.

Without limitation, the terminal device may determine the nib position of the writing utensil via the following three manners. Hereinafter, the three manners are described.

Figure 3A:
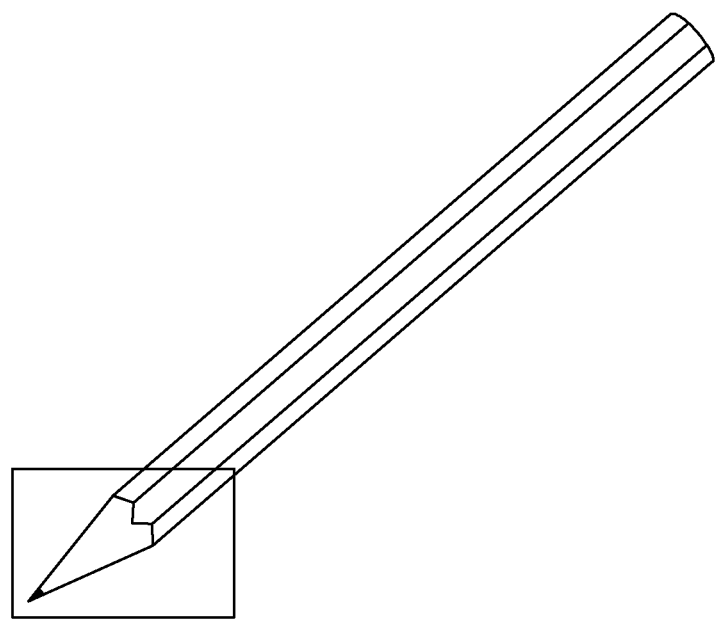
FIG. 3A is a schematic diagram illustrating shape of a pencil registered in advance according to the first embodiment of the present disclosure.
Figure 3B:
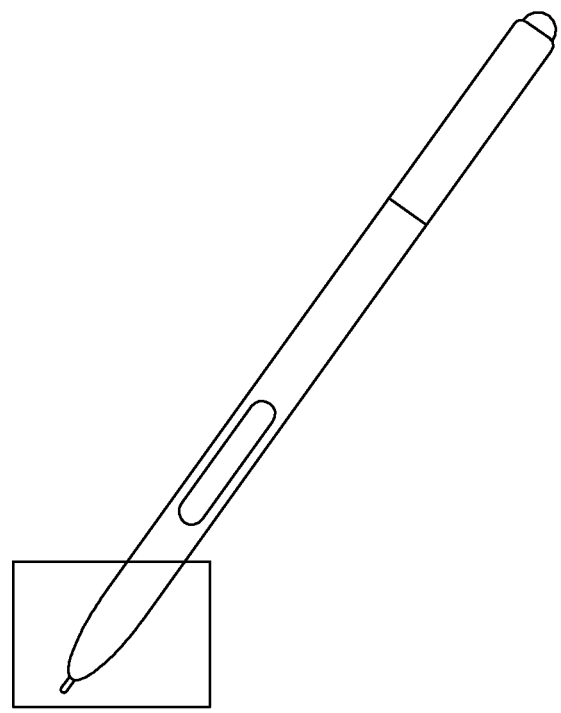
FIG. 3B is a schematic diagram illustrating shape of a stylus pen registered in advance according to the first embodiment of the present disclosure.

In a first manner for determining the nib position, the nib of the writing utensil is recognized from the image shot in real-time according to the shape of the writing utensil registered in advance, and the nib position of the writing utensil is determined according to the recognized nib of the writing utensil. As shown in FIG. 3A which shows the shape of a pencil registered in advance, the area in the rectangle is the nib of the pencil. As shown in FIG. 3B which shows the shape of a stylus pen registered in advance, the area in the rectangle is the nib of the stylus pen.

In a second manner for determining the nib position, when shooting the shot object in real-time, the terminal device may take the image of the shot object not including the writing utensil as a reference image. Thereafter, the user takes note on the shot image using the writing utensil. The terminal device may compare a current image shot in real-time and the reference image not including the writing utensil, so as to recognize the nib of the writing utensil in the current image shot in real-time, and then determines the nib position of the writing utensil according to the recognized nib of the writing utensil.

In this manner, when taking note in real-time, the user may firstly shoot the shot object on which the note is made using the terminal device. Thus, the terminal device is able to obtain the reference image not including the writing utensil. Then the user takes note on the shot object using the writing utensil. The terminal device may detect the nib position of the writing utensil from each image frame through comparing the image shot in real-time with the reference image.

The reference image does not include the image of the writing utensil. If the user takes note on the shot object using the writing utensil during the real-time shooting, the image obtained by real-time shooting contains the image of the writing utensil. At this time, the differential part of the image shot in real-time compared to the reference image contains the image of the writing utensil. The terminal device may obtain the nib of the writing utensil through recognizing the added differential part, so as to determine the nib position of the writing utensil.

In an implementation, the terminal device may recognize the nib under the assistance of a pen holding posture of a hand. For example, the added differential part of the image shot in real-time compared to the reference image contains the image of a hand gripping a pen. The terminal device recognizes a gripping direction of the hand from the above differential part, finds a nib-like object along with this direction. The nib-like object is the nib of the writing utensil. Or, a general pen holding habit of people during the writing procedure may be obtained through collecting statistics, i.e., a range of a distance between the gripping position of the pen and the nib. The terminal device recognizes the position that the fingers grip the pen from the differential part of the image shot in real-time compared to the reference image, and then obtains the nib position of the writing utensil according to the distance between the gripping position of fingers and the nib of the writing utensil determined in advance. This manner may reduce the area for detecting the nib and facilitate successful recognizing of the nib of the writing utensil.

In a third manner for determining the nib position, a wearable device such as smart bracelet or smart watch may be used to assist the positioning of the nib position. For example, it is detected that the pen holding habit of user A is: the position of the wearable device such as the smart bracelet or smart watch on the wrist of the user has a distance of 7 cm from the nib, and the angle between the wrist and the writing surface is 35 degree. During the writing procedure, the wrist moves to the right. Thus, after the position of the wearable device such as the smart bracelet or the smart watch is detected, the position of the nib on the writing surface may be determined.

Figure 4A:
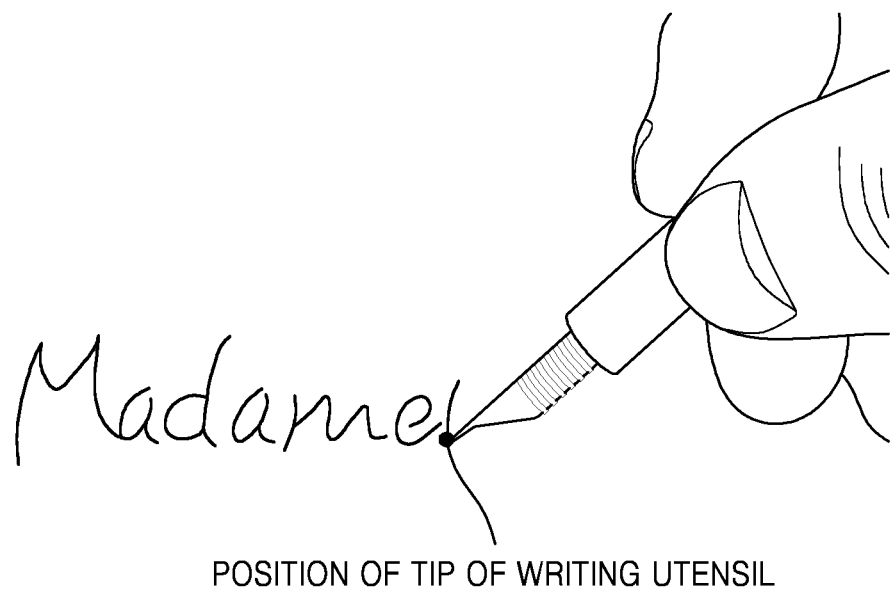
FIGS. 4A and 4B are schematic diagrams respectively showing a nib position of a writing utensil in an image of the shot object according to the first embodiment of the present disclosure.
Figure 4B:
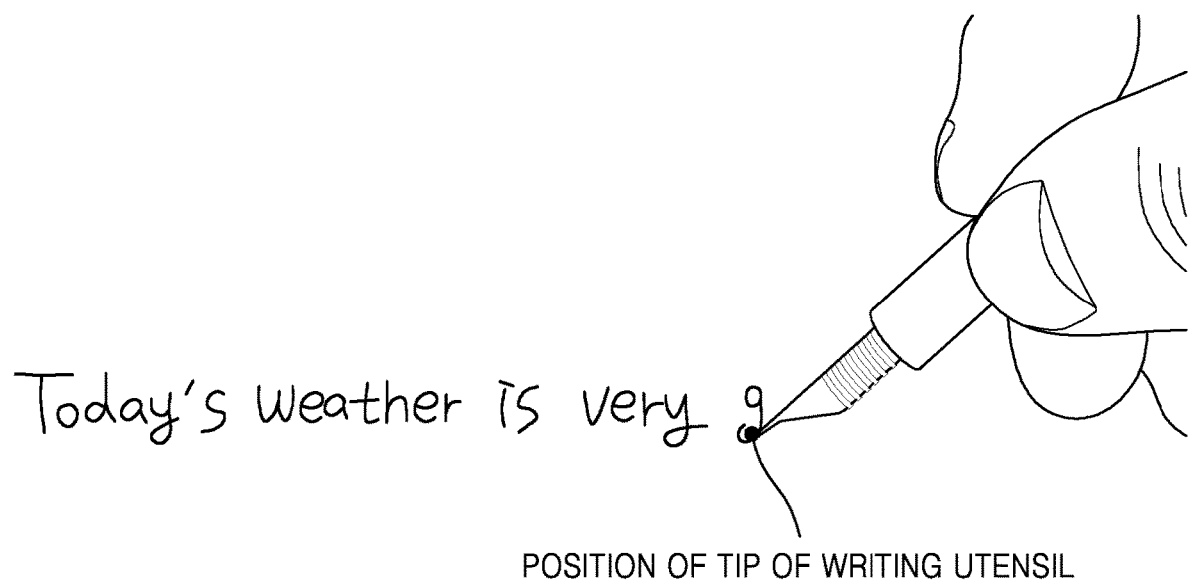

Through the above manners, the terminal device is able to determine the nib position of the writing utensil in each image frame of the shot object obtained via real-time shooting, as shown in FIGS. 4A and 4B, and detects the operation of the nib on the shot object through tracing the nib position of the writing utensil in each image frame, so as to obtain the note information made by the user on the shot object. The terminal device obtains the nib position of the writing utensil through analyzing the shot image. Since the nib position is the position of the nib of the writing utensil in the shot image of the shot object, it may be regarded as the position of the nib when being displayed on the screen of the terminal device. The position may be coordinates of pixels of the nib when being displayed on the screen of the terminal device.

In the first embodiment of the present disclosure, when the user takes note on the shot object using the writing utensil, it is possible that merely a trajectory segment or some trajectory points in the movement trajectory of the nib of the writing utensil correspond to the operation of the nib on the shot object. For example, the user draws a wavy line under the Nth line of characters of the shot object using the writing utensil and then moves the nib of the writing utensil to the under the Mth line of characters and draws a wavy line under the Mth line of characters. From the movement trajectory, it can be seen that the operation of nib under the Nth line of characters and the operation under the Mth line of characters are operations on the shot object. The operation of the movement of the nib from the Nth line to the Mth line is not an operation on the shot object. Therefore, in the movement trajectory of the nib of the writing utensil, merely the trajectory segment of drawing the wavy line under the Nth line of characters and the trajectory segment of drawing the wavy line under the Mth line of characters correspond to the operation of the nib on the shot object.

In view of the above, when detecting the operation of the nib on the shot object, the terminal device needs to recognize the trajectory segment or trajectory points corresponding to the operation of the nib on the shot object from the movement trajectory of the nib. In the first embodiment of the present disclosure, when the user performs operation on the shot object using the writing utensil, the terminal device may recognize a writing-start position and a writing-end position of the nib, and obtains the trajectory segment or trajectory points corresponding to the operation of the nib on the shot object according to the writing-start position and the writing-end position. The terminal device may take the current position of the nib as the writing-start position after detecting the start of writing of the nib and trace the position of the nib. The terminal device may analyze each image frame obtained via real-time shooting and determine the nib position in each image frame. After end of writing of the nib is detected, the current position of the nib is taken as the writing-end position. At this time, it is regarded that one operation of the nib on the shot object is finished. The terminal device may not trace the nib position any more, until writing-start is detected for the next time. The above writing-start position is a start point of the trajectory segment or trajectory points corresponding to the operation of the nib on the shot object. The above writing-end position is an end position of the trajectory segment or trajectory points corresponding to the operation of the nib on the shot object.

When tracing the nib position, the terminal device may record the current position of the nib every predefined time interval, or record the current position of the nib each time detecting that the nib moves over a predefined distance. Therefore, the terminal device is able to obtain positions of several trajectory points between the writing-start position and the writing-end position. The trajectory segment or trajectory points corresponding to the operation of the nib on the shot object may be obtained according to the writing-start position, the writing-end position and the positions of the several trajectory points. The writing-start position, writing-end position and the positions of the several trajectory points may be positions displayed on the screen, e.g., coordinates of pixels displayed on the screen.

Furthermore, in the first embodiment of the present disclosure, the terminal device may detect the start of writing and end of writing of the nib through a gesture recognizing manner. In particular, a start-writing action and an end-writing action may be defined in advance. The user performs the start-writing action defined in advance before writing using the nib. After detecting the start-writing action, the terminal device determines that the writing is started and takes the current position of the nib as the writing-start position. Then, the terminal device traces the position of the nib. After the writing ends, the user may perform the end-writing action. After detecting the end-writing action, the terminal device determines that the writing ends, and takes the position of the nib before the end-writing action as the writing-end position.

For example, the predefined start-writing action is to draw a circle in the air by the user, and the end-writing action is to draw a triangle in the air by the user. If the user desires to draw a wavy line under a particular line of characters, before starting to draw the wavy line, the user draws a circle in the air. The terminal device determines that the writing starts after detecting the user's action of drawing the circle, and takes the current position of the nib (i.e., the position of the nib after the user draws the circle in the air) as the writing-start position. The terminal device traces the position of the nib. After the user draws the wavy line, the user may draw a triangle in the air. After detecting the action of drawing the triangle, the terminal devices determines that the writing ends and takes the position of the nib before the user draws the triangle as the writing-end position. According to the above writing-start position, the writing-end position and the positions of the several trajectory points recorded by the terminal device when tracing the nib position, the position of the wavy line drawn by the nib on the shot object may be obtained.

The user may configure different start-writing and end-writing actions, or configure the same start-writing and end-writing actions. At this time, the device may determine that the writing starts when detecting the predefined action for the (2n+1)th time, and determine that the writing ends when detecting the predefined action for the (2n+2)th time, wherein n may be 0 or a positive integer.

2. If the user's operation on the shot object is a traceable operation, the terminal device may obtain the note information made by the user on the shot object via but not limited to the following two manners.

In a first obtaining manner, the nib position of the writing utensil is traced and the operation of the nib on the shot object is detected to obtain the note information. The nib of the writing utensil refers to the tip of the writing utensil used for marking operation, e.g., finger top, tip of a pencil, etc.

The manner that the terminal device obtains the note information through tracing the nib position of the writing utensil when the user performs a traceable operation on the shot object is the same as the that when the user performs a traceless operation on the shot object and is not repeated herein.

In a second obtaining manner, the terminal device may detect incremental information of the current image frame shot by a shooting tool and determine the note information made by the user on the shot object according to the incremental information. In particular, the terminal device may obtain the note information on the shot object via one of the following two manners:

(1) The current image frame is compared with a previous image frame, determine incremental information of the current image frame compared to the previous image frame, and the incremental information of each image frame is combined to obtain the note information on the shot object.

In the first embodiment of the present disclosure, the terminal device may detect the incremental information of the current image frame according to handwriting color. In one implementation, the terminal device may retrieve the incremental information of the current image frame compared to the previous image frame according to the handwriting color information of the writing utensil registered in advance.

For example, the handwriting color of the writing utensil registered in advance is red. Compared to the previous image frame, the content "good" in red is added in the current image frame. The terminal device may take the handwriting "good" in red as the note information of the user.

In a practical application, a binarized manner may be utilized to retrieve the incremental information from the current image frame. For example, pixels with the same color as the handwriting color information of the writing utensil in the current image frame are identified as 1, and other pixels are identified as 0. All of the pixels identified as 1 in the binarized image of the current image frame are retrieved and taken as the incremental information of the current image frame compared to the reference image frame, so as to obtain the note information of the user.

In this embodiment, since the incremental information is retrieved according to the handwriting color information, if only the note made by the user can be differentiated from the content of the shot object, the user may write on the shot object using a conventional writing utensil, which facilitates the terminal device to recognize the note information of the user and improves the user's experience.

Figure 5A:
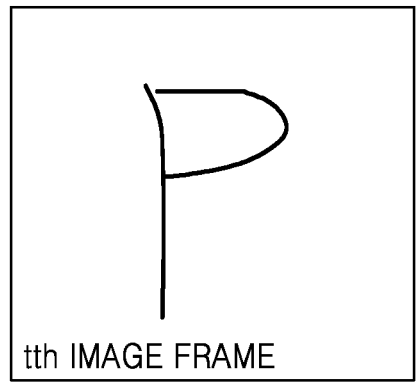
FIG. 5A is a schematic diagram illustrating note information obtained from the tth image frame according to the first embodiment of the present disclosure.
Figure 5B:
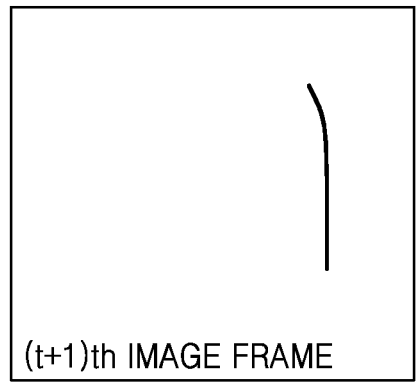
FIG. 5B is a schematic diagram illustrating incremental information of the (t+1)th image frame compared to the tth image frame according to the first embodiment of the present disclosure.
Figure 5C:
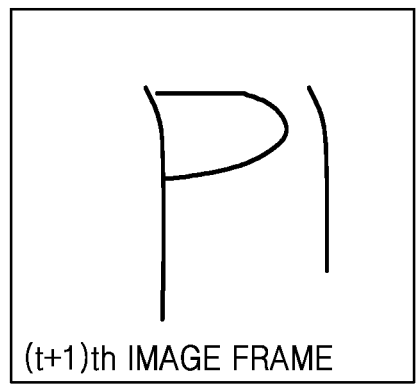
FIG. 5C is a schematic diagram illustrating note information of the (t+1)th image frame according to the first embodiment of the present disclosure.

In the first embodiment of the present disclosure, when analyzing each image frame, if the terminal device obtains the incremental information of the current image frame compared to the previous image frame, the terminal device may combine the incremental information with the note information obtained via combination when analyzing the previous image frame, so as to obtain the note information of the current image frame. In other words, with respect to each image frame, the terminal device needs to perform the operations including retrieving the incremental information and combining the note, so as to obtain the real-time note information. As shown in FIG. 5A, it shows the note information obtained by the terminal device when analyzing the tth image frame. As shown in FIG. 5B, it shows the incremental information of the (t+1)th image frame compared to the tth image frame. Through combining the incremental information with the note information as shown in FIG. 5A, the note information of the (t+1)th image frame is obtained, as shown in FIG. 5C.

In addition, the terminal device may also combine the incremental information of several image frames after obtaining the incremental information of these image frames to obtain the current note information of the user. The terminal device may combine the incremental information of each image frame in turn according to the time sequence of the incremental information of the several image frames to obtain the note information made by the user on the shot object.

The time sequence of the incremental information may be obtained by: recording a timestamp of each image frame when analyzing the image frame, and determining the time sequence relationship between the incremental information of various image frames according to the timestamp of each image frame.

Figure 5D:
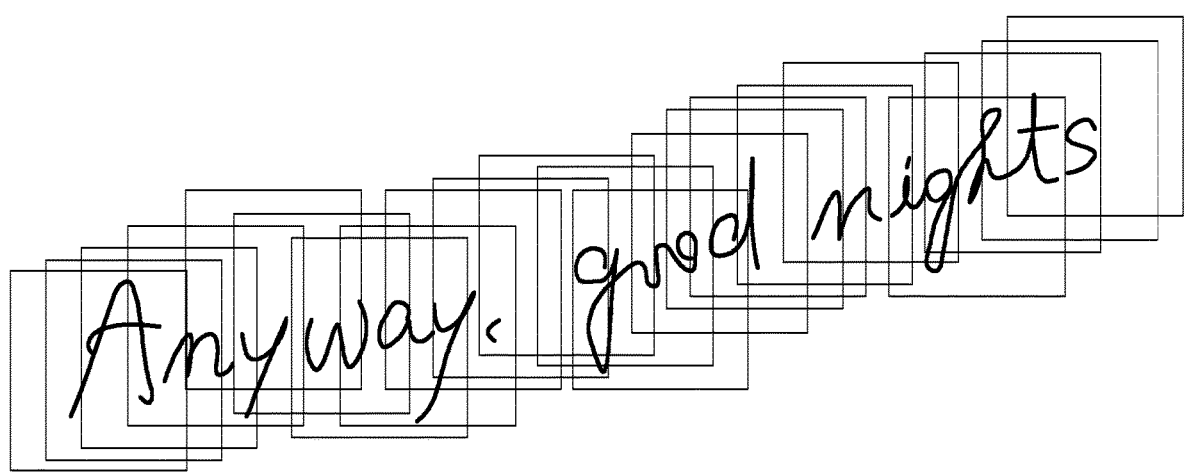
FIG. 5D is schematic diagram illustrating combination of the incremental information of each image frame to obtain the note information according to the first embodiment of the present disclosure.

As shown in FIG. 5D, each rectangle denotes an image frame. The user writes from left to right. The terminal device shoots from left to right to obtain multiple image frames in time order and records the timestamp of each image frame. For example, the timestamp of the first frame on the left is recorded as Oct. 31, 2014, 14:10:04, the timestamp of the second frame on the left is recorded as Oct. 31, 2014, 14:10:06, and so on. The timestamps of all image frames are obtained. Then, according to the sequence of the timestamps of the image frames, the incremental handwriting of the image frames are combined.

In addition, the time sequence of the incremental information may also be denoted by relative information. For example, with respect to the various image frames in FIG. 5D, the user writes from left to right. The terminal device shoots from left to right to obtain multiple image frames in time order. The terminal device may record the time sequence information of each image frame from left to right according to an ascending order or descending order of the indexes of the image frames. For example, the index of the first image frame on the left may be recorded as 1, the index of the second image frame on the left may be recorded as 2, and so on. The timestamps of all image frames are obtained. Then, according to the sequence of the image frames denoted by the indexes, the incremental handwriting of each image frame is combined.

(2) The current image frame is compared to an initial image frame, and the incremental information of the current image frame compared to the initial image frame is taken as the note information on the shot object. The initial image frame may be the first image frame of the shot object shot by the terminal device in real time.

The terminal device may detect the incremental information of the current image frame compared to the initial image frame according to the handwriting color information. The detailed detection method may be similar to that in manner (1) and is not described herein.

It can be seen from the above that, through block S102, the terminal device obtains not only what note information has been made by the user on the shot object during the shooting procedure, i.e., the content of the note information, but also obtains the position where the user has made the note information in the image of the shot object, i.e., the absolute position of the note information in the image of the shot object. For example, the shot object is a book. The user draws a wavy line under a particular line of characters on a current page. Through block S102, the terminal device is able to know that the note information made by the user on the current page is a wavy line, and the information such as line thickness and color of the wavy line. The terminal also obtains the position of each trajectory point of the wavy line drawn by the user in the current shot image.

At block S103, the terminal device associates and displays the shot object and the obtained note information.

When the terminal device shoots the shot object in real time, the user takes note on the shot object using the writing utensil. The terminal device needs to display the note information obtained in real time on the screen. At the same time, the terminal device also needs to display the image of the shot object shot in real-time on the screen. Therefore, the terminal device needs to associate and display the shot object and the note information.

Figure 6:
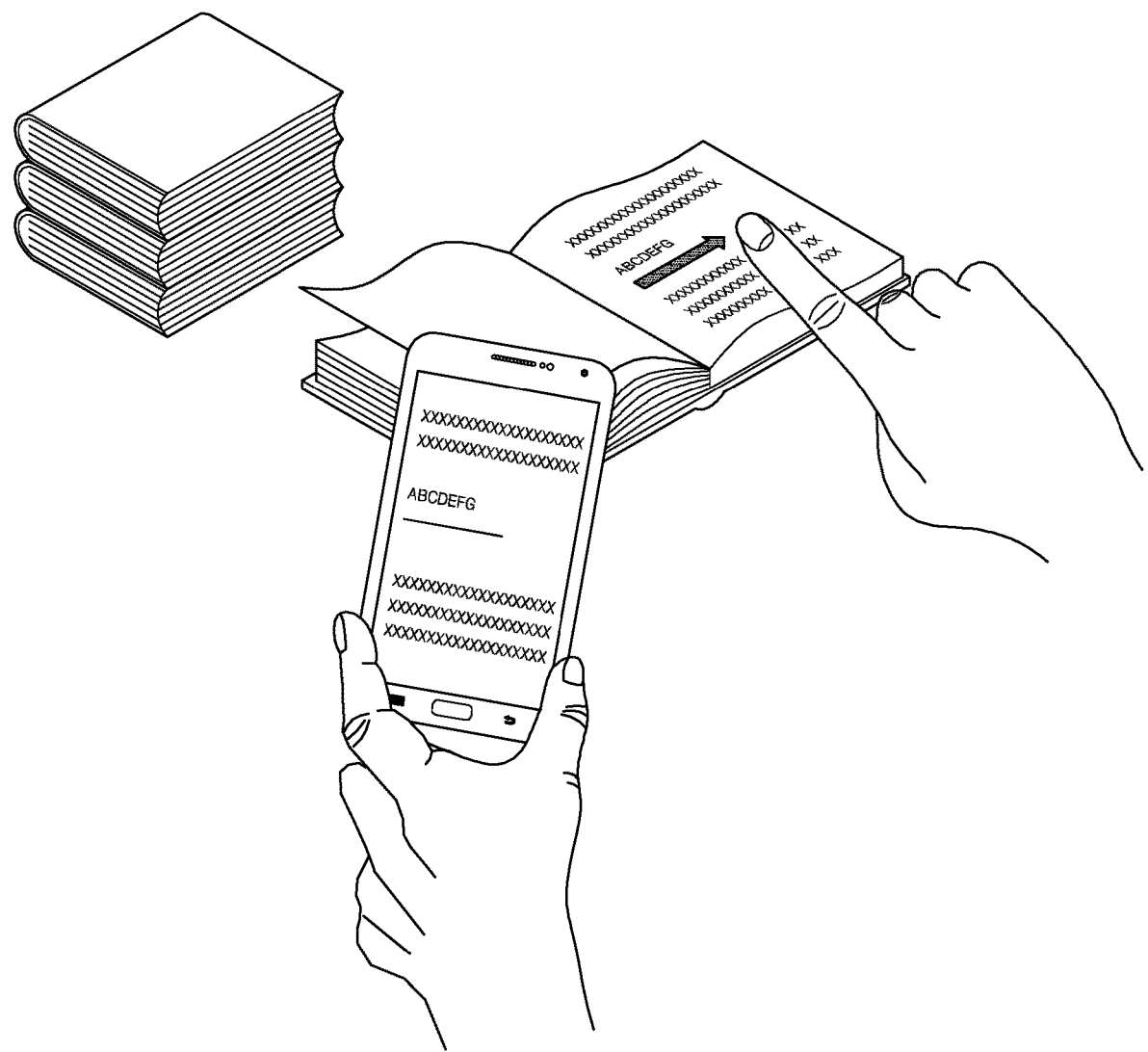
FIG. 6 is a schematic diagram illustrating an example in which the user takes note on the shot object according to the first embodiment of the present disclosure.

FIG. 6 is a schematic diagram illustrating an example in which the user directly takes note on the shot object. It can be seen that, the user may take note on the book using a writing utensil such as finger. The terminal device displays the content of the shot object and the note information on the screen in association.

Embodiment 2

Figure 7:
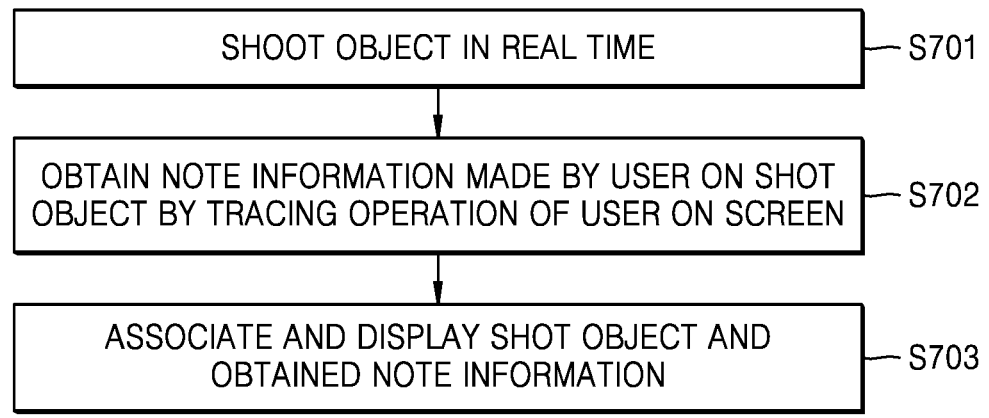
FIG. 7 is a flowchart illustrating a method for inputting note information to the image of the shot object according to a second embodiment of the present disclosure.

The second embodiment of the present disclosure describes the procedure of inputting note information to the image of the shot object through tracing in real-time operations of the user on the screen. As shown in FIG. 7, the method includes the following blocks S701 to S703.

At block S701, the terminal device shoots a shot object in real-time.

The terminal device may start a camera function of a camera tool such as a camera after receiving a real-time note trigger instruction. The triggering manner of the real-time note trigger instruction is similar to that in the first embodiment and is not repeated herein.

At block S702, the terminal device obtains the note information made by the user on the shot object through tracing the operation of the user on the screen.

The operation of the user on the screen may include an operation performed the user via a finger or a stylus pen. For example, when the terminal device shoots a book in real-time, the currently shot image is displayed on the screen in real-time. The user slides his finger or stylus pen to draw a wavy line under a particular line of characters displayed on the screen. The terminal device can obtain the slide operation of the user on the screen.

In particular, after the terminal device detects the operation of the user's finger or stylus pen on the screen, the terminal device obtains the note information made by the user on the shot object according to a movement trajectory of the finger or the stylus pen. The detection of the operation of the finger or the stylus pen on the screen by the terminal device is similar to that in the related art and is not described herein.

When the user takes note on the screen, the user may select color and line thickness of the note. The terminal device displays the note information on the screen according to the user's selection. In addition, the information such as line thickness and handwriting color of the note may also be determined according to pressure that the user uses the writing utensil. For example, if the terminal device detects via a pressure sensor that the pressure of the user's writing utensil on the screen is relatively large, the terminal device determines that the handwriting of the user is relatively thick and the color is relatively dark. If the terminal device detects via the pressure sensor that the pressure of the user's writing utensil on the screen is relatively small, the terminal device determines that the handwriting is relatively fine and the color is relatively light.

It can be seen from the above that, through detecting the operation of the user on the screen, the terminal device is able to obtain not only the note information made by the user on the screen via the writing utensil, i.e., the content of the note information, but also the absolute position of the note information in the image of the shot object shot in real-time, i.e., the position of the note information when being displayed on the screen. The position may be pixel coordinates of each corresponding trajectory point when the note information is displayed on the screen of the terminal device.

For example, when the user shoots a book in real-time using the terminal device, the content of the current page shot in real-time is displayed on the screen. The user may draw a wavy line under a particular line of characters displayed on the screen using his finger. The terminal device detects the movement trajectory of the finger on the screen in real-time. The terminal device is able to know that the note information made by the user on the current page is the wavy line, and also know the information such as color and line thickness of the wavy line. The terminal device is also able to know the position of each trajectory point in the wavy line drawn by the user in the current shot image.

At block S703, the terminal device associates and displays the shot object and the obtained note information.

When the terminal device shoots in real-time, the user takes note on the screen using the writing utensil. The terminal device needs to display the note information obtained in real-time on the screen. At the same time, the terminal device also needs to display the image of the shot object shot in real-time on the screen. Therefore, the terminal device needs to associate and display the shot object and the note information.

Figure 8:
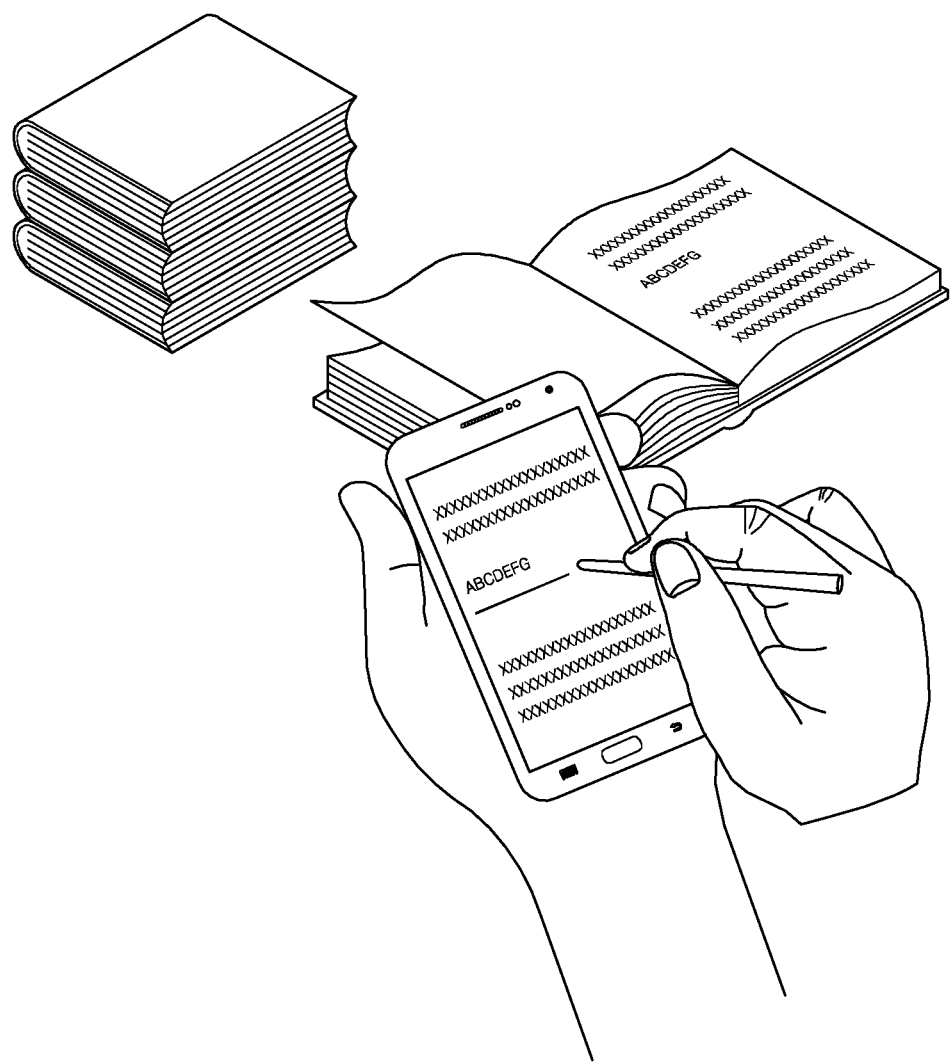
FIG. 8 is a schematic diagram illustrating an example in which the user takes note on a screen according to the second embodiment of the present disclosure.

FIG. 8 is a schematic diagram illustrating an example in which the user takes note on the screen of the terminal device. When the terminal device shoots the shot object in real-time, the user takes note on the screen using a writing utensil such as finger. The terminal device displays the content of the shot object and the note information on the screen in association.

Embodiment 3

Figure 9:
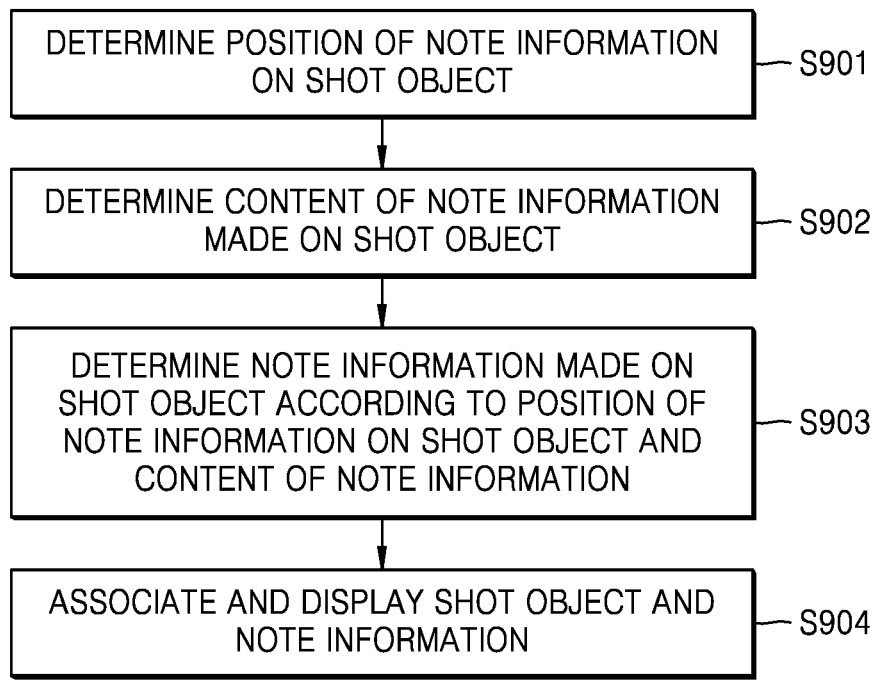
FIG. 9 is a flowchart illustrating a method for inputting note information to the image of the shot object according to a third embodiment of the present disclosure.

In the third embodiment of the present disclosure, when obtaining the note information, the terminal device may respectively determine the position of the note information on the shot object and the content of the note information and then obtain the note information on the shot object according to the position of the note information on the shot object and the content of the note information. As shown in FIG. 9, the method includes the following blocks S901 to S904.

At block S901, the terminal device determines the position of the note information on the shot object.

The terminal device may determine the position of the note information on the shot object via any one of the following two manners.

In a first manner for determining the position, the user performs a note position selection operation on the shot object or the screen of the terminal device via a writing utensil, so as to select a position for taking note. The position may be a position point or a local area.

In this embodiment, the operation performed by the user via the writing utensil on the shot object may be a traceable operation or a traceless operation.

The terminal device may select the local area via at least one of the following.

In a first implementation, the user may select the local area through dragging a cursor. For example, the user may perform a long press operation on the screen. After detecting the long press operation, the terminal device determines the start and end coordinates of the cursor of the long press operation, and determines the content between the start and end coordinates of the cursor as the content selected by the user. This local area selection manner is similar to text selection manner in the related art. Both of them realize selection via dragging the cursor.

In a second implementation, the position point or local area may be selected via a clicking operation of the user. For example, the user may perform a single click operation in the content displayed on the screen (i.e., click the screen for one time). After receiving the single click event, the terminal device determines the clicking point of the single click event on a coordinate plane, and the point on the coordinate plane is the selected position point. Or, the user may perform a double click operation in the content displayed on the screen (i.e., click the screen for two times). After receiving the double click event, the terminal device determines the character that the click coordinates of the double click event belong to, and the sentence that the character belongs to is selected as the content of the selected local area. Or, the user may perform a triple click operation in the content displayed on the screen (i.e., click the screen for three times). After receiving the triple click event, the terminal device determines the character that the click coordinates of the triple click event belong to, and the paragraph that the character belongs to is taken as the content of the selected local area.

In a third implementation, the user may select the local area through dragging edges of an area selection frame. The area selection frame may be a rectangle, a polygon, a circle or in other shapes.

In a fourth implementation, the local area may be selected via the user's slide operation. For example, the user draws a circle on the screen via the writing utensil. The terminal device detects the slide operation and then determines the area surrounded by the slide operation as the local area selected by the user.

In the third embodiment of the present disclosure, the terminal device may directly take the local area selected by the user via the above manners as the local area where the note is to be made.

In addition, the terminal device may also perform character recognizing to the image of the shot object shot in real-time to obtain layout information, adjust the selected local area, and determine the adjusted area as the local area in which the note is to be made.

The layout information obtained via the character recognition to the image includes coordinates of paragraphs and lines of text area, sequence of paragraphs and lines, coordinates of each character, coordinates and text surrounding mode of a graph area, and background, page margin, paragraph spacing, line spacing, character spacing, alignment manner, etc. The character recognizing to the image is described in detail hereinafter with reference to the fourth embodiment of the present disclosure.

In particular, after detecting the local area selected by the user, the terminal device determines according to the above layout information whether the selected local area includes a complete sentence or paragraph. If not, the terminal device adjusts the selected local area, such that the adjusted local area includes a complete sentence or paragraph.

Figure 10A:
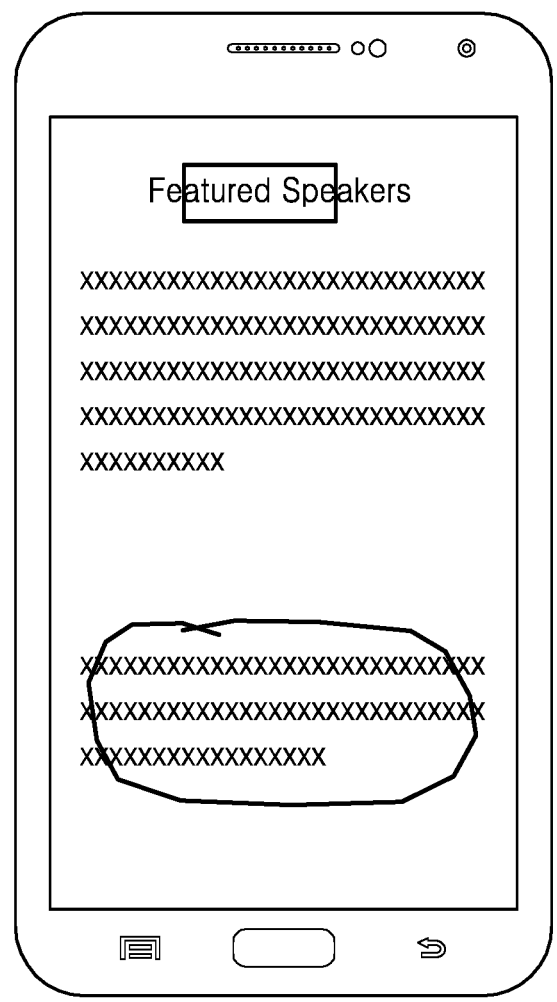
FIG. 10A is schematic diagram showing local areas selected by the user according to the third embodiment of the present disclosure.
Figure 10B:
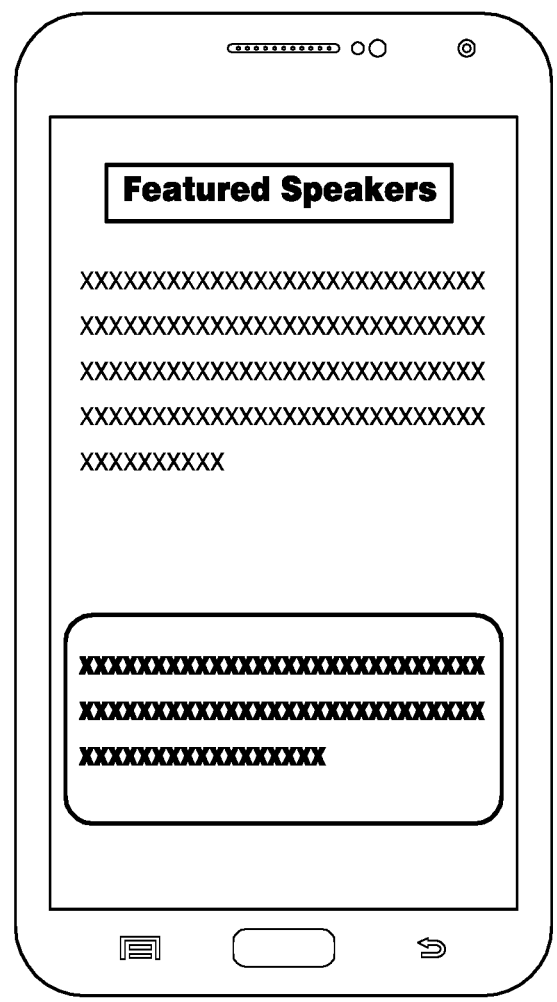
FIG. 10B is schematic diagram showing an example in which the local area is adjusted according to layout information according to the third embodiment of the present disclosure.

FIG. 10A shows local areas selected by the user. FIG. 10B shows adjusted local areas after the terminal device adjusts the local areas as shown in FIG. 10A according to the layout information.

In the third embodiment of the present disclosure, the local area selected by the user may be in any shape, e.g. rectangle, polygon, freely drawn irregular closed area, etc. The adjusted local area after the adjustment by the terminal device may be a rectangle, a polygon, etc.

After determining the local area in which the note is to be made, the terminal device highlights the information in the local area via adding background color or adding a frame. If the user finds that some content he desires to select has not been selected or some content he does not want to select has been selected, the user may adjust the local area through dragging the position of the frame of the designated area.

In a second manner for determining the position, the position of the note information on the shot object is determined according to information outputted after performing voice recognition to inputted voice. The information outputted after performing voice recognition to the voice may be text information or information after performing semantic analysis to the text information.

When shooting the shot object in real time using the terminal device, the user may input some voice related to the note information. In the third embodiment of the present disclosure, the device for shooting the shot object in real time and the device for collecting audio data may be the same or different devices.

If the terminal device contains a device capable of collecting audio data such as a microphone, the terminal device may collect audio data in real time when shooting the shot object in real time and retrieve the voice inputted by the user from the audio data. For example, user A shoots the shot object on which note is to be made in real time using a smart phone and collects audio data in real time using the smart phone.

When the terminal device shoots the shot object in real time using a video function, the terminal device needs to collect the image of the shot object and also the audio data in real time via a device such as microphone. When the terminal device shoots the shot object in real time using a camera function, the camera is in a real-time preview state. At this time, the user needs to instruct the terminal device to start to collect audio data. In the third embodiment of the present disclosure, the user may trigger the terminal device to start to collect the audio data via an audio data collection trigger instruction.

The terminal device may also be connected with another device. When the terminal device shoots the shot object in real time, the connected other device collects the audio data in real time and transmits the collected audio data to the terminal device. The terminal device retrieves the voice inputted by the user from the audio data. Or, the connected other device retrieves the voice inputted by the user from the collected audio data and transmits the retrieved voice to the terminal device in real time. For example, user A has both intelligent glasses and smart phone. He may shoot the shot object using the intelligent glasses in real time and collect the audio data using the smart phone. At the same time, the smart phone transmits the collected audio data to the intelligent glasses in real time.

In the third embodiment of the present disclosure, if the device for real-time shooting and the device for collecting audio data are different devices, the user may trigger the device for collecting audio data to start the collection of the audio data via an audio collection trigger instruction.

Hereinafter the manner for triggering the collection of the audio data by the audio collection trigger instruction is described.

The audio collection trigger instruction may be generated via various manners. The manners include at least one of: voice, button, gesture, augmented reality human-computer interaction interface, and external controller (e.g. a device with a remote control function such as a cell phone associated with intelligent glasses).

For example, if the user emits a voice instruction "start sound recording". After receiving the voice instruction, the terminal device recognizes the voice instruction, so as to determine that the voice instruction is the audio collection trigger instruction, and starts to collect audio data. The terminal device may store a corresponding relationship between the voice instruction and the audio collection trigger instruction. For example, the following voice instructions may be associated with the audio collection trigger instruction via a correspondence table, "start sound recording", "sound recording starts", "record voice" and other Chinese or English instructions or instructions in other languages. Certainly, the voice instruction is not restricted to the above examples. It may be other information configured by the user in advance, if only the user and the terminal device know that the information is the voice instruction corresponding to the audio collection trigger instruction.

For another example, if the audio collection trigger instruction is triggered via a button, the button may be a hardware button on the device, e.g., home button, sound adjustment button, power button, program adjustment button, newly-added button, or a virtual button on the UI of the device. The virtual button may be a microphone icon or a voice note icon, etc. If the user clicks the button following a predefined manner, the device determines that the audio collection trigger instruction is received. The predefined manner may include: short press, long press, short press for predefined times, alternate short and long presses, etc.

For still another example, if the audio collection trigger instruction is inputted by gesture, the gesture may be implemented by one hand or by two hands. The gesture may include: wave hand, draw a circle, draw a rectangle, draw a triangle, etc. The device for collecting the audio data may detect and recognize the gesture using an existing gesture detecting device.

If the device used for real-time shooting and the device for collecting the audio data are different devices, the device used for real-time shooting may instruct the device used for collecting audio data to start the collection of the audio data in real time after receiving the audio collection trigger instruction. The connection between the device used for real-time shooting and the device used for collecting audio data may be a physical connection, or a wireless connection via at least one of the following networks: Bluetooth, ultra-wideband, ZigBee, Wi-Fi, macro network, etc.

In addition, the audio collection trigger instruction may also not be used. The device for collecting the audio data is always in the state of collecting the audio data.

In the third embodiment of the present disclosure, the user may indicate the position of the note information in the inputted voice, i.e., on which position of the shot object that the note is to be made. The terminal device performs voice recognizing to the inputted voice after obtaining the voice inputted by the user, performs a semantic analysis to the recognized information, and determines the position of the note information on the shot object indicated by the user via the voice according to the semantic analysis result.

For example, the user inputs a voice segment to the terminal device: "underline the sentence 'current smart phone usually adopts touch screen techniques'". The terminal device firstly performs voice recognition to the voice segment, performs a semantic analysis to the recognized text information, determines according to the text information that the note information is the underline in the mark symbols, and determines the position of the underline on the shot object.

For another example, the user inputs a voice segment to the terminal device: "delete the sentence 'we shall go home'". The terminal device firstly performs the voice recognition to the voice segment, performs semantic analysis to the recognized text information, determines that the note information is a deletion symbol in the edit information, and determines the position of the deletion symbol on the shot object.

At block S902, the terminal device determines the content of the note information made on the shot object.

The content of the note information may include: note type of the note information and may further include line thickness and handwriting color of the note information. If the note includes non-handwritten characters (such as printed characters in a typeface supported by the system), the content of the note information may further include information such as typeface, font size and corresponding code of the characters.

The terminal device may firstly determine the note type of the note information made on the shot object and then determine the content of the note information made on the shot object according to the determined note type.

The user may notify the terminal device of the note type of the note information according to but not limited to at least one of the following manners: user inputted voice, button, gesture, augmented reality human-computer interaction interface, and external controller (e.g. a device with a remote control function such as a stylus pen associated with the terminal device).

If the terminal device is notified of the note type via voice, the terminal device receives the voice inputted by the user, wherein the receiving of the voice inputted by the user by the terminal device is similar to that described in block S901 and is not repeated herein. The terminal device performs the voice recognition to the received voice and then performs the semantic analysis, and determines the type of the note information according to the result of the semantic analysis.

For example, when the terminal device shoots a book in real time, the user inputs voice with content "underline line Y in paragraph X". Through semantic analysis, it is known that "line Y in paragraph X" in the voice segment is used for indicating the position of the note information, and it is also recognized that the note type of the note information is underline.

If the terminal device is notified of the note type via a button, the button may be a hardware button on the device, e.g., home button, sound adjustment button, power button, program adjustment button, newly-added button, or a virtual button on the UI of the terminal device. The terminal device collects statistics in advance about the type frequently used by the user. Then after determining the position of the note information, the terminal device provides a virtual button of the note type frequently used by the user. The user may click the virtual button to notify the terminal device of the corresponding note type. For example, after the user selects the note position, the terminal device may provide a virtual button for adding characters on the UI. If the user clicks the virtual button, the terminal device may determine that the note type is annotation. For another example, after the user selects the note position, the terminal device may provide a virtual button for adding voice note on the UI. If the user clicks the virtual button, the terminal device may determine that the note type is voice note.

If the terminal device is notified of the note type via a gesture, the gesture may be implemented by one hand or by two hands. The gesture may include: wave hand, draw a circle, draw a rectangle, draw a triangle, etc. The terminal device may detect and recognize the gesture using an existing gesture detecting device.

If the terminal device is notified of the note type via an external controller, the external controller may be but is not limited to a writing utensil, such as a stylus pen.

In an implementation, statistics may be collected with respect to the note type frequently used by the user. Then, a button corresponding to the frequently used note type is configured on the writing utensil, or an existing button on the writing utensil may be configured to correspond to the frequently used note type. Thus, the user may inform the terminal device of the note type through pressing the button corresponding to the note type on the writing utensil. When the user presses a button on the writing utensil, the writing utensil transmits an identifier corresponding to the button to the terminal device. The terminal device stores a correspondence table between the identifier of each button of the writing utensil and the note type in advance. After receiving the identifier of the button transmitted by the writing utensil, the terminal device may determine the note type of the note information that the user desires to make through searching the correspondence table.

For example, according to statistics, the note types frequently used by the user are wavy line and underline. The stylus pen is configured with two buttons. The two buttons may be configured to respectively correspond to the two note types. When the user desires to draw the wavy line under a particular paragraph of characters of the shot object, the user may select the local area where the paragraph of characters is located with a circle using the stylus pen, and then presses the button corresponding to the note type of wavy line on the stylus pen. The stylus pen notifies the terminal device of the identifier of the button. The terminal device is able to determine that the note type of the note information that the user desires to make is wavy line, and is also able to know under which characters the wavy line is to be drawn according to the local area circled by the writing utensil.

If the note made by the user is non-character note, e.g., underline, wavy line, and dotted line, etc., the terminal device may configure information such as line thickness and color for the note in advance. After the note type is obtained according to the above manner, the terminal device may draw the corresponding identifier according to the line thickness and color configured in advance. In addition, if the note made by the user is a triangle, a star, or a star symbol, the terminal may also take a corresponding picture as the content of the note. For example, the note type selected by the user is star symbol. The terminal device may find the picture corresponding to the star symbol in stored pictures, and takes the found picture as the content of the note.

If the note made by the user is of a character type such as an annotation, the terminal device may further obtain the content the user wants to add after determining the note type.

In a first implementation, the terminal may take the voice inputted by the user as the content that the user wants to add, i.e., take the voice inputted by the user as the voice note.

For example, when the terminal device shoots a book in real time, the user inputs annotation voice with respect to a paragraph on the current page via the microphone, the content is "the description of this section is very rigorous". At this time, the terminal device may directly take the inputted voice as the content of the annotation made by the user.

After the user selects the note position, the terminal device may provide a virtual button for adding voice note on the UI. If the user clicks the virtual button, the terminal device determines that the note type is annotation. At this time, the terminal device may start an audio data collecting device such as a microphone to collect the voice inputted by the user in real time. After the user confirms that the voice note is finished, the terminal device may turn off the audio data collecting device such as the microphone, so as to finish the adding of the voice note.

In a second implementation, the terminal device retrieves the note content of the note information on the shot object from the information outputted after performing voice recognition to the inputted voice.

If the whole content of the voice inputted by the user is the content of the note information of the user, the terminal device may directly take the text information obtained via voice recognition as the note content of the note information on the shot object. For example, the text information obtained via performing the voice recognition to the voice inputted by the user is "the description of this section is very rigorous", the above text information obtained via voice recognition may be taken as the annotation made by the user.

In addition, it is possible that merely a part of the content of the voice inputted by the user is the note content of the note information made by the user, and other content may be used for indicating the position of the note information. At this time, the terminal may firstly perform voice recognition to the inputted voice and then perform a semantic analysis, and obtains the note content of the note information according to the semantic analysis result. The terminal device may intercept a voice segment corresponding to the note information from the inputted voice and take the voice segment as the note content of the note information of the user, or retrieve the text information corresponding to the note information from the text information obtained via voice recognition and take the retrieved text information as the note content of the note information made by the user.

For example, when the terminal device shoots a book in real time, the user inputs voice via microphone "add an annotation beside line Y of paragraph X, the content of the annotation is: very rigorous". After semantic analysis, it is obtained that "line Y of paragraph X" in the voice is used for indicating the position of the note information. The terminal device may intercept the voice segment "vary rigorous" from the voice as the note content of the note information, or take the text information "very rigorous" as the note content of the note information.

In a third implementation, the user may input handwritten characters through writing on the shot object or the screen using a writing utensil. At this time, the terminal device takes the handwritten characters as the content of the note information. For example, after the user selects the note position, the terminal device may provide a virtual button for adding characters on the UI. If the user clicks the virtual button, the terminal device may determine that the note type is annotation. The user may add handwritten characters on the shot object or on the screen via handwriting operation using a writing utensil.

In a fourth implementation, the user may input non-handwritten characters via an inputting method in the system (e.g., printed characters in a typeface supported by the system). For example, after the user selects the note position, the terminal device may provide a virtual button for adding characters on the UI. If the user clicks the virtual button, the terminal device may determine that the note type is annotation. The user may add printed characters using the inputting method of the system. After the user confirms that the adding of the characters is finished, the terminal device may display the added characters in the image of the shot object.

At block S903, the note information made on the shot object is determined according to the position of the note information on the shot object and the content of the note information.

According to the position of the note information on the shot object and the content of the note information, the terminal device is able to know where and what note information has been made by the user on the shot object. For example, the terminal device determines that the position of the note information on the shot object is line Y of paragraph X, and the note type of the note information is underline. The information such as line thickness and color of the note are configured in advance. Therefore, the terminal device is able to determine that the user desires to underline line Y of paragraph X.

At block S904, the shot object and the note information are associated and displayed.

When the terminal device shoots in real time, the user takes note on the shot object using the writing utensil. The terminal device needs to display the note information obtained in real time on the screen. At the same time, the terminal device also needs to display the image of the shot object shot in real time on the screen. Therefore, the terminal device needs to associate and display the shot object and the note information.

For facilitating the user to listen to the voice note (the note with content in voice) during the real-time shooting procedure or during subsequent viewing of the note information, the terminal device may display a voice note playing identifier beside the content related to the voice note. After triggering the identifier via a particular manner, the user may listen to the voice note. For example, the content of the voice note is "the description of this section is very rigorous". The position of the voice note on the shot object is line Y of paragraph X. That is to say, the content on line Y of paragraph X is the content related to the voice note. Therefore, the terminal device displays the voice note playing identifier beside the content of line Y of paragraph X. After triggering the identifier via a particular manner, the user may listen to the voice note.

The identifier may be but is not limited to: icon, characters, animation, color, typeface, etc. The triggering manner includes but is not limited to: a click of the user, slide, air gesture, eyeball gazing, etc. The use may trigger a plurality of voice note playing identifiers at one time. For example, the user's finger slides over a plurality of voice note playing identifiers. At this time, system plays the voice notes according to the time sequence that the identifiers are triggered. If the user triggers a plurality of identifiers at the same time, e.g., the user draws a circle using a gesture to select a plurality of identifiers in the document, the voice notes are played according to the positions of the contents related to the voice notes, or according to the positions of the identifiers in the content.

Figure 11A:
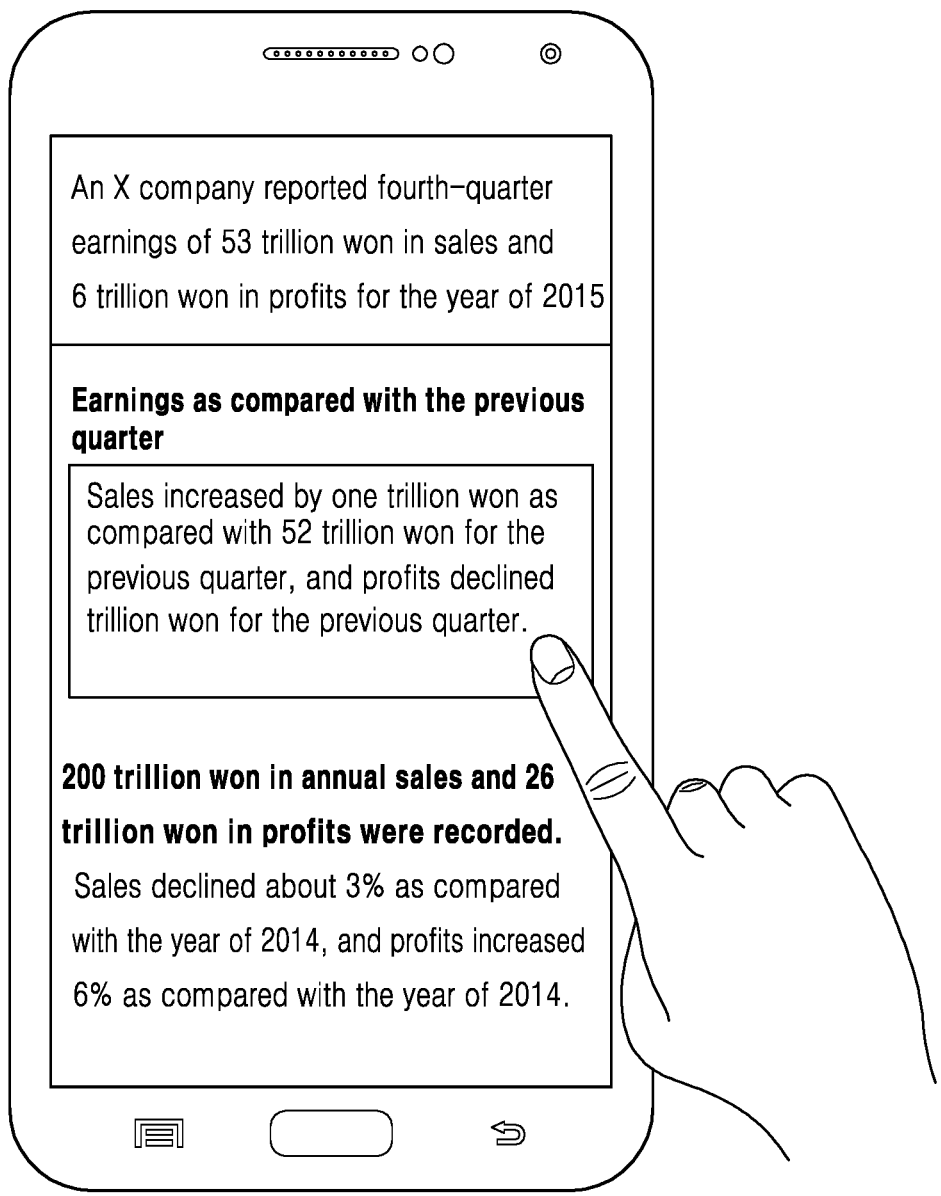
FIG. 11A is schematic diagram illustrating selection of the local areas for taking note by the user on the screen according to the third embodiment of the present disclosure.

FIG. 11A is schematic diagram illustrating an example in which the user selects the local area for taking note.

Figure 11B:
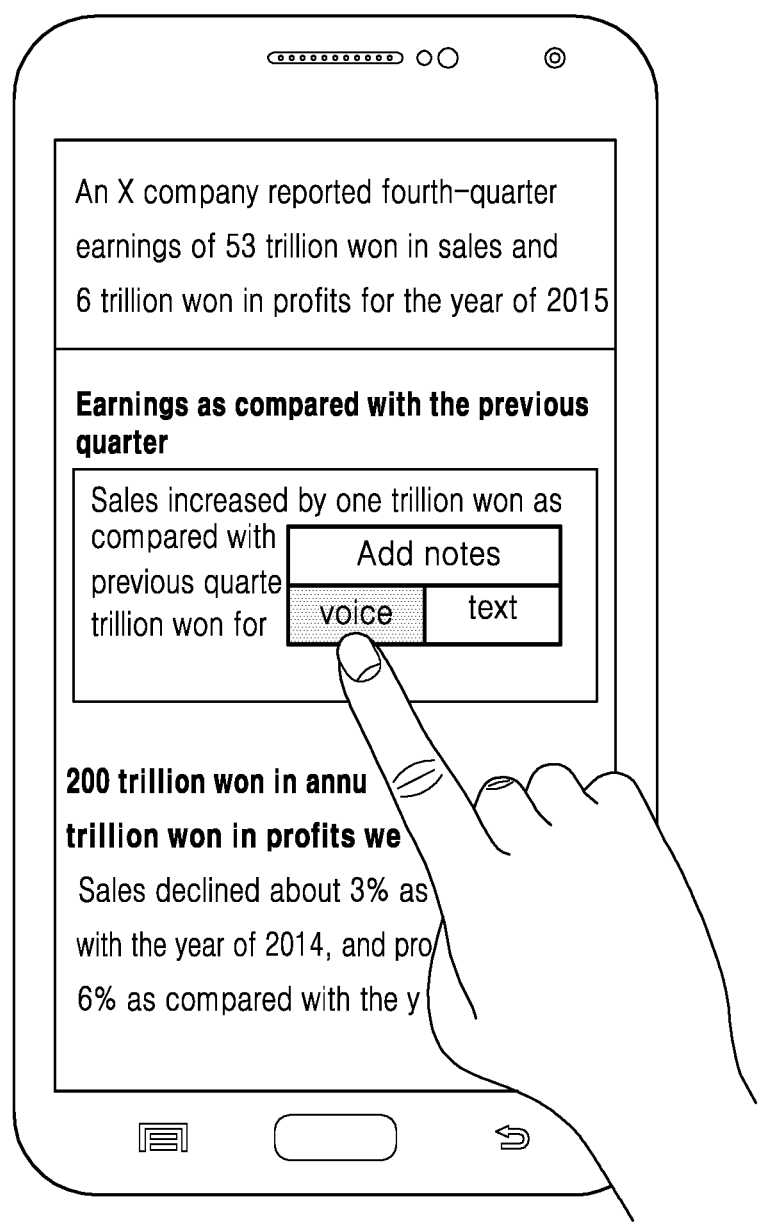
FIG. 11B is schematic diagram illustrating an example in which the user selects to add voice note according to the third embodiment of the present disclosure.

FIG. 11B is schematic diagram in which the user selects to add voice note.

Figure 11C:
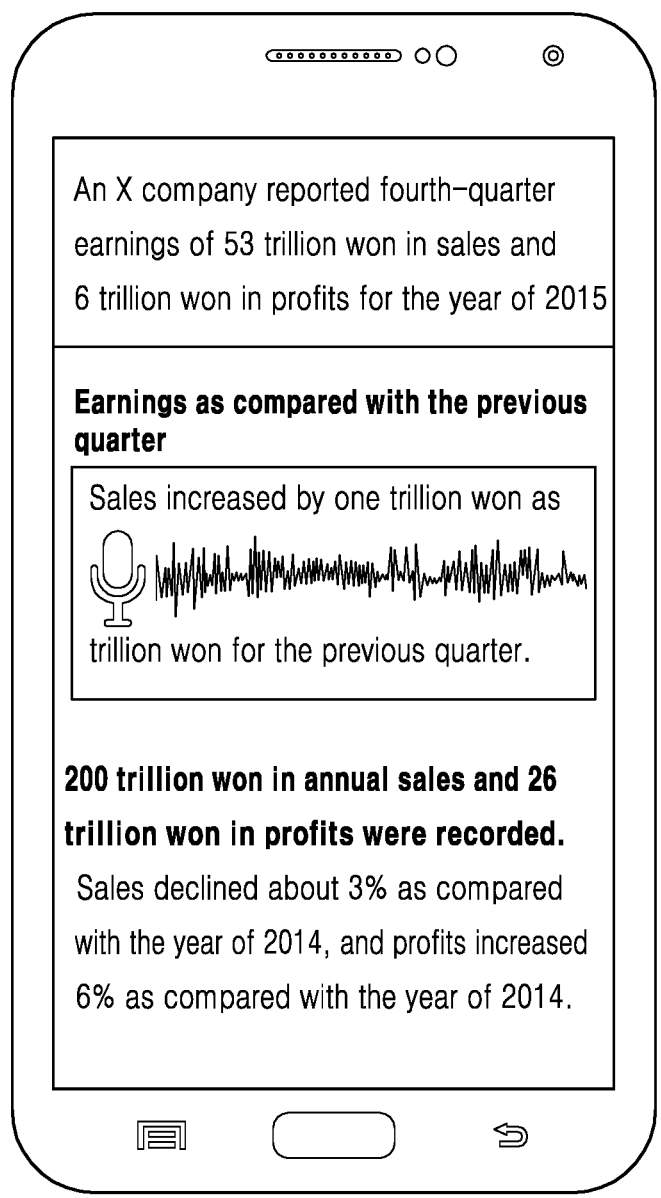
FIG. 11C is schematic diagram illustrating an example in which voice inputted by the user is collected via an audio data collecting device such as a microphone according to the third embodiment of the present disclosure.

FIG. 11C is schematic diagram in which the terminal device collects the voice inputted by the user via an audio data collecting device such as a microphone.

Figure 11D:
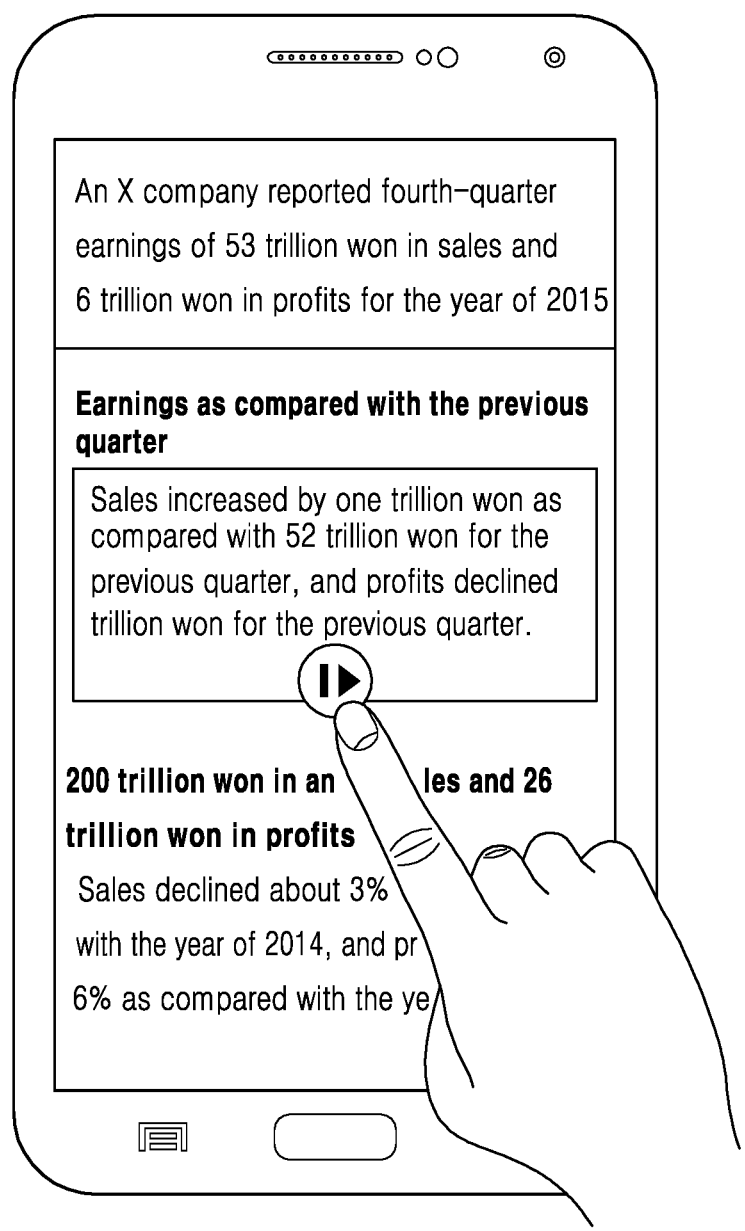
FIG. 11D is schematic diagram illustrating displaying of a voice note playing identifier according to the third embodiment of the present disclosure.

FIG. 11D is schematic diagram in which the terminal device displays the voice note playing identifier.

Figure 11E:
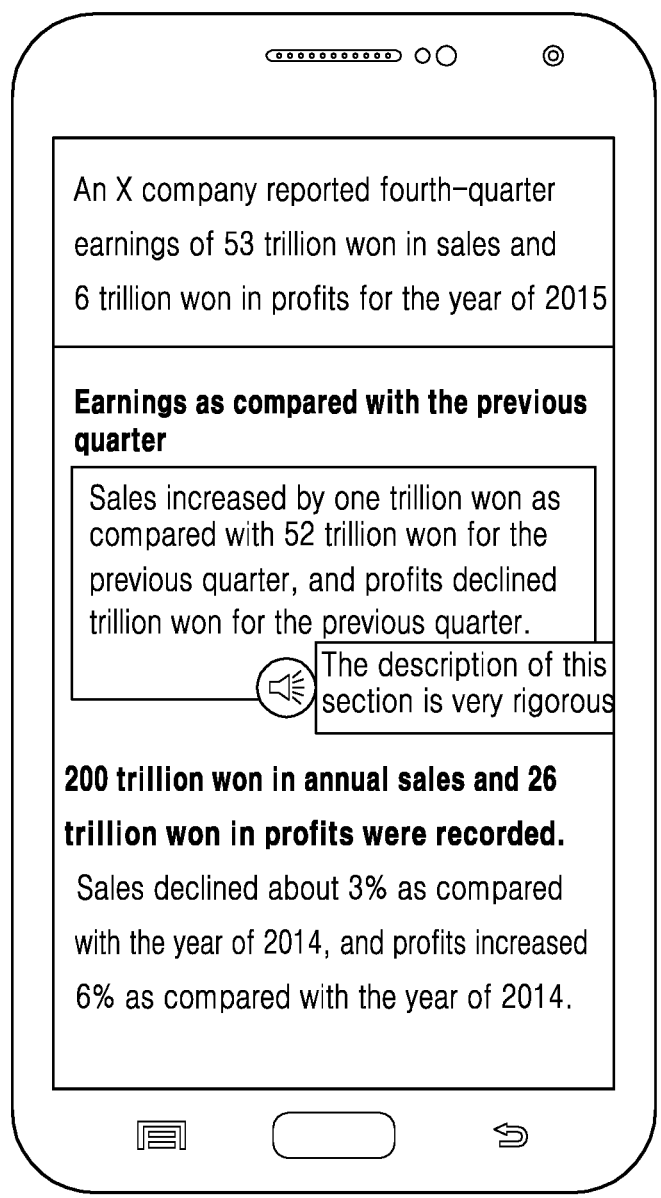
FIG. 11E is schematic diagram illustrating an example in which the terminal device plays the voice note after the user triggers the voice note playing identifier according to the third embodiment of the present disclosure.

FIG. 11E is schematic diagram in which the terminal plays the voice note after the user triggers the voice note playing identifier.

Besides the method for obtaining note information in the method for inputting note information to the image of the shot object provided by the first to third embodiments, the terminal device may also recognize note having been made on the shot object in advance from the image shot in real time, and takes the recognized note as the note information.

The note recognized from the image shot in real time may be note made by the user on the shot object in advance or note made by other users on the shot object.

The terminal device may recognize the note content, e.g., wavy line, underline, annotation, etc., from the image shot in real time according to character recognition technique and handwriting recognition technique.

Embodiment 4

Hereinafter the procedure that the terminal device associates and displays the shot object and the note information is described.

In the fourth embodiment of the present disclosure, the terminal device may associate the shot object and the note information according to the position of the note information made by the user on the shot object. In other words, the terminal device may reflect and display the note information on the image of the shot object.

In one implementation, the terminal device may take the absolute position of the note information in the image of the shot object shot in real time as the position of the note information on the shot object. In particular, the terminal device is able to know on which position of the image of the shot object the user has made the note information, i.e., the terminal device is able to know the absolute position of the note information in the image of the shot object, i.e., the position of the note information when being displayed on the screen of the terminal device. The position may be pixel coordinates of each corresponding trajectory point when the note information is displayed on the screen of the terminal device. The terminal device displays the note information on the screen according to the pixel coordinates of each trajectory point.

For example, the shot object is a book. The user draws a wavy line under a particular line of characters on the current page. The wavy line is the note information made by the user on the shot object. Through block S102, the terminal device may obtain the pixel coordinates of each trajectory point when the wavy line is displayed on the screen of the terminal device. Then, according to the pixel coordinates of each trajectory point, the terminal device displays the wavy line on the screen.

In another implementation, the terminal device performs character recognition to the image of the shot object shot in real time, and determines a relative position of the note information with respect to the content of the shot object according to the character recognition result, and takes the determined relative position as the position of the note information on the shot object.

Since Optical Character Recognition (OCR) technique has a better jamming resistance ability (e.g., low resolution, vague, slant or distortion, shade or light reflection, etc.), and supports character recognition to multiple kinds of complex images, in the fourth embodiment of the present disclosure, the OCR technique is adopted to perform the character recognition to the image of the shot object.

When performing the character recognition to the image of the shot object using the OCR technique, pre-processing may be firstly performed to the image of the shot object. If there is slant or distortion, calibration is performed. If the quality of the image is low, enhancement processing is performed to the image. Then the terminal device performs layout analysis to the image of the shot object, and obtains the layout information through processing such as binarization, block segmentation, line segmentation, and character segmentation. The layout information includes coordinates of paragraphs and lines of text area, sequence of paragraphs and lines, coordinates of each character, coordinates and text surrounding mode of a graph area, and background, and may further include page margin, paragraph spacing, line spacing, character spacing, alignment manner, etc. Then, according to the layout information, the character recognition is performed to obtain the character information, wherein the character information includes typeface, font size and corresponding code of each character.

Figure 12B:
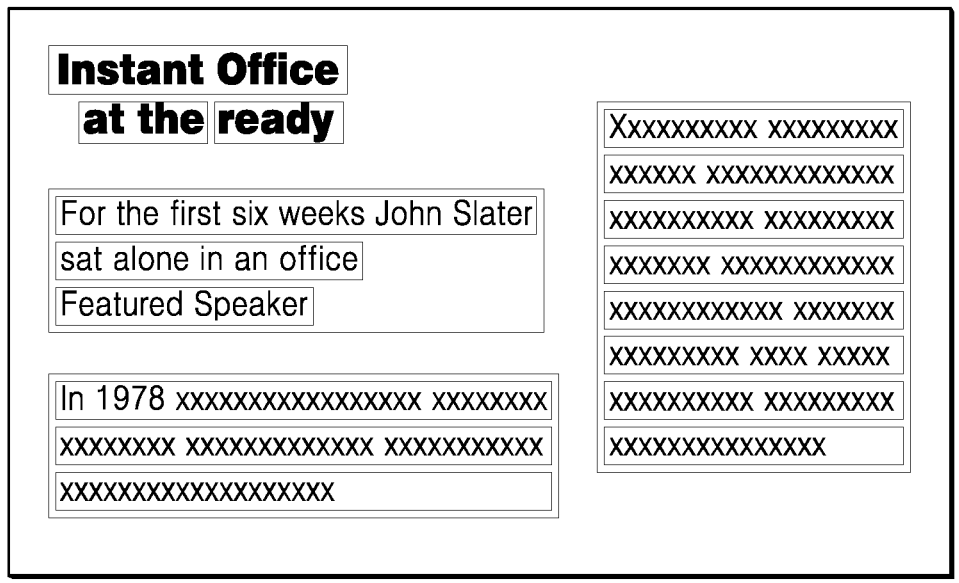
FIG. 12B is schematic diagram illustrating layout analysis to the image according to the fourth embodiment of the present disclosure.
Figure 12C:
FIG. 12C is schematic diagrams illustrating character segmentation to the image according to the fourth embodiment of the present disclosure.

For example, FIG. 12A shows schematic diagram of the shot object shot by the terminal device in real time. FIG. 12B shows schematic diagram in which layout analysis is performed to the image as shown in FIG. 12A. FIG. 12C is schematic diagram in which character segmentation is performed to the image as shown in FIG. 12A to obtain coordinates of each character.

In the fourth embodiment of the present disclosure, when shooting the shot object in real time, the terminal device performs real time character recognition to each image frame obtained by shooting, and determines the relative position of the note information made by the user with respect to the content of the shot object according to the character recognition result and the absolute position of the note information in the current image frame, and associatively displays the shot object and the note information according to the relative position. The character recognition result includes the above layout information and the character information. The relative position of the note information with respect to the content of the shot object includes the paragraph number of the paragraph where the note information is located, the line number of the line where the note information is located, related characters, distance from the characters, etc.

For example, the shot object is a book. The user draws a wavy line under a particular line of characters on the current page. The wavy line is the note information made by the user, the terminal device may determine that under which paragraph, which line, and which characters the wavy line is drawn and the distance between the wavy line and the characters according to the layout information and character information obtained by the character recognition of the image of the current page, and then displays the wavy line on the screen according to the above information.

In the fourth embodiment of the present disclosure, the terminal device may cache the character recognition result obtained via the character recognition of the shot image in real time. The terminal device may also cache the content of the note information obtained in real time and the relative position of the note information with respect to the content of the shot object.

In the implementation of associating and displaying the note information and the shot object, since the terminal device determines the relative position of the note information with respect to the content of the shot object, even if the content of the shot object changes later (e.g. the layout is changed), the terminal device can determine the position of the note information in the changed content according to the above relative position, so as to display the note information and the shot object in association.

In the fourth embodiment of the present disclosure, if the note is of a non-character type, such as underline, wavy line, dotted line, etc., the relative position of the note information with respect to the content of the shot object may be the relative position of each trajectory point of the note with respect to the content of the shot object. The relative position between the trajectory point and the content includes the paragraph number of the paragraph where the trajectory point is located, the line number of the line where the trajectory point is located, related characters, distance from the characters, etc. If the note is of a character type, e.g., annotation, and the characters are handwritten characters, the relative position of the note information with respect to the content of the shot object may also be the relative position of each trajectory of the note with respect to the content of the shot object. If the note is a triangle, a star, a star symbol, and the terminal device takes the corresponding picture as the content of the note, the relative position of the note information with respect to the content of the shot object may be the position of the corresponding picture in the shot object. If the note is of the character type, e.g., annotation, and the characters are non-handwritten characters, the relative position of the note information with respect to the content of the shot object may be the relative position between the characters and the content of the shot object, i.e., coordinates of the characters in the content of the shot object.

If the terminal device obtains the note information in the method for inputting note information of the shot object according to the manner in the third embodiment of the present disclosure, i.e., respectively obtains the position of the note information on the shot object and the content of the note information, when the user desires to insert an annotation in a particular paragraph of characters, the blank area around the paragraph of characters may be relatively small.

It is hard for the user to insert handwritten content in the small area using the writing utensil. At this time, according to the fourth embodiment of the present disclosure, after the user selects the position where the user desires to take note, it is possible to insert handwritten content in any position of the shot object. When displaying the inserted handwritten content, the terminal device obtains the size of the blank area around the position for taking note according to the character recognition result of the shot object, and determines the position and size of the handwritten content when being displayed according to the size of the blank area, so as to obtain the relative position of the handwritten content with respect to the content of the shot object. The relative position of the handwritten content with respect to the content of the shot object may be the relative position of each trajectory point of the handwritten content with respect to the content of the shot object. The terminal device displays the inserted handwritten content according to the relative position. If the blank area around the position for taking note is relatively large, the handwritten content displayed by the terminal device is also relatively large. If the blank area of the position for taking note is relatively small, the handwritten content displayed by the terminal device is also small.

Figure 13A:
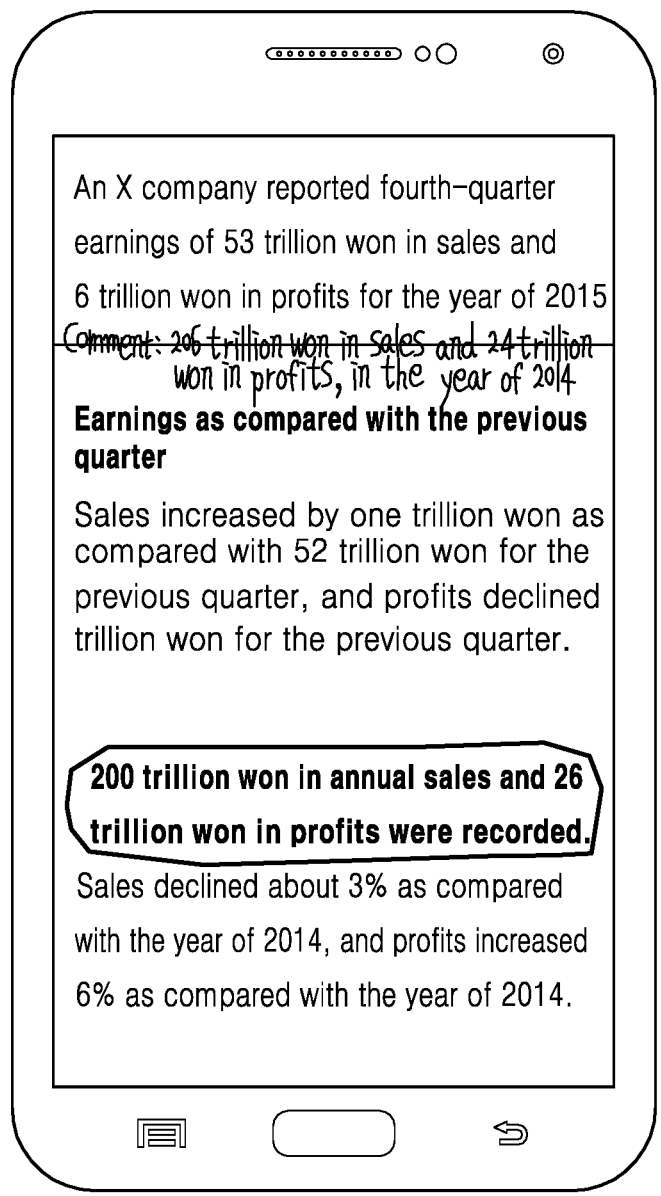
FIG. 13A is a schematic diagram illustrating a local area selected by the user to take note according to the fourth embodiment of the present disclosure.
Figure 13B:
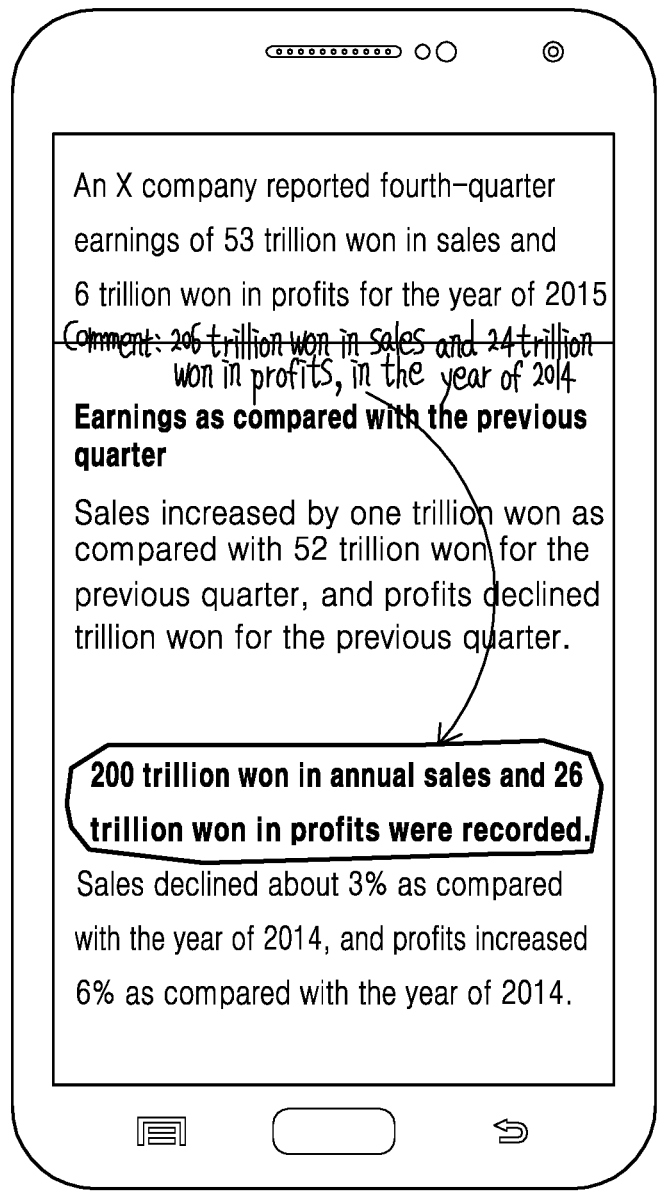
FIG. 13B is a schematic diagram illustrating associating of handwritten content with the local area where the user desires to take note through an arrow according to the fourth embodiment of the present disclosure.
Figure 13C:
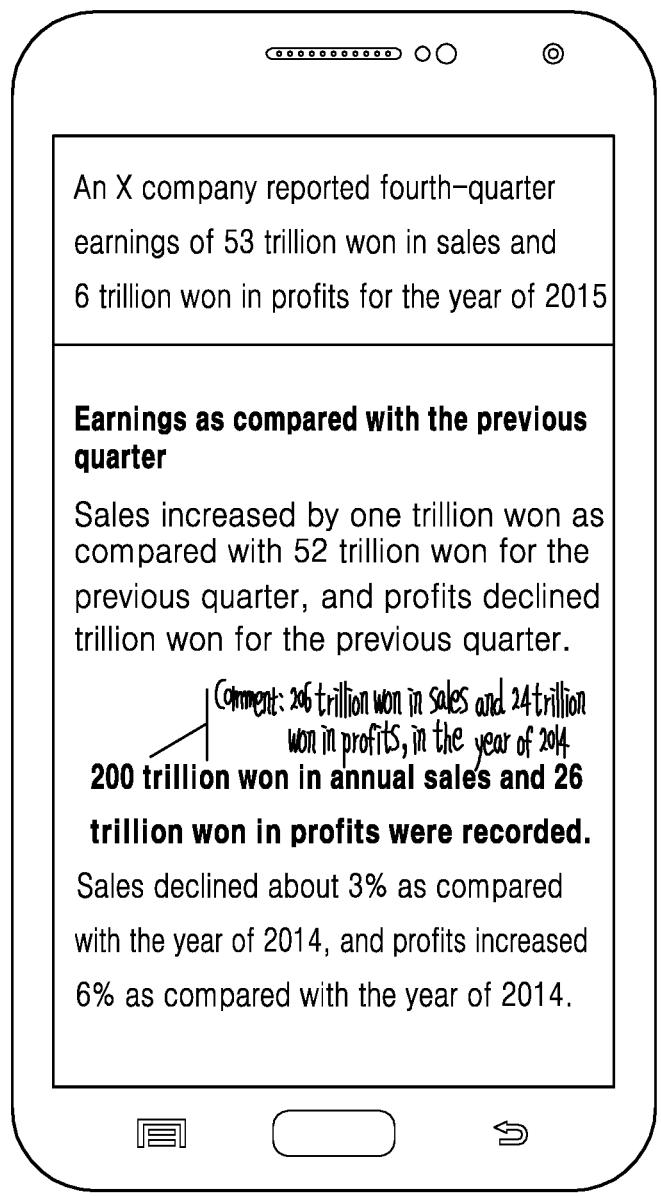
FIG. 13C is a schematic diagram illustrating displaying of the inserted handwritten content around the local area according to the fourth embodiment of the present disclosure.

In particular, the user may manually associate the handwritten content and the position for taking note. After detecting the association operation of the user, the terminal device automatically adjusts the displaying position and size of the handwritten content when displaying the handwritten content. For example, the user may associate the handwritten content and the position for taking note via a symbol such as an arrow. The start point of the arrow is the position of the handwritten content and the arrow points to the position selected by the user for taking note. Or, the start point of the arrow is the position selected by the user for taking note, and the arrow points to the handwritten content. As shown in FIG. 13A, the local area selected by the user for taking note is the circled area in FIG. 13A, the handwritten content inputted by the user is "Comment: 206 trillion won in sales and 24 trillion won in profits, in the year of 2014". As shown in FIG. 13B, the user associates the handwritten content and the local area for taking note via the arrow. The terminal device determines the position and size of the handwritten content when being displayed beside the local area according to the size of the blank area around the local area, so as to obtain the relative position of the handwritten content with respect to the content of the local area. As shown in FIG. 13C, the terminal device displays the inserted handwritten content beside the local area according to the determined relative position.

Figure 13D:
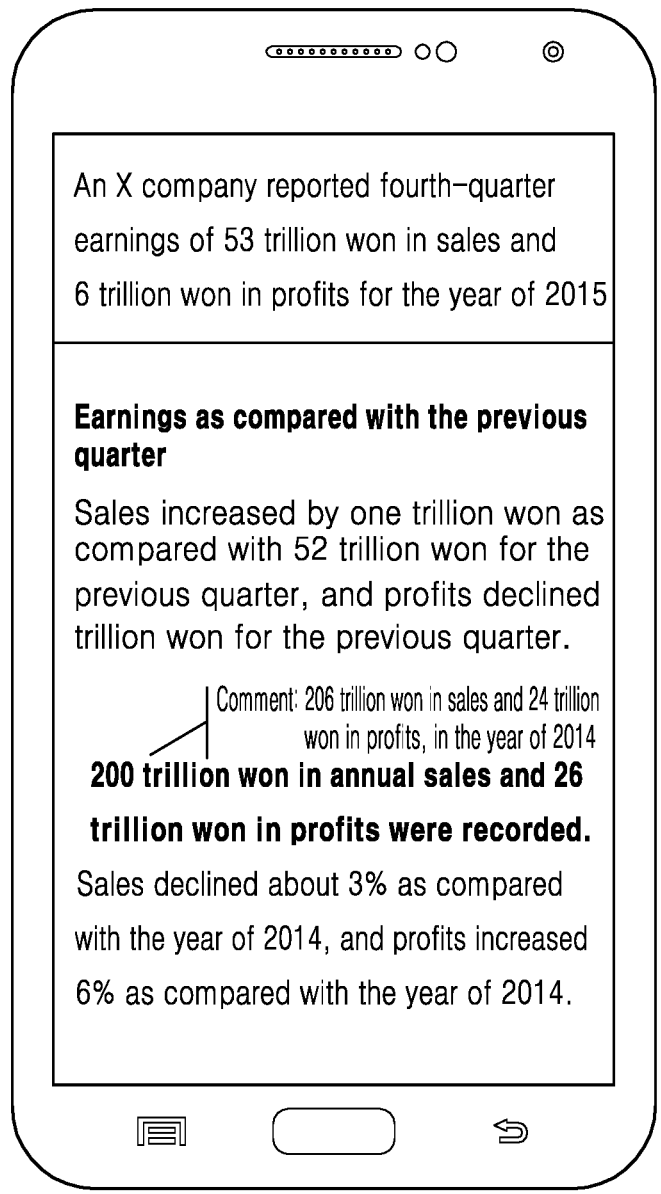
FIG. 13D is a schematic diagram illustrating displaying of printed characters converted from the handwritten characters around the local area according to the fourth embodiment of the present disclosure.

The terminal device may also recognize the content of the inserted handwritten characters and convert the handwritten characters into printed characters in a typeface supported by the system, and display the converted printed characters beside the local area. As shown in FIG. 13D, it is a schematic diagram in which the printed characters converted from the handwritten characters are displayed beside the local area.

In addition, the terminal device may also automatically detect whether it is required to automatically adjust the displaying position and size of the handwritten content. For example, after selecting the local area for taking note, the terminal device inserts the handwritten content on the shot object. If the terminal device detects that the position of the handwritten content is too far away from the local area for taking note (e.g., larger than a predefined distance threshold), it is regarded that the position and size of the handwritten content when being displayed need to be adjusted.

It can be seen from the above that, when the user inputs handwritten information, the user may input at any position of the shot object. When displaying the handwritten content, the terminal device may automatically adjust the position and size of the handwritten content according to the character recognition result of the shot object, which greatly increases the convenience for the user to input the handwritten content.

In a practical application, the shot object may be a book page with a relatively large area, e.g., a page of a magazine. If the whole page is shot in real time to obtain the note information, the characters in the shot image may be too small for checking. Therefore, in one embodiment, the user may obtain the note information via a dynamic shooting manner.

In particular, the user may obtain a global image of the shot object using the terminal device. The terminal device performs character recognizing to the global object to obtain a character recognizing result. Then, the user moves the focus of the camera close to the local area of the shot object, such that the characters in the local image have a proper font size and are clear. At this time, the user may take note on the shot object or the screen. At the same time, the terminal device performs character recognizing to the currently shot local image to obtain a character recognizing result. The terminal device determines a position of the local image in the global image according to the character recognizing result of the local image and the character recognizing result of the global image. According to the position of the local image in the global image and the relative position of the note information with respect to the content of the local image, the terminal device may determine the relative position of the note information with respect to the content of the global image, i.e., the position of the note information in the global image. The terminal device associates and displays the shot object and the note information according to the relative position.

In an implementation, a dynamic note application may be configured in a real-time note application. When the user starts the dynamic note application, the terminal device prompts the user to shoot a global image firstly. At this time, the user focuses the camera to the global area, such that the camera can collect complete content of the shot object. The user clicks a hardware button or a virtual button for confirming shooting. The terminal device determines the currently shot image as the global image. Then, the user may focus the camera close to the local area for taking note. After the terminal device obtains the global image, each image frame subsequently shot in real time is taken as a local image.

During the character recognition of the global image and the local image, the obtained character recognizing result includes layout information and character information. The terminal device may determine the position of the local image in the global image according to the character information in the local image and the global image. For example, the terminal device searches the characters in the global image for the characters in the local images. According to the search result, the terminal device is able to determine the position of the local image in the global image.

The terminal device may also determine the position of the local image in the global image according to the layout information of the local image and the global image. For example, it is known from the layout information of the local image that, the local image contains a particular paragraph of characters which includes 7 lines. And it is known according to the layout information of the global image that, there is only one paragraph in the global image which includes 7 lines. Therefore, the terminal device may determine the position of the local image in the global image according to the position of the paragraph in the global image and the position of this paragraph in the local image.

In addition, the terminal device may also determine the position of the local image in the global image according to the layout information and the character information in the local image and the global image. For example, it is known according to layout information of the local image that, the local image includes a paragraph which includes 5 lines. And it is known according to the layout information of the global image that, there are two paragraphs in the global image which include 5 lines. Further, it is known according to the character information of the local image that the characters in this paragraph are in font size 3. And it is known according to the character information of the global image that, in the paragraphs containing 5 lines, the characters in one of them are of font size 3, and the characters in the other one are of font size 4. Therefore, the terminal device is able to determine the position of the local image in the global image according to the position of the paragraph of font size 3 in the global image and the position of it in the local image.

In the fourth embodiment of the present disclosure, the terminal device may focus the camera close to the local area of the shot object via at least one of: moving the terminal device to focus the camera of the terminal device close to the local area of the shot object; and change the zooming factor of the camera of the terminal device.

Figure 14:
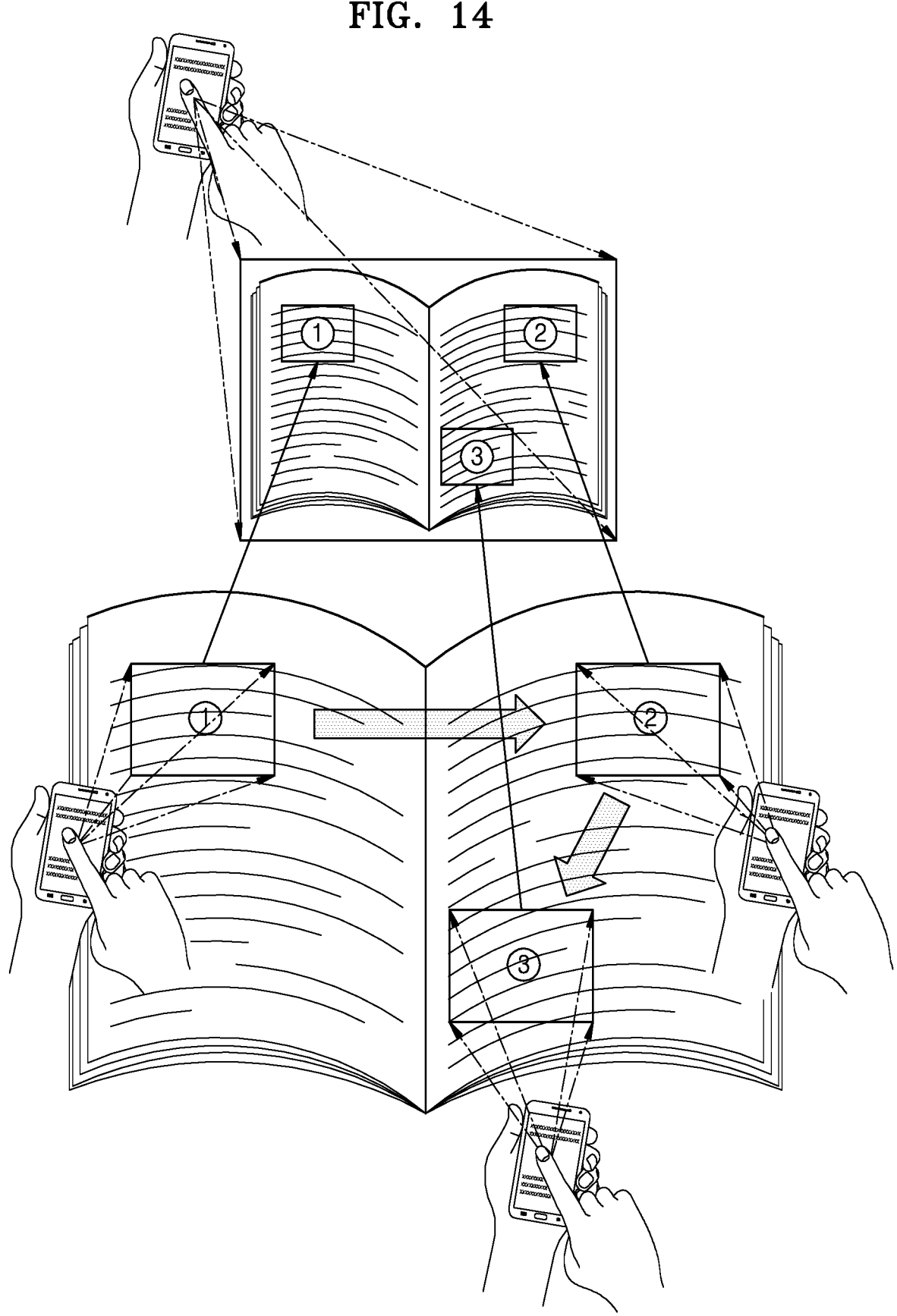
FIG. 14 is a schematic diagram illustrating obtaining the note information by a dynamic shooting method according to the fourth embodiment of the present disclosure.

FIG. 14 is a schematic diagram illustrating obtaining note information using the dynamic shooting method. The user may change the shooting area through moving the position of the camera and/or changing the zooming factor of the camera. As shown in FIG. 14, the user may firstly shoot the local area denoted by ①, and then shoots the local area denoted by ②, and then the local area denoted by ③, and respectively takes note in the different local images. Thus, the terminal device can determine the position of the note information in the global image according to the relative position of the note information made by the user with respect to the content of the local image and the position of the local image in the global image, e.g., the relative position of the note information with respect to the content of the global image, such that the terminal device can associate and display the shot object and the note information.

Since the user's hand may vibrate slightly when shooting the shot object using the terminal device such as cell phone, the terminal device may vibrate accordingly. In addition, the shot object being shot by the terminal device may also vibrate. When the user takes note on the shot object using the writing utensil, the writing utensil may also vibrate. When the shot object, the terminal device or the writing utensil vibrates, the note information of the user may have a deviation.

Therefore, in the fourth embodiment of the present disclosure, the terminal device may detect a vibration in real time. The vibration includes at least one of: vibration of the shot object, vibration of the terminal device and vibration of the writing utensil. If the terminal device detects the vibration, a deviation calibration operation may be performed to the displayed note information.

The terminal device may detect the vibration according to the following manner.

If the position that the content of the shot object is displayed on the screen has a shift meeting a predefined vibration condition, it is determined that the shot object vibrates or the terminal device vibrates.

If the position of the nib of the writing utensil has a shift meeting a predefined vibration condition with respect to the content of the shot object, and the position that the content of the shot object is displayed on the screen does not have a shift meeting the predefined vibration condition (i.e., the shot object and the terminal device does not vibrate), it is determined that the writing utensil vibrates.

The above vibration may be regarded as an incident shift of the shot object, the terminal device or the writing utensil. The lasting time of the shift is relatively not long and the speed of the shift is relatively high. Therefore, the vibration condition may be configured according to the above. For example, the vibration condition is that the vibration lasting time is smaller than a predefined time threshold and the moving speed during the vibration is higher than a predefined speed threshold.

Figure 15A:
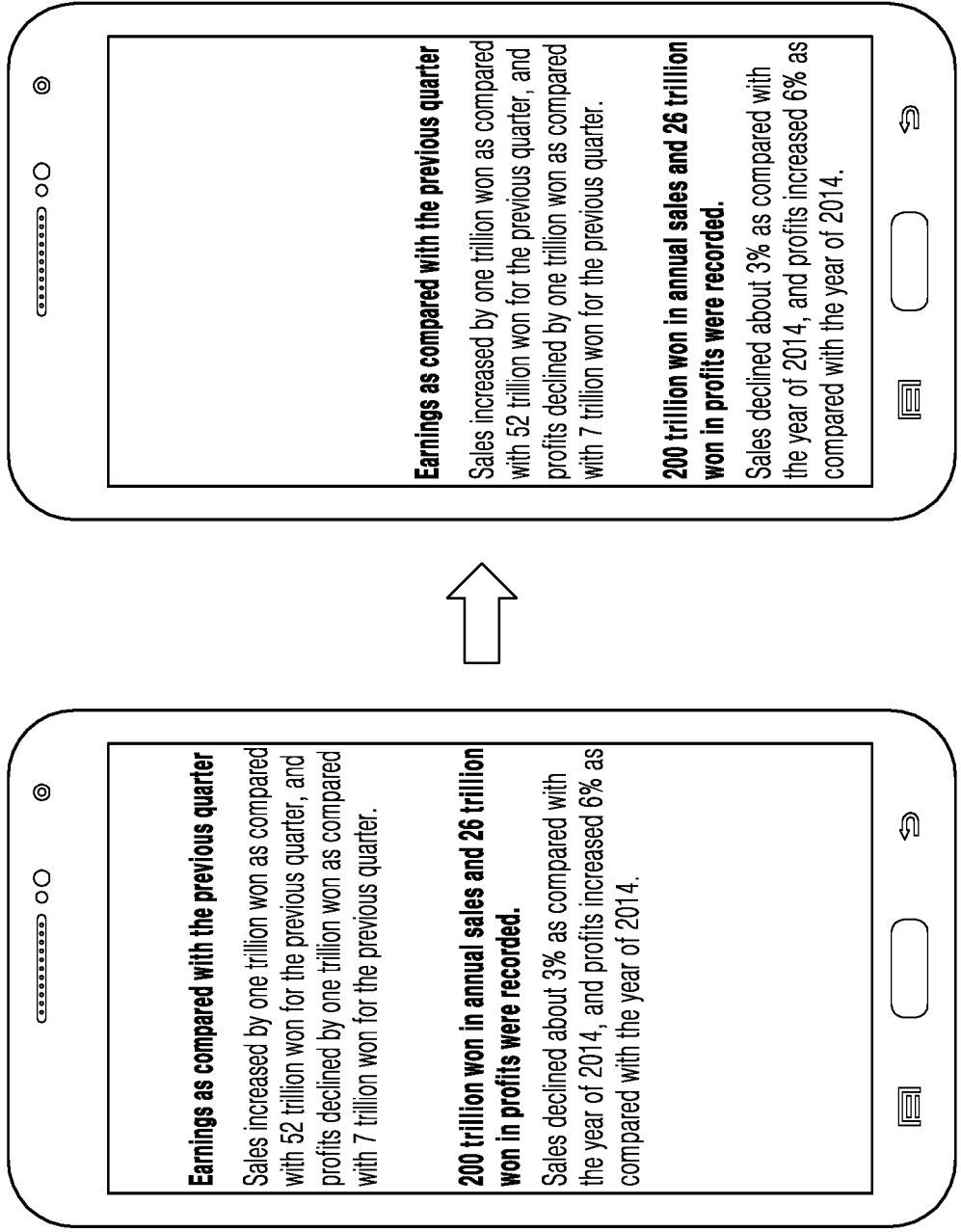
FIG. 15A is a schematic diagram illustrating vibration of the shot object according to the fourth embodiment of the present disclosure.

If the shot object vibrates when the user takes note in real time, the position that the content of the shot object is displayed on the screen changes, as shown in FIG. 15A.

Figure 15B:
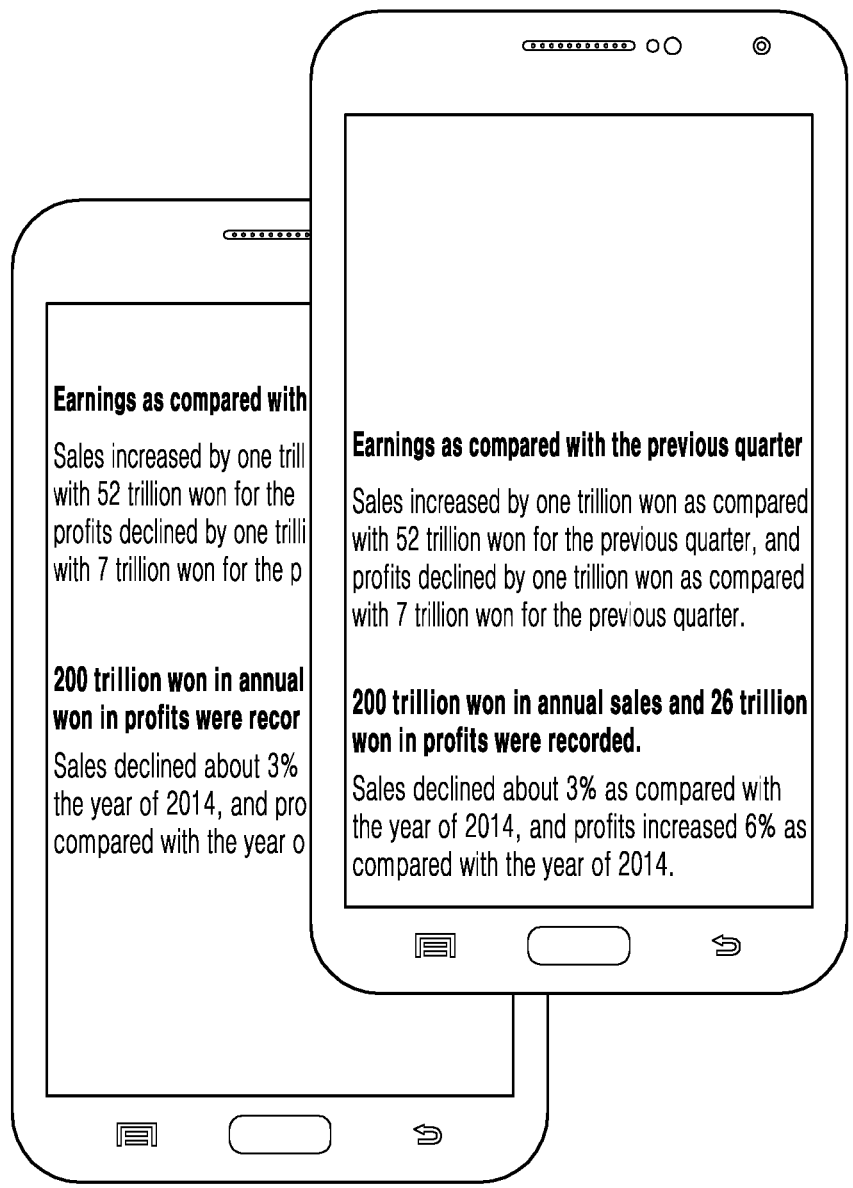
FIG. 15B is a schematic diagram illustrating vibration of the terminal device according to the fourth embodiment of the present disclosure.

If the terminal device vibrates when the user takes note in real time, the position that the content of the shot object is displayed on the screen changes, as shown in FIG. 15B.

Figure 15C:
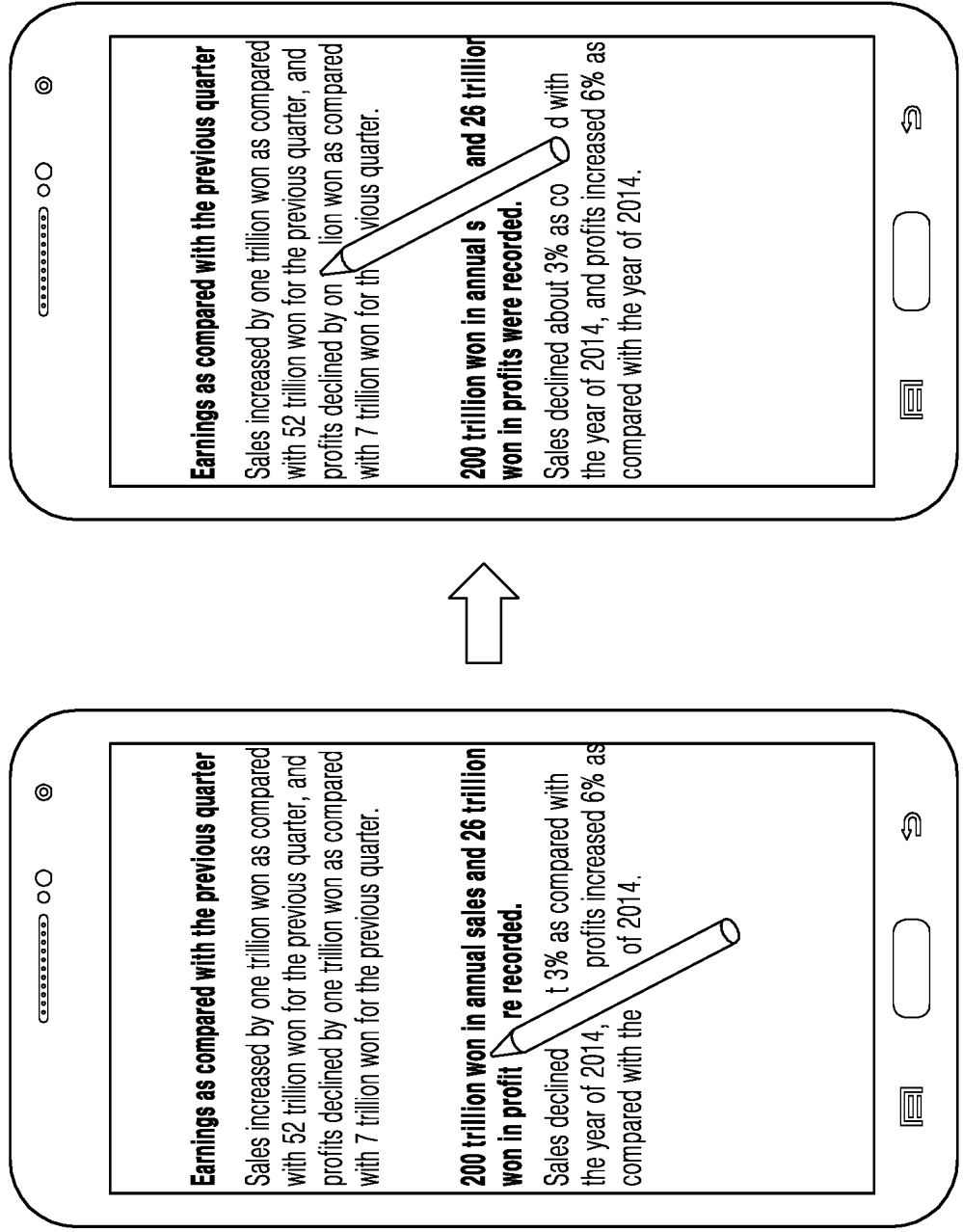
FIG. 15C is a schematic diagram illustrating vibration of a writing utensil according to the fourth embodiment of the present disclosure.

If the writing utensil vibrates when the user takes note in real time, the position of the nib of the writing utensil with respect to the content of the shot object has a deviation, as shown in FIG. 15C.

In the fourth embodiment of the present disclosure, in order to differentiate the vibration of the shot object and the vibration of the terminal device, the terminal device may also perform a supplementary detection using a sensor. When the terminal device detects that the position that the content of the shot object is displayed on the screen has a shift meeting the predefined vibration condition, and it is also detected that the terminal device has a shift at the same time, it may be regarded that the terminal device vibrates. If it is detected that the terminal device does not move, it may be regarded that the shot object vibrates. The terminal device may detect whether the terminal device has moved using, without limitation, a detecting apparatus such as an accelerator sensor.

In the fourth embodiment of the present disclosure, the terminal may perform deviation calibration operation to the displayed note information:

determining the position of the note information on the shot object after the vibration according to the position of the note information on the shot object before the vibration, a vibration direction and a vibration distance, and performing the deviation calibration operation to the note information according to the position of the note information on the shot object after the vibration.

Case 1: When the user takes note via operations on the shot object, the writing utensil vibrates.

After the writing utensil vibrates, the position of the nib of the writing utensil deviates with respect to the content of the shot object. If the user discovers the deviation, the user may move the nib of the writing utensil to the correct position. At this time, deviation happens to merely the note information made by the user during the time period after the vibration happens and before the user moves the nib of the writing utensil. At this time, the terminal device merely needs to perform deviation calibration operation to the note information made by the user during this time period. If movement of the nib of the writing utensil performed by the user meets a predefined condition, the terminal device determines that the user moves the nib of the writing utensil to the correct position. The predefined condition may be: the direction that the user moves the nib of the writing utensil is reverse to the vibration direction of the vibration, and the difference between the moving distance and the vibration distance is not larger than a predefined threshold.

Figure 15D:
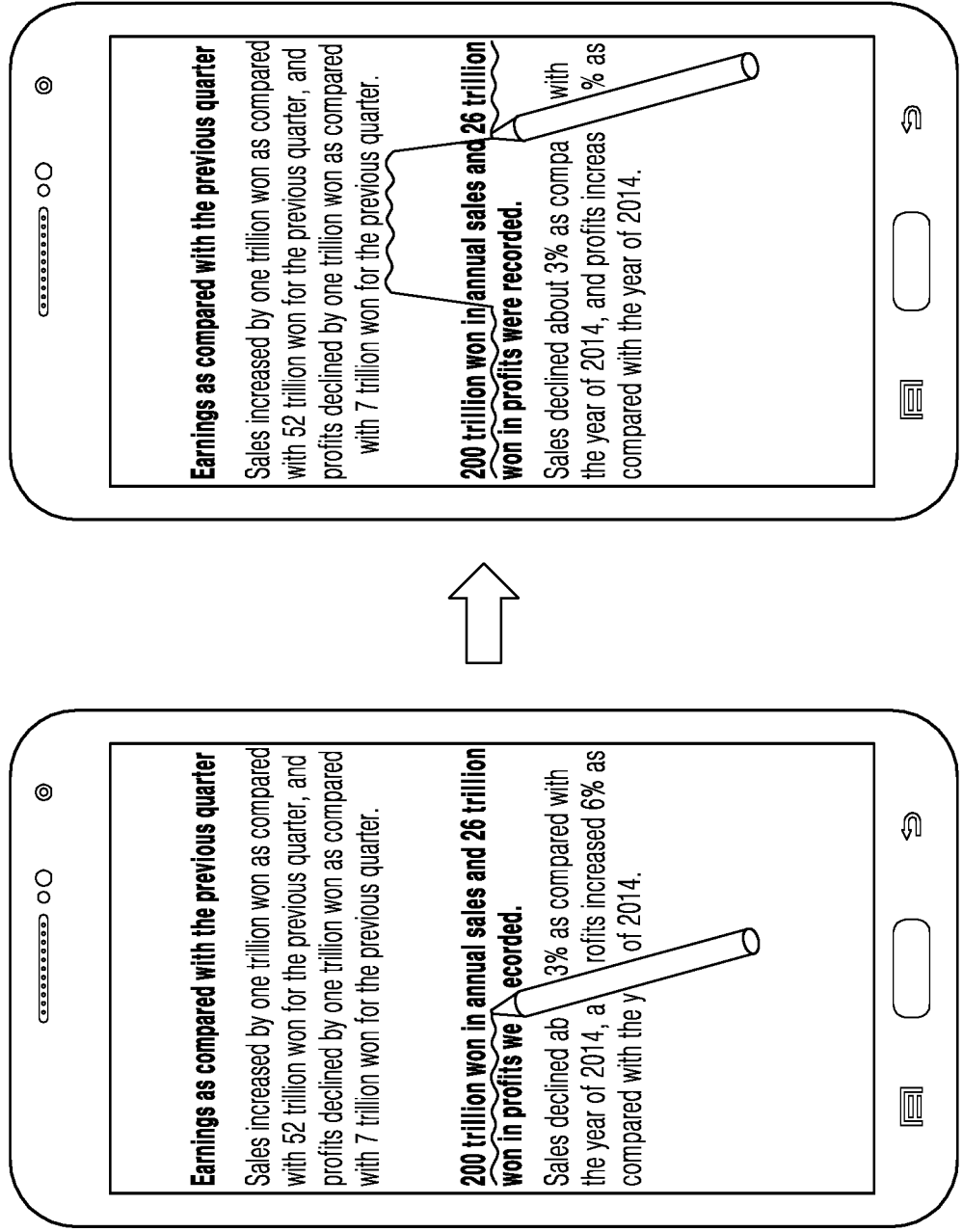
FIG. 15D is a schematic diagram illustrating an example in which the writing utensil vibrates when the user takes note on the shot object according to the fourth embodiment of the present disclosure.

As shown in FIG. 15D, before the vibration, the user operates on the shot object using the writing utensil and draws a wavy line under "200 trillion won in". A vibration happens when the user holds the writing utensil, therefore the nib of the writing utensil moves to under the line of characters "with 7 trillion won for the previous quarter", and the user draws a wavy line after the vibration due the inertia. As shown in FIG. 15D, the wavy line is drawn under "for the previous". At this time, the user discovers the vibration and moves the nib of the writing utensil in time to "26 trillion" and keeps on drawing the wavy line. It can be seen that, merely the wavy line under "for the previous" requires deviation calibration operation. That is to say, the terminal device merely needs to perform the deviation calibration operation to the note information made by the user during the time period after the vibration happens and before the user moves the nib of the writing utensil to the correct position.

With respect to each trajectory point in the note information which requires the deviation calibration operation, the terminal device may determine the position where the trajectory point should be located in the image of the shot object after the vibration happens according to the position of the trajectory point in the image of the shot object before the vibration, the vibration direction and the vibration distance. Then, the terminal device calibrates the position of the trajectory point from the current position to the determined position.

Figure 15E:
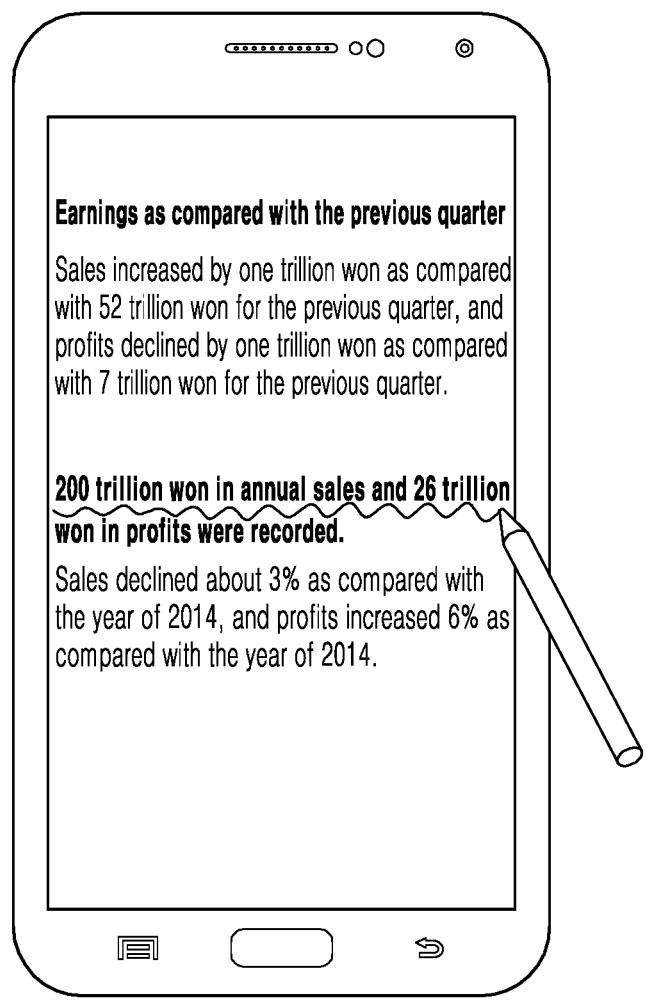
FIG. 15E is a schematic diagram illustrating the note information after a deviation calibration operation according to the fourth embodiment of the present disclosure.

As shown in FIG. 15E, it is a schematic diagram illustrating the deviation calibration operation performed by the terminal device to the wavy line under "for the previous" in FIG. 15D.

Case 2: When the user takes note through operating on the shot object, the shot object vibrates.

After the shot object vibrates, the position that the content of the shot object is displayed on the screen deviates. If the writing utensil does not vibrate, the position of the nib of the writing utensil deviates with respect to the content of the shot object. If the user discovers the deviation, the user may move the nib of the writing utensil to the correct position. At this time, deviation happens to merely the note information made by the user during the time period after the vibration happens and before the user moves the nib of the writing utensil. At this time, the terminal device merely needs to perform deviation calibration operation to the note information made by the user during this time period. If the movement of the nib of the writing utensil performed by the user meets a predefined condition, the terminal device determines that the user moves the nib of the writing utensil to the correct position. The predefined condition may be: the direction that the user moves the nib of the writing utensil is reverse to the vibration direction of the vibration, and the difference between the moving distance and the vibration distance is not larger than a predefined threshold.

Figure 15F:
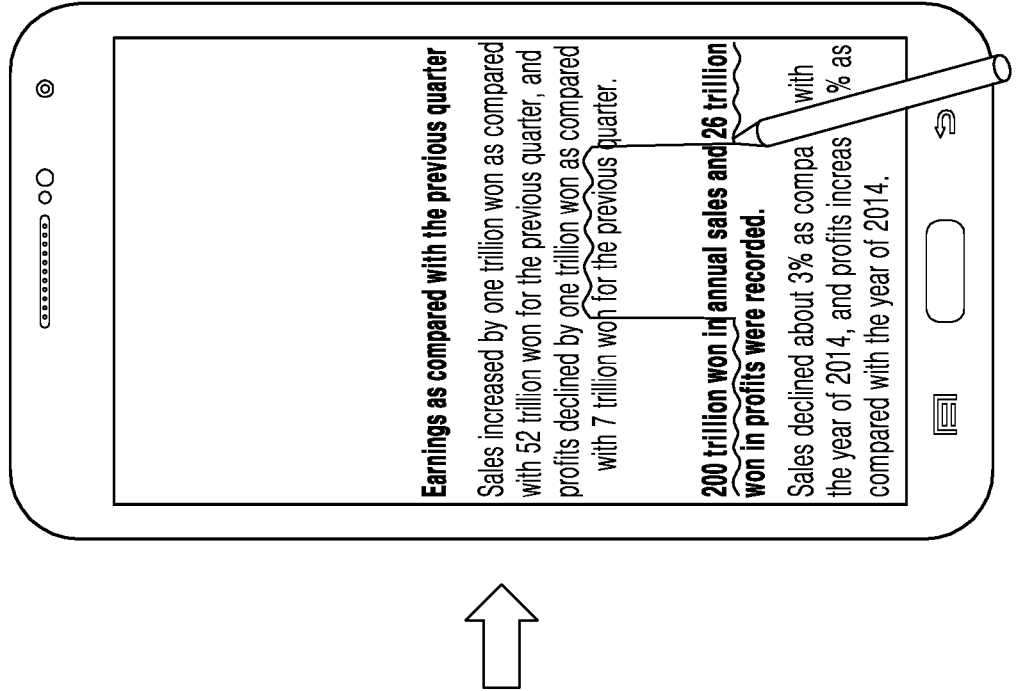
FIG. 15F is a schematic diagram illustrating vibration of the shot object when the user takes note on the shot object according to the fourth embodiment of the present disclosure.
Figure 15F:
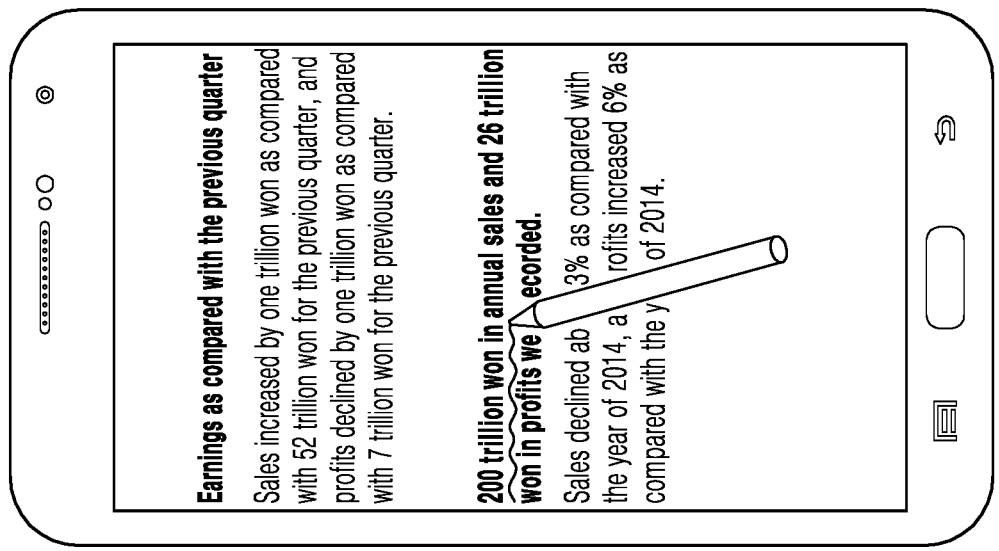

As shown in FIG. 15F, before the vibration, the user draws a wavy line under "200 trillion won in" via an operation of the writing utensil on the shot object. Due to the vibration of the shot object, the nib of the writing utensil moves to the line of characters "profits declined by one trillion won as compared", and due to the inertia of the user's operation, the user continues to draw a segment of wavy line after the vibration, as shown in FIG. 15F, the wavy line is drawn under "one trillion won as". At this time, the user discovers the vibration and moves the nib of the writing utensil in time to "26 trillion" to continue to draw the wavy line. It can be seen that, merely the wavy line under "one trillion won as" requires deviation calibration operation. That is to say, the terminal device merely needs to perform the deviation calibration operation to the note information made by the user during the time period after the vibration happens and before the user moves the nib of the writing utensil.

With respect to each trajectory point in the note information which requires the deviation calibration, the terminal device may determine the position where the trajectory point should be located in the image of the shot object after the vibration happens according to the position of the trajectory point in the image of the shot object before the vibration, the vibration direction and the vibration distance. Then, the terminal device calibrates the position of the trajectory point from the current position to the determined position.

Figure 15G:
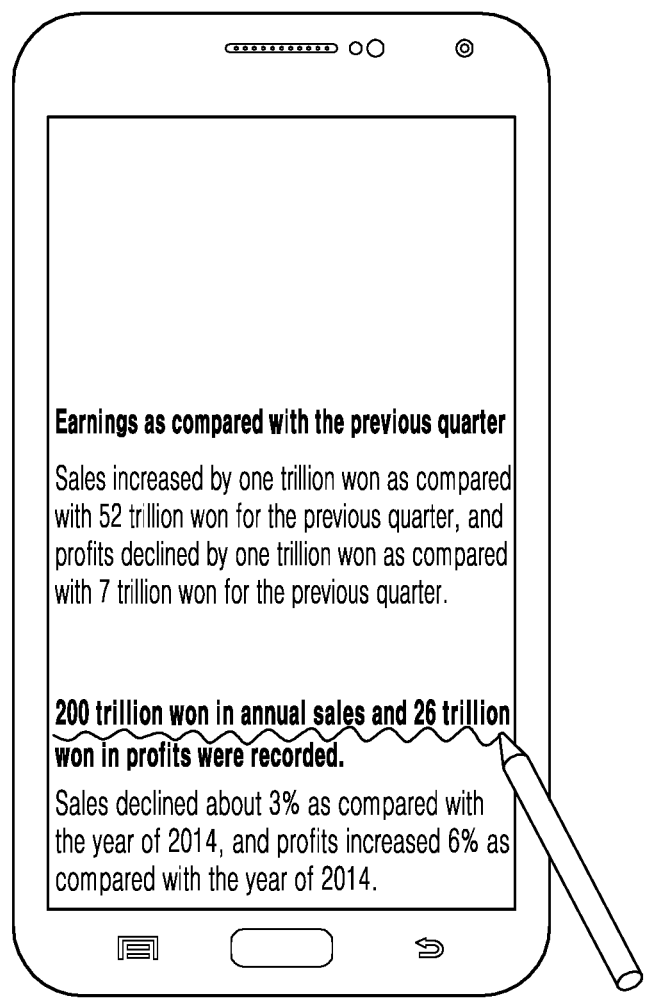
FIG. 15G is a schematic diagram illustrating the note information after the deviation calibration operation according to the fourth embodiment of the present disclosure.

As shown in FIG. 15G, it is a schematic diagram illustrating the deviation calibration operation performed by the terminal device to the wavy line under "one trillion won as" in FIG. 15F.

Case 3: When the user takes note through an operation on the shot object, the terminal device vibrates.

After the terminal device vibrates, the position of the content of the shot object displayed on the screen is deviated. Accordingly, the position that the note information made by the user before the vibration is displayed on the screen also changed. The user does not need to move the writing utensil. At this time, merely the note information made by the user before the vibration will have a deviation when being displayed, the terminal device merely needs to perform deviation calibration operation to these note information.

With respect to each trajectory point in the note information which requires the deviation calibration, the terminal device may determine the position where the trajectory point should be located in the image of the shot object after the vibration according to the position of the trajectory point in the image of the shot object before the vibration, the vibration direction and the vibration distance. Then, the terminal device calibrates the position of the trajectory point from the current position to the determined position.

In addition, in the fourth embodiment of the present disclosure, if the terminal device has performed the character recognition to the image of the shot object and has associatively displayed the note information and the shot object according to the relative position of the note information with respect to the content of the shot object, the terminal device may not perform the deviation calibration to the note information made before the vibration. The terminal device may obtain the relative position of the note information with respect to the content of the shot object through performing character recognition to the shot image obtained in real time after the vibration, and display the note information made before the vibration at a correct position through associatively displaying the note information and the shot object according to the relative position.

Figure 15H:
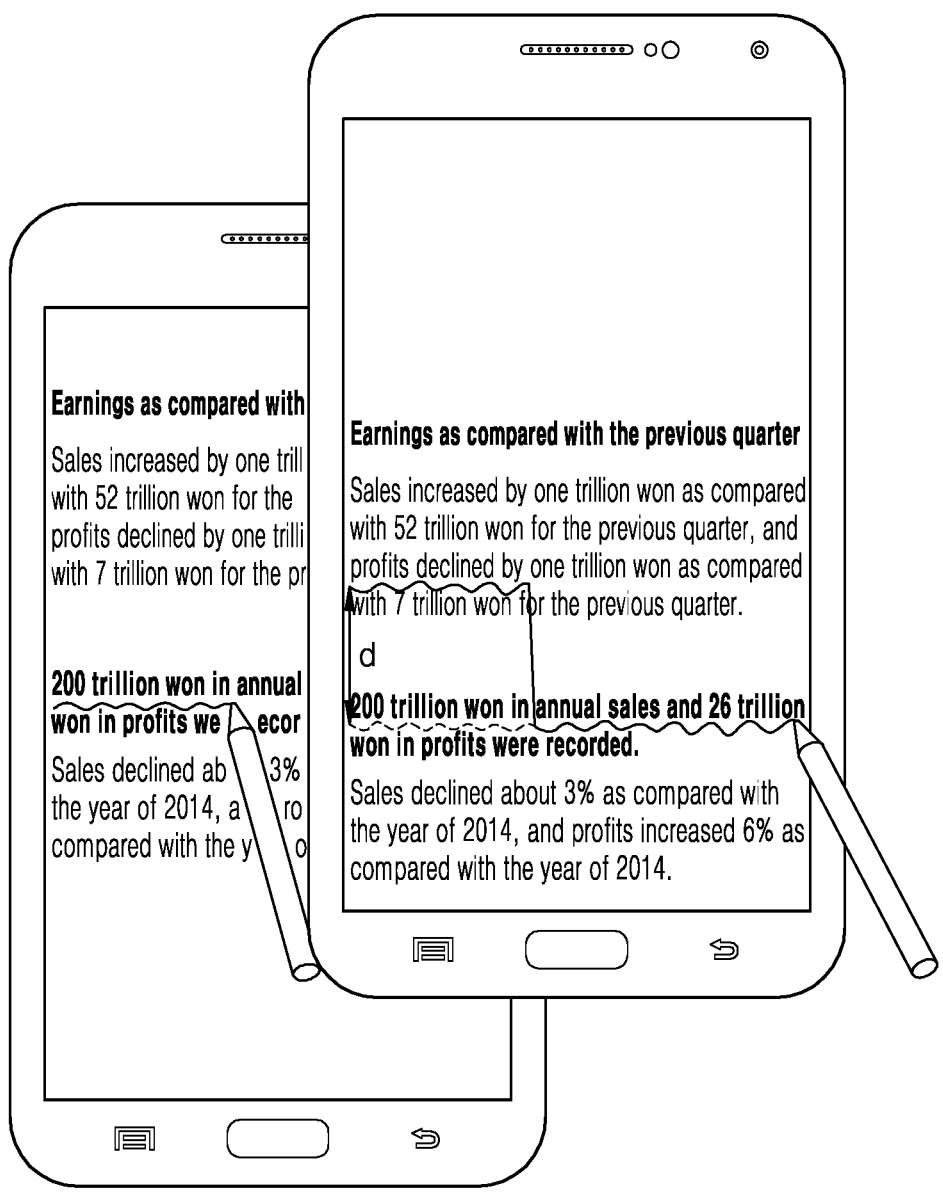
FIG. 15H is schematic diagram illustrating vibration of the terminal device when the user takes note on the shot object according to the fourth embodiment of the present disclosure.

As shown in FIG. 15H, before the vibration, the user draws a wavy line under "200 trillion won in" via an operation on the shot object. Due to the vibration of the terminal device, the terminal device moves upwards for a distance d. After the vibration happens, the wavy line drawn by the user before the vibration has an explicit deviation and is displayed under "profits declined by". At this time, the terminal device needs to perform deviation calibration to the wavy line drawn by the user before the vibration.

Figure 15I:
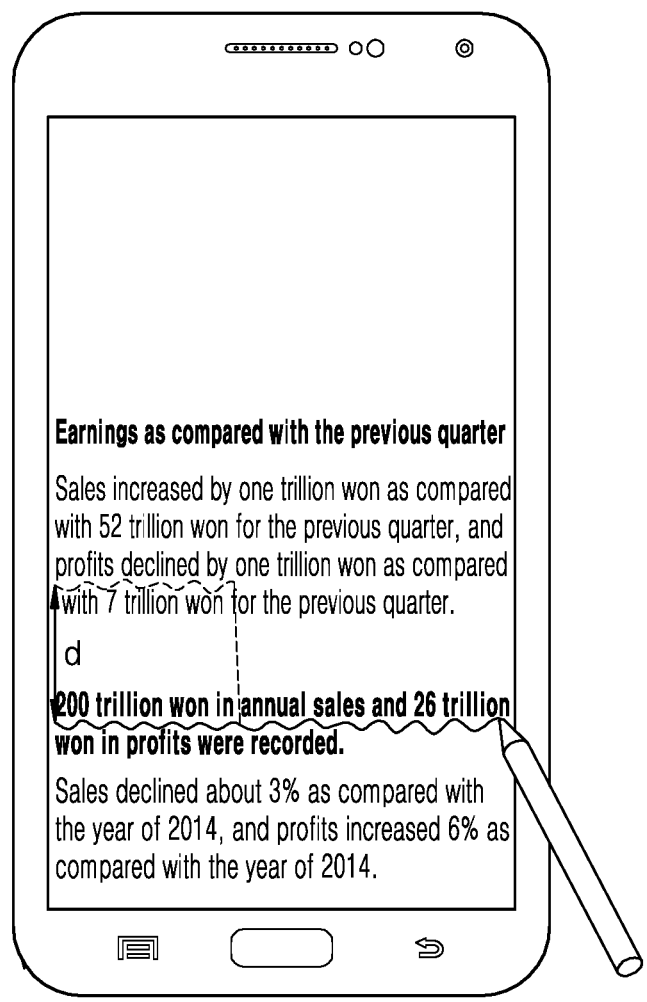
FIG. 15I is schematic diagram illustrating the note information after the deviation calibration operation according to the fourth embodiment of the present disclosure.

As shown in FIG. 15I, it is a schematic diagram after the terminal device performs the deviation calibration operation to the wavy line under "profits declined by" in FIG. 15H.

Case 4: When the user takes note via the operation on the screen, the writing utensil vibrates.

After the writing utensil vibrates, the position of the nib of the writing utensil deviates with respect to the content of the shot object. If the user discovers the deviation, the user may move the nib of the writing utensil to the correct position. At this time, deviation happens to merely the note information made by the user during the time period after the vibration happens and before the user moves the nib of the writing utensil. At this time, the terminal device merely needs to perform deviation calibration operation to the note information made by the user during this time period. If the movement of the nib of the writing utensil by the user meets a predefined condition, the terminal device determines that the user moves the nib of the writing utensil to the correct position. The predefined condition may be: the direction that the user moves the nib of the writing utensil is reverse to the vibration direction of the vibration, and the difference between the moving distance and the vibration distance is not larger than a predefined threshold.

With respect to each trajectory point in the note information which requires the deviation calibration operation, the terminal device may determine the position where the trajectory point should be located in the image of the shot object after the vibration happens according to the position of the trajectory point in the image of the shot object before the vibration, the vibration direction and the vibration distance. Then, the terminal device calibrates the position of the trajectory point from the current position to the determined position.

Case 5: When the user takes note via an operation on the screen, the shot object vibrates.

After the shot object vibrates, the position that the content of the shot object is displayed on the screen deviates. If the writing utensil does not vibrate, the position of the nib of the writing utensil deviates with respect to the content of the shot object. If the user discovers the deviation, the user may move the nib of the writing utensil to the correct position. At this time, deviation happens to merely the note information made by the user during the time period after the vibration happens and before the user moves the nib of the writing utensil. At this time, the terminal device merely needs to perform deviation calibration operation to the note information made by the user during this time period. If the movement of the nib of the writing utensil performed by the user meets a predefined condition, the terminal device determines that the user moves the nib of the writing utensil to the correct position. The predefined condition may be: the direction that the user moves the nib of the writing utensil is reverse to the vibration direction of the vibration, and the difference between the moving distance and the vibration distance is not larger than a predefined threshold.

With respect to each trajectory point in the note information which requires the deviation calibration operation, the terminal device may determine the position where the trajectory point should be located in the image of the shot object after the vibration happens according to the position of the trajectory point in the image of the shot object before the vibration, the vibration direction and the vibration distance. Then, the terminal device calibrates the position of the trajectory point from the current position to the determined position.

Case 6: When the user takes note via an operation on the screen, the terminal device vibrates.

After the terminal device vibrates, the position of the content of the shot object displayed on the screen deviates.

Case (1), the nib of the writing utensil vibrates with the terminal device, i.e., there is no relative position shift between the nib of the writing utensil and the screen. At this time, if the user does not discover the vibration in time and does not move the nib of the writing utensil to the correct position in time, but keeps on taking note on the screen, if the user still needs to take note after discovering the vibration later, the user may move the nib of the writing utensil to the correct position. In this case, the note information made by the user before moving the nib of the writing utensil has deviation. If the movement of the nib of the writing utensil performed by the user meets a predefined condition, the terminal device determines that the user moves the nib of the writing utensil to the correct position. The predefined condition may be: the direction that the user moves the nib of the writing utensil is reverse to the vibration direction of the vibration, and the difference between the moving distance and the vibration distance is not larger than a predefined threshold.

In addition, in this case, the user may finish the note information before discovering the vibration. Therefore, the terminal device needs to perform the deviation calibration operation to all note information.

Figure 15J:
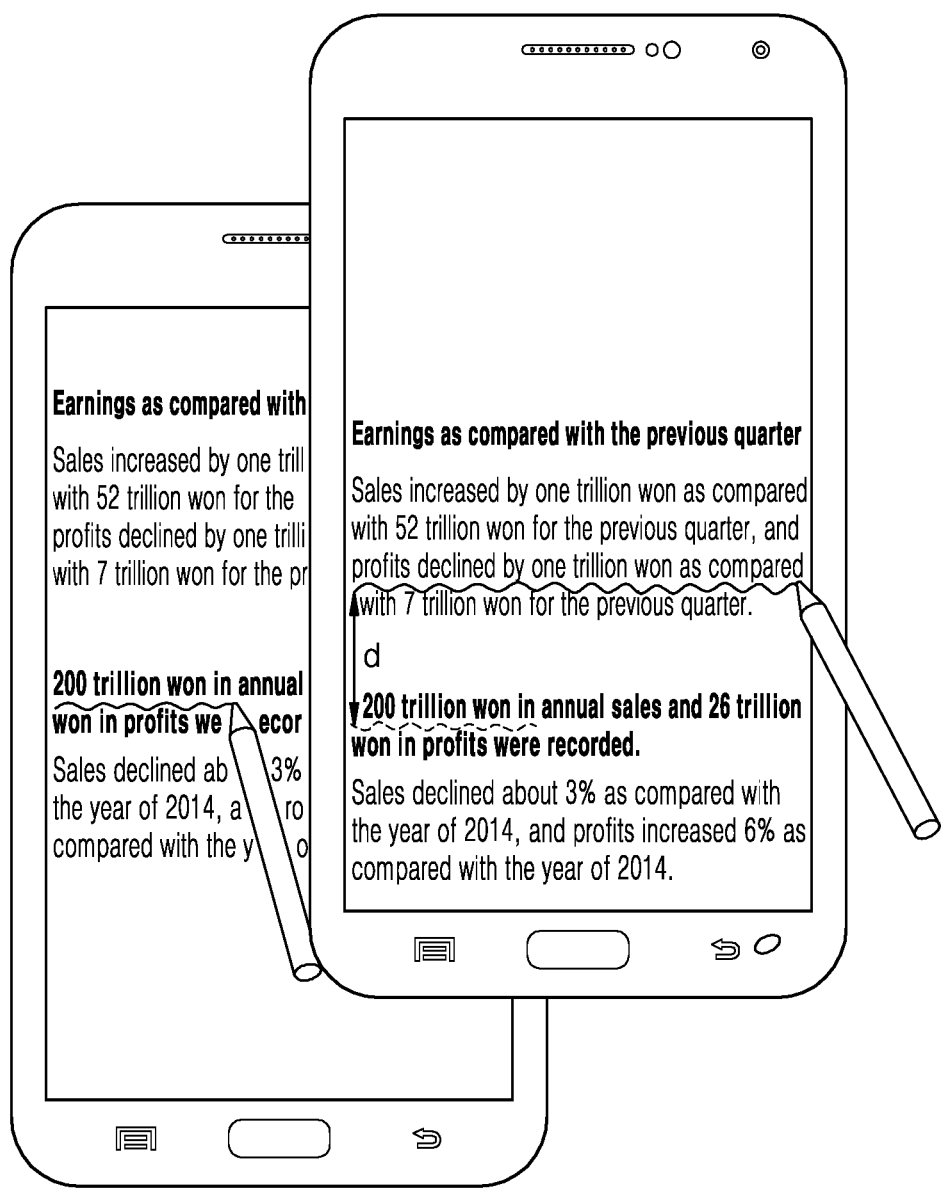
FIG. 15J is schematic diagram illustrating vibration of the terminal device when the user takes note on the screen according to the fourth embodiment of the present disclosure.

As shown in FIG. 15J, before the vibration, the user draws a wavy line under "200 trillion won in" via an operation on the shot object. Due to the vibration of the terminal device, the terminal device moves upwards for a distance d. After the vibration happens, the wavy line drawn by the user before the vibration has an explicit deviation and is displayed under "profits declined by". The user does not discover the vibration and keeps on drawing the wavy line. At this time, the terminal device needs to perform deviation calibration to the wavy line under "profits declined by one trillion won as compared".

With respect to each trajectory point in the note information which requires the deviation calibration operation, the terminal device may determine the position where the trajectory point should be located in the image of the shot object after the vibration happens according to the position of the trajectory point in the image of the shot object before the vibration, the vibration direction and the vibration distance. Then, the terminal device calibrates the position of the trajectory point from the current position to the determined position.

In addition, in the fourth embodiment of the present disclosure, if the terminal device performs character recognition to the image of the shot object obtained by shooting in real time and associatively displays the note information and the content of the shot object according to the relative position of the note information with respect to the content of the shot object, the terminal device may not perform the deviation calibration operation to the note information made before the vibration. The terminal device may obtain the relative position of the note information with respect to the content of the shot object through performing character recognition to the shot image obtained in real time after the vibration, and display the note information made before the vibration in a correct position through associatively displaying the note information and the shot object according to the relative position.

Figure 15K:
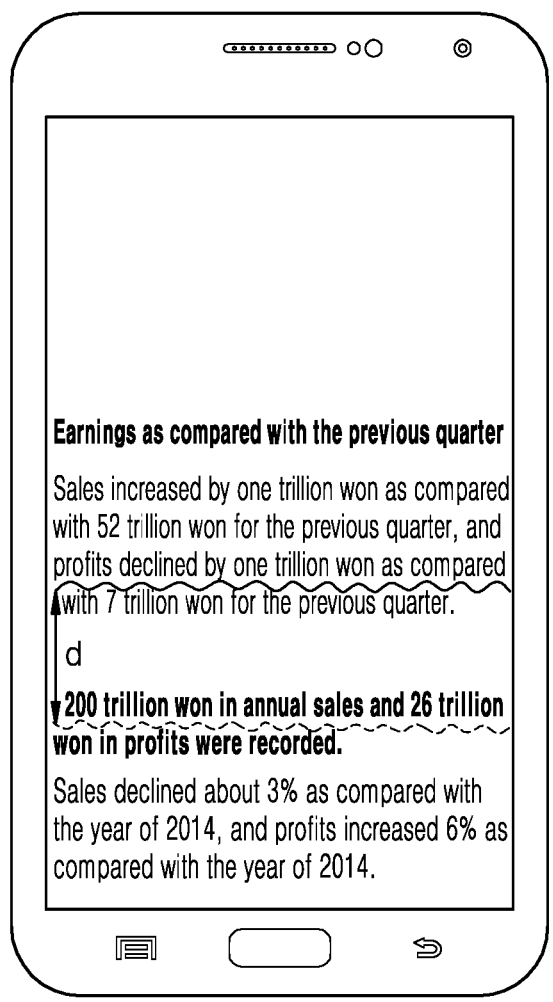
FIG. 15K is schematic diagram illustrating the note information after the deviation calibration operation according to the fourth embodiment of the present disclosure.

As shown in FIG. 15K, it is a schematic diagram after the terminal device performs the deviation calibration operation to the wavy line under "profits declined by one trillion won as compared" in FIG. 15l.

Case (2), the nib of the writing utensil does not vibrate along with the terminal device, i.e., there is relative shift between the nib of the writing utensil and the screen. Thus, merely the display of the note information made by the user before the vibration has a deviation. At this time, the terminal device merely needs to perform deviation calibration operation to a displaying deviation of the note information made by the user before the vibration. The process that the terminal device performs the deviation calibration operation to the note information made by the user before the vibration is similar to that in case 3 and is not repeated herein.

Through performing the above deviation calibration operation to the vibration, the note information made by the user on the shot object may be displayed on the screen more accurately and the user's experience is improved.

Embodiment 5

For facilitating subsequent checking of the note information, the user may select to save the note information. When receiving a note information saving instruction, the terminal device associatively saves the note information made by the user on the shot object and the image of the shot object shot in real time.

The terminal device may also associatively save the note information made by the user, the image shot in real time, and the character recognizing result obtained by performing character recognition to the image shot in real time. In addition, the terminal device may also save the relative position of the note information with respect to the content of the shot object.

The terminal device may save the note information in an independent note file, wherein the relative position of the note information with respect to the content of the shot object may be saved in the note file.

If the note is a non-character note, e.g., underline, wavy line, dotted line, etc., the saved note information may include information such as line thickness and color of the note information. The relative position of the note information with respect to the content of the shot object may be the relative position of each trajectory point of the note with respect to the content of the shot object. If the note is a character-type note, e.g., annotation, and the characters are handwritten characters, the relative position of the note information with respect to the content of the shot object may be the relative position of each trajectory point of the note with respect to the content of the shot object. If the note is a triangle, a star, or a star symbol, the terminal may also take a corresponding picture as the note content. The relative position of the note information with respect to the content of the shot object may be the position of the corresponding picture in the shot object. If the note is a character-type note, e.g., annotation, and the characters are non-handwritten characters, the relative position of the note information with respect to the content of the shot object may be the relative position of the characters with respect to the content of the shot object, i.e., coordinates of the characters in the content of the shot object.

If the note made by the user include voice note, the saved note information may include an audio file. The format of the audio file may be CD, MP3, MIDI, etc. The terminal device may associate a storage address of the audio file and the corresponding voice playing identifier via, but is not limited to, a hyper link. After the user triggers the voice playing identifier via a particular manner, the terminal device obtains the audio file from the corresponding storage position and plays the audio file.

In addition, the user may take the content related to a mark symbol in the note information as excerpt content. Through a one-key excerpt function provided by the terminal device, the relevant excerpt content may be stored in the excerpt note. In one embodiment, when the excerpt note is saved, information such as recording time, note source may be saved. The note source may be book name, author, publishing house, title, etc. The note source may be information such as book name, author on the cover of the paper book through shooting the cover of the paper book and performing character recognition to the cover. Or, the user may scan a bar code of the book through a camera and bar code scanning software in the terminal device to obtain the information of the note source. Or, the user may add the information of the note source manually, and saves the information of the note source and excerpt note correspondingly. Thus, when the user reads in places such as a library, the user may excerpt interested content or important content using the terminal device such as cell phone, and save the content as electronic excerpt note, which is convenient.

Embodiment 6

When the terminal device shoots in real time, note may be made on the shot object, and the image shot in real time and the note information may be displayed associatively.

In addition, if the image of the shot object has been saved in association with note information, when the user shoots the shot object in real time using the terminal device, the note information associated with the image shot in real time may be obtained, and the image shot in real time and the note information are displayed associatively. In particular, the terminal device compares the image shot in real time and the saved image according to image recognition technique. if it is detected that the image shot in real time is associated with the saved image, the terminal device may obtain the associatively saved note information and the relative position of the note information with respect to the content of the saved image, and determine the relative position of the note information with respect to the content in the image shot in real time according to the relative position of the note information with respect to the content in the saved image, a character recognizing result of the saved image and a character recognizing result of the image shot in real time, and associatively display the image shot in real time and the note information according to the determined relative position.

In the sixth embodiment of the present disclosure, when the user shoots the shot object in real time, the area being shot may be either the whole area of the saved image of the shot object, or a local area of the saved image of the shot object. The terminal device may associatively display the corresponding note information during the real-time shooting if only detecting that the image of the shot object shooting in real time is associated with some content of the saved image of the shot object, which makes it more convenient to view note information.

In the above situation, the note information saved by the terminal device may be either the note information previously made by the user on the shot object, or note information received from other devices. Furthermore, the note information may also be obtained from a cloud end.

For example, user A participates in a training class. User A takes a lot of notes on a training book using the cell phone and saves the note in the cell phone. User B does not participate in the training class. At this time, user A may share the notes made by the cell phone with user B. When user B shoots the training book in real time, the notes shared by user A may be directly loaded and displayed. Thus, user B is able to view the notes made by user A on the training book conveniently. Since the note of user is electronic note saved in the terminal device, the user's requirement for taking note may be met without writing on the book.

In the sixth embodiment of the present disclosure, when the user browses static image using the terminal device, the user may take note on the static image and associatively display the note information and the static image.

Or, when browsing a static image using the terminal device, if the user wants to view the note information made by himself or another user on the static image, the terminal device may obtain the note information associated with the static image from a local storage, another device or the cloud end, and associatively display the note information and the static image on the screen.

The static image may be the image of the shot object obtained by the terminal device via real-time shooting as in the above embodiments of the present disclosure, or a static image stored in a local storage of the terminal device, or a static image obtained by the terminal device from another device or the cloud end.

For facilitating the description, in the following description of the sixth embodiment of the present disclosure, the shot image displayed by the terminal device and the static image are referred to displayed image in general.

In the sixth embodiment of the present disclosure, when displaying the image, the terminal device may perform at least one of the following:

displaying with adaptive layout; adjusting content according to the note; highlighting; adjusting content of the note; searching; background displaying; 3D model displaying; and thumbnail displaying.

Hereinafter, the above various operations are described respectively.

1. Display with adaptive layout.

For facilitate the user to view the content of the displayed image, the terminal device may perform character recognition (such as OCR recognition) to the displayed image, and display the image with adaptive layout according to a character recognizing result. If the adaptive layout is applied to the content of the displayed image, the note information associated with the displayed image may also be displayed with the adaptive layout. In addition, the terminal device may apply adaptive layout merely to the note information.

After adaptive layout is applied to the content of the displayed image, the user may click a save button on the screen to transmit a save instruction to the terminal device. After receiving the save instruction of the user, the terminal device saves the image after the adaptive layout is applied in a designated format, e.g., txt, doc, pdf, rtf, jpg/jpeg, tif and bmp, etc. As such, the user may directly load the saved image for later viewing without layout rearrangement.

If adaptive layout is also applied to note information while the adaptive layout is applied to the content of the displayed image, after receiving the save instruction of the user, the terminal device saves the note information after the adaptive layout is applied and the displayed image after the adaptive layout is applied in association.

If the terminal device applies the adaptive layout to merely the note information, after receiving the save instruction of the user, the terminal device saves the note information after the adaptive layout is applied and the displayed image in association.

The manner for saving the note information and the displayed image in association is similar to that in the fifth embodiment and is not repeated herein.

The manner of applying the adaptive layout may include but is not limited to the following.

2. Applying Adaptive Layout Based on a Displayed View

1) Applying Adaptive Layout to the Content of the Displayed Image

The terminal device may apply the adaptive layout to the content of the displayed image according to the size of the currently displayed view and a character recognizing result of the displayed image, and display the image after the adaptive layout is applied on the screen. The width of the currently displayed view is subject to the current width of the screen. The current width of the screen is relevant to a displaying manner of the screen such as portrait or landscape mode.

If the content of the displayed image contains a text area, when applying the adaptive layout, the terminal device may calculate number of characters in one line (i.e., the number of characters hold by one line) fitting for the width of the currently displayed view according to the width of the currently displayed view and the displaying font size of the characters, and apply the adaptive layout (e.g., automatic word wrap) to the characters in the recognized text area according to the calculated number of characters in one line and the displaying font size of the characters, so as to be adaptive for the screen. The displaying font size of the characters may be a font size of the characters obtained by character recognizing, or a font size configured in advance by the user, or a default font size configured in the system of the terminal device, or a font size determined by the terminal device according to a reading habit of the user.

In one embodiment, when applying the adaptive layout to the recognized characters in the text area, the terminal device may firstly determine the displaying font size of each character according to a relationship between the font size of the recognized character and maximum value and a minimum value of the preconfigured displaying font size. For example, with respect to a recognized character, if the font size of the recognized character is larger than the maximum value of the preconfigured font size, the maximum value of the preconfigured font size is taken as the displaying font size of the character. If the font size of the recognized character is smaller than the minimum value of the preconfigured font size, the minimum value of the preconfigured font size is taken as the displaying font size of the character. If the font size of the recognized character is between the maximum value and the minimum value of the preconfigured displaying font size, the font size of the recognized character is taken as the displaying font size of the character. As such, the terminal device may set adaptive layout for the characters in the text area according to the width of the currently displayed view and the determined displaying font size of the characters, so as to be adaptive for the screen. The maximum value and the minimum value of the preconfigured font size may be configured in advance by the user. The terminal device may set adaptive layout for the characters in the text area based on the sequence of coordinates of the characters according to the width of the currently displayed view and the determined displaying font size of the characters.

Figure 16A:
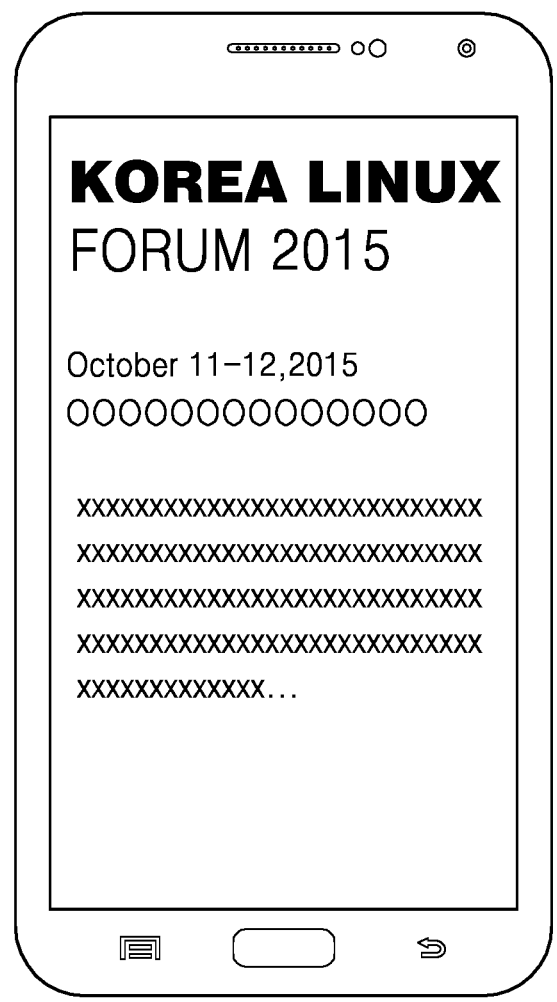
FIG. 16A is schematic diagram respectively showing an example in which the displayed image is displayed directly without applying adaptive layout according to a sixth embodiment of the present disclosure.
Figure 16B:
FIG. 16B is schematic diagram illustrating the displayed image after the adaptive layout is applied to the content of the displayed image according to the sixth embodiment of the present disclosure.

For example, FIG. 16A is schematic diagram in which the terminal device directly displays the displayed image without applying adaptive layout when the displayed image contains merely text content. FIG. 16B is schematic diagrams in which the terminal device applies adaptive layout to the content in the displayed content. It can be seen by comparing FIGS. 16A and 16B that, the content with the adaptive layout is more suitable for reading. The user may conveniently read the content in the displayed image without frequently zooming and left/right dragging operations to the displayed image.

In the embodiments of the present disclosure, when adaptive layout is applied, the terminal device may display the characters in the text area on the screen by way of images, i.e., the terminal connects single characters segmented from the character recognizing result of the text area in one line according to the size of the currently displayed view. If word wrap is required, the corresponding characters are connected in a new line. This displaying manner is similar to "movable type printing". In this displaying manner, the zooming operation is actually applied to the pixels.

Alternatively, the terminal device may display the characters in the text area on the screen in a non-image manner, i.e., the terminal device displays the characters according to information such as corresponding code, typeface, font size, and character coordinates of the character, which is equivalent to convert the characters in the text area into a text file. In this displaying manner, the zooming operation is actually performed to change the font size of the characters. In addition, in this displaying manner, when adaptive layout is applied to the characters in the text area, the terminal device may display the characters according to a preconfigured typeface, or according to the typeface of the recognized characters.

If the content of the displayed image includes both a text area and a graphic area, i.e., the displayed image is an image with both text and graphic, in one embodiment, the terminal device may perform layout rearrangement and display the characters in the text area and the graphic area according to a text surrounding mode, an alignment mode, a relative position with respect to text of each graphic area, the size of the currently displayed view and paragraph information of each paragraph in the text area. In addition, the user may also change the position relationship between the graphic area and the text area through dragging the graphic area.

If the text area in the displayed image includes columns or has an irregular area, in one embodiment, the character recognizing result obtained via the character recognition of the displayed image further includes column information. The terminal device may separate the columns in the text area according to the position of each column or the position of the irregular area in an order of from left to right, from up to bottom, and displays the characters in sequence with adaptive layout.

2) Applying Adaptive Layout to the Note Information

If adaptive layout is applied to the content of the displayed image, the adaptive layout may also be applied to the note information associated with the displayed image.

If the note is of a non-character type, such as underline, wavy line, dotted line, etc., the relative position of the note information with respect to the content of the displayed image may be the relative position of each trajectory point of the note with respect to the displayed image. The relative position of the trajectory point with respect to the content includes the paragraph number of the paragraph where the trajectory point is located, the line number of the line where the trajectory point is located, related characters, distance from the characters, etc. In this situation, when adaptive layout is applied, the terminal device may determine the relative position of each trajectory point with respect to the content of the displayed image after the adaptive layout is applied according to the character recognizing result (layout information and character information) of the displayed image after the adaptive layout is applied and the relative position of each trajectory point with respect to the content of the displayed image before the adaptive layout is applied, so as to display the note information with the adaptive layout according to the relative position. The distance between each trajectory point in the note and the characters in the displayed image may be adjusted according to information such as the font size of the characters in the displayed image after the adaptive layout is applied and line gap. If the font size and line gap of the characters in the displayed image increase after the adaptive layout is applied, the distance between each trajectory point in the note and the characters in the displayed image is increased accordingly.

If the note is a triangle, a star, a star symbol, etc., and the terminal device takes the corresponding picture as the content of the note, the relative position of the note information with respect to the content of the displayed image may be the position of the corresponding picture in the content of the displayed image. When adaptive layout is applied to the note information, the terminal device may determine the position of the corresponding picture in the content of the displayed image after the adaptive layout is applied according to the character recognizing result of the displayed image after the adaptive layout is applied and the position of the corresponding picture in the content of the displayed image before the adaptive layout is applied, so as to display the corresponding picture according to the position. The size of the corresponding picture may be adjusted according to information such as font size, line gap of the characters in the displayed image after the adaptive layout is applied. For example, if the font size and line gap of the characters in the displayed image after the adaptive layout is applied increase, an enlarging operation is applied to the corresponding picture.

Figure 16C:
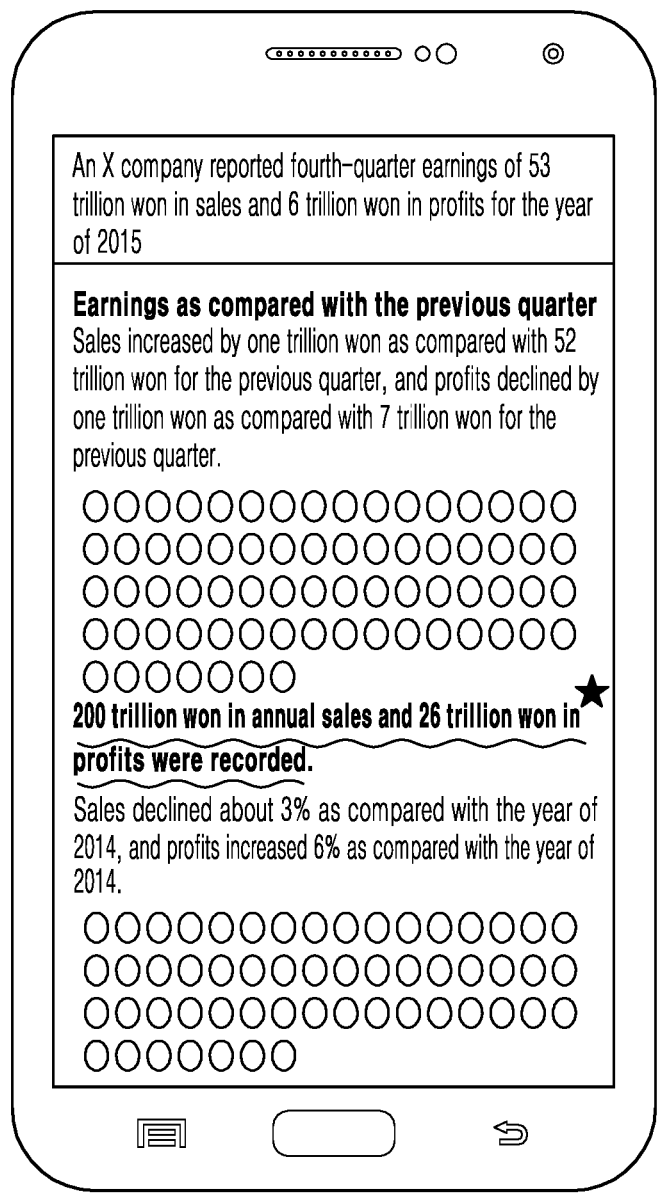
FIGS. 16C and 16E are schematic diagrams illustrating the note information made by the user before adaptive layout is applied to the displayed image according to the sixth embodiment of the present disclosure.
Figure 16D:
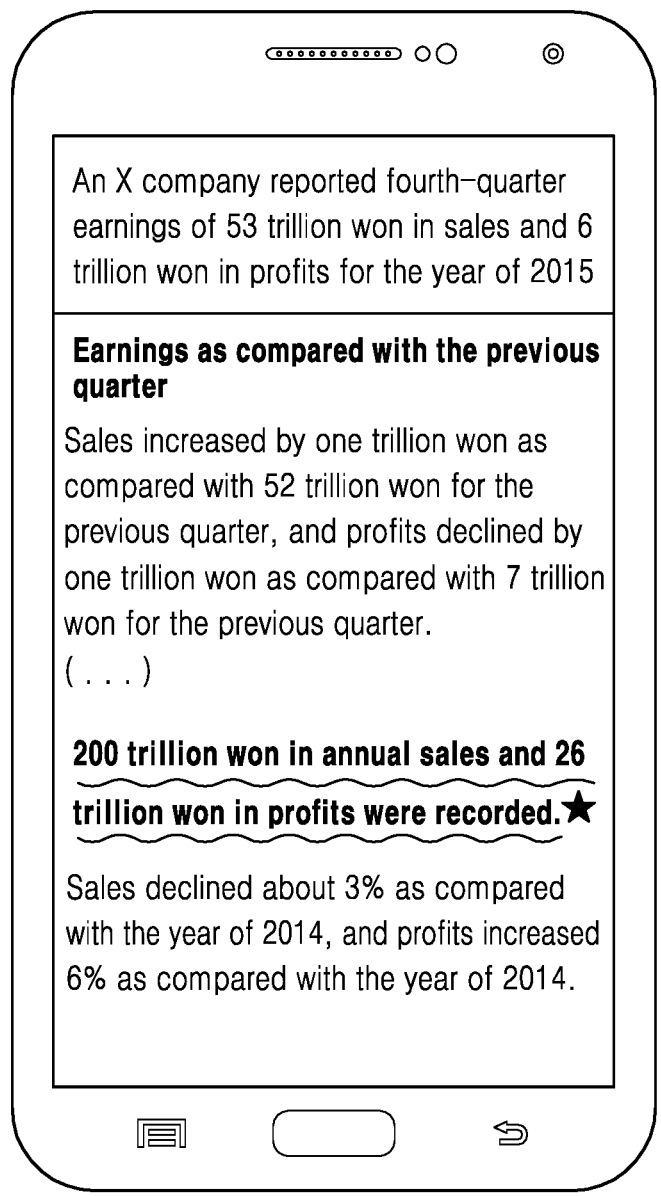
FIGS. 16D and 16F are schematic diagrams illustrating the applying of the adaptive layout to the displayed image and the note information according to the sixth embodiment of the present disclosure.

As shown in FIG. 16C, it is a schematic diagram illustrating the note information made by the user before adaptive layout is applied to the displayed image. After the terminal device applies the adaptive layout to the content of the displayed image, the coordinates of each character in the content of the displayed image are changed. Thus, the position of each trajectory point in the wavy line drawn by the user in the displayed image also changes. In addition, the position of the star symbol in the content of the displayed image changes accordingly. The terminal device determines relative position of each trajectory point in the wavy line with respect to the content of the displayed image and the position of the star symbol in the content of the displayed image after the adaptive layout is applied according to the character recognizing result of the displayed image after the adaptive layout is applied. FIG. 16D is a schematic diagram illustrating an example in which the adaptive layout is applied to the displayed image and the note information. It can be seen from FIG. 16D that, after the adaptive layout is applied to the content of the displayed image, the adaptive layout is also applied to the note information.

If the distance between adjacent trajectory points is relative large (e.g., larger than a predefined distance threshold) after the adaptive layout is applied to the note information, in order to smooth the lines of the note, the terminal device may insert several trajectory points between adjacent trajectory points according to an interpolation algorithm and connect the trajectory points in turn to obtain the note information after the adaptive layout is applied.

If the note is of a character type, e.g., annotation, and the characters are handwritten characters of the user, the relative position of the note information with respect to the content of the displayed image may also be the relative position of each trajectory point of the note with respect to the content of the displayed image. The content of the annotation is generally located in a blank area of the displayed image. Therefore, the terminal device may obtain the size of the blank area around the note according to the character recognizing result of the displayed image after the adaptive layout is applied, and determine the relative position of each trajectory point with respect to the content of the displayed image after the adaptive layout is applied according to the size of the blank area and the relative position of each trajectory point with respect to the content of the displayed image before the adaptive layout is applied, so as to display the note information after the adaptive layout is applied according to the relative position.

Figure 16E:
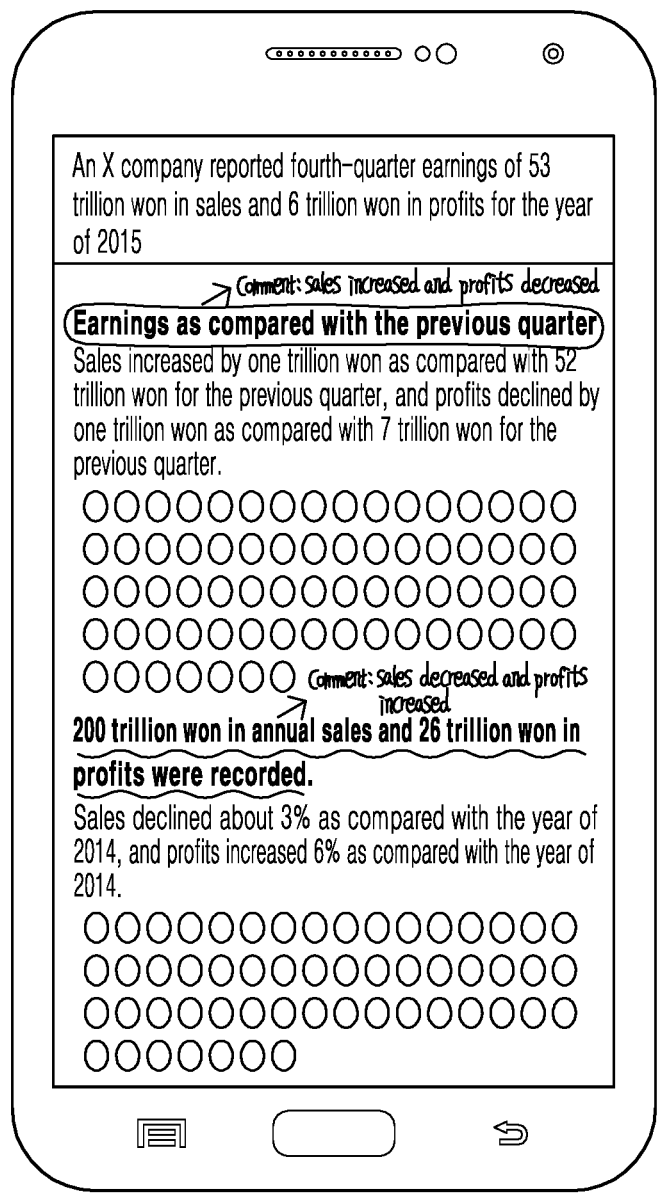
Figure 16F:
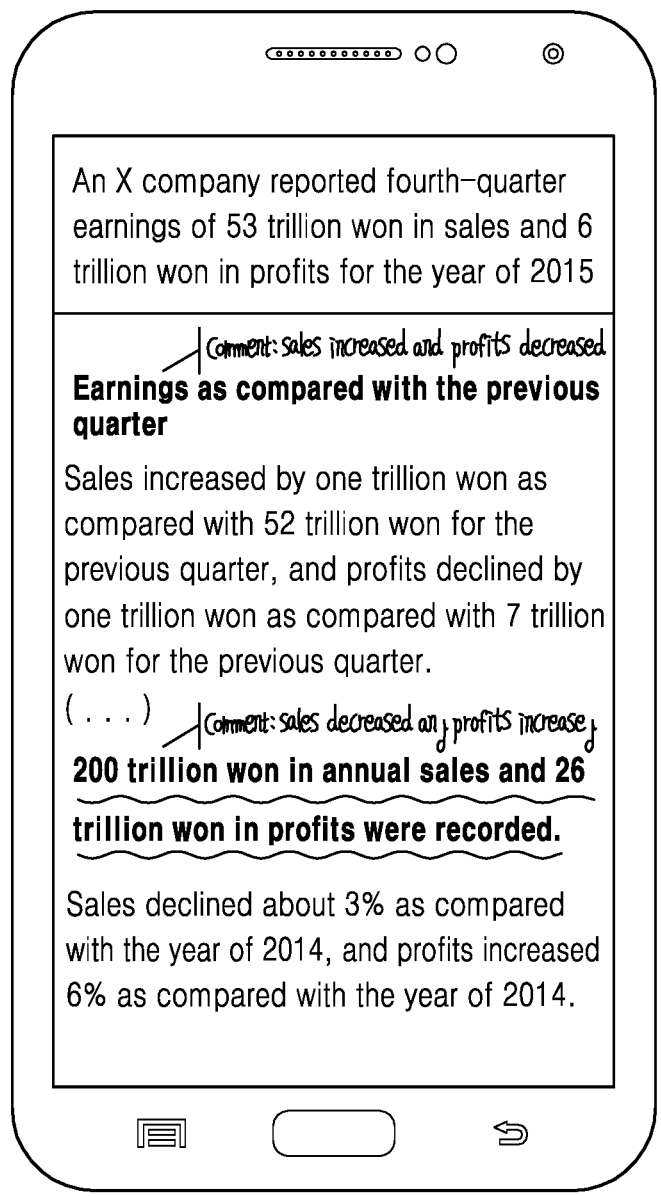

FIG. 16E is a schematic diagram illustrating the note information made by the user before the adaptive layout is applied to the displayed image. FIG. 16F is a schematic diagram illustrating the displayed image and the note information after the adaptive layout is applied.

Figure 16G:
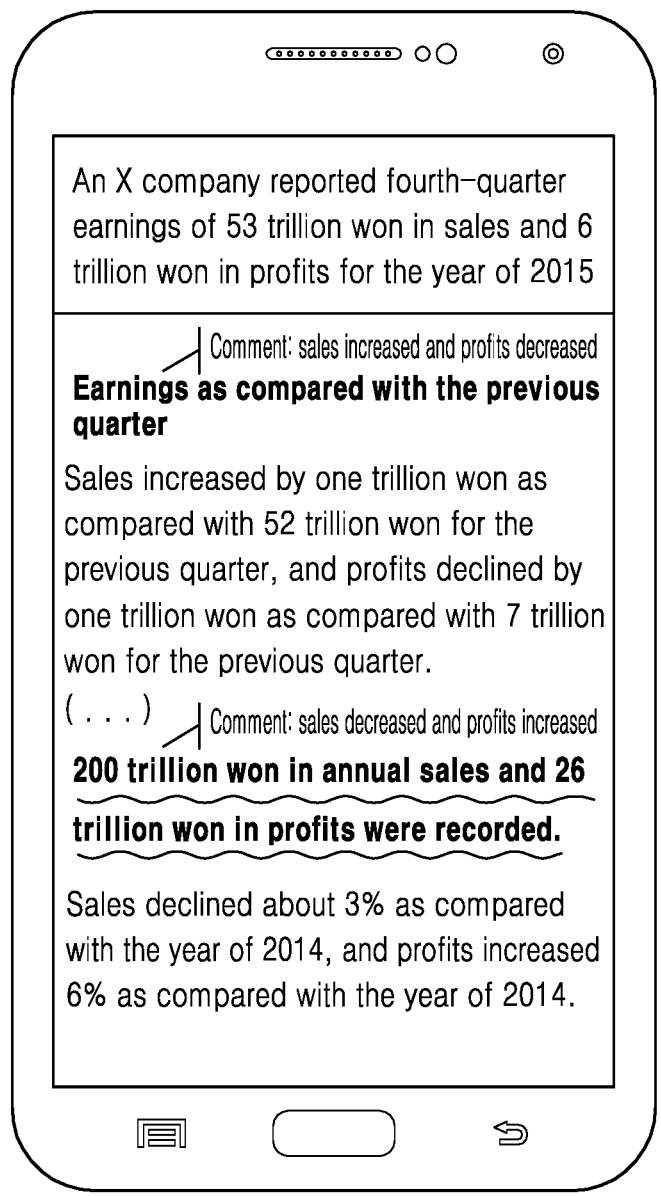
FIG. 16G is a schematic diagram illustrating the applying of the adaptive layout to the displayed image and the note information after the handwritten characters are converted to printed characters according to the sixth embodiment of the present disclosure.

In addition, when adaptive layout is applied to the note, the terminal device may recognize the content of the handwritten characters inputted by the user, and converts the handwritten characters into printed characters in a typeface supported by the system, and adaptively displays the converted printed characters in the blank area. As shown in FIG. 16G, it is a schematic diagram illustrating an example in which the adaptive layout is applied to the displayed image and the note information after the handwritten characters are converted into the printed characters.

If the note is of a character type, e.g., annotation, and the characters are non-handwritten characters, e.g., printed characters inputted by the user via an inputting function provided by the system or printed characters converted from handwritten characters, the relative position of the note information with respect to the content of the displayed image may be coordinates of each character in the content of the displayed image. The content of the annotation is generally located in the blank area in the displayed image. Therefore, the terminal device determines the size of the blank area around the note according to the character recognizing result of the displayed image after the adaptive layout is applied, and determines the coordinates of each character in the note after the adaptive layout is applied in the content of the displayed image according to the size of the blank area and the coordinates of each character of the note in the content of the displayed image before the layout is applied. In addition, the font size of each character in the note after the adaptive layout is applied is determined according to the size of the blank area and the font size of the character in the displayed image after the layout is applied, so as to display the note information after the adaptive layout is applied according to the font size and coordinates of each character of the note in the content of the displayed image after the adaptive layout is applied.

If the displayed image contains traceable handwritten note, the note may be already existed in the displayed image, but not made by the user. The note may be needless for the user, or merely a part of the note is required by the user, or the existing notes are in a mess, all of these affect normal reading of the user. In the above situations, the user may want to have a clean document with merely desired note. In the sixth embodiment of the present disclosure, the terminal device may perform character recognizing and handwritten recognizing to the displayed image to recognize existing note. The terminal device may save the recognized note information and the displayed image in association, and saves the relative position of the note information with respect to the content of the displayed image. Later, the user may perform operations such as zooming, editing, highlighting and adjusting layout of the note to the recognized note information on the displayed image.

If the existing note is completely needless for the user, the note on the displayed image may be erased through a one-key erasing function provided by the terminal device. The terminal device may replace the pixels of the content of the note with a background image of a document. In addition, the user may erase merely a part of content of the note. After the user selects the content of the note to be erased, the erasing is performed via the erasing function provided by the terminal device. The pixels of the erased content may be replaced by the background image of the document.

If the user desires to have a clean document containing no note, the terminal device may hide the note information after receiving a note hiding instruction of the user, and displays the note information after receiving a note displaying instruction of the user.

If the existing notes are in a mess, the terminal device may provide a virtual button on the UI for converting the handwritten characters into printed characters. When the user clicks the virtual button, the terminal device converts the recognized handwritten characters into printed characters.

It can be seen from the above that, the user may see a clean document with required note content through applying the adaptive layout to the existing note in the displayed image, which greatly improves the reading experience of the user.

2. Applying Adaptive Layout with Respect to Zooming Operation

When zooming (zoom-in/zoom-out) an image, the related art is only able to perform proportionally zooming at the pixel level and relies much on the pixel size of the image. On the other hand, if the image is large and the characters in it are small, the user needs to zoom in the image. However, when zooming operation is performed, the whole image is enlarged. The user has to drag the image back and forth to view the whole content of the image, which is very inconvenient. In the sixth embodiment of the present disclosure, the terminal device may perform character recognition (such as OCR recognition) to the displayed image, and apply adaptive layout to the character recognizing result. When the user performs the zooming operation, since the codes of the characters have been obtained, the zooming of the characters are not the zooming of the pixels, but realized by changing the font size of the characters and automatic word wrap, which avoids dragging the image back and forth. The complete content may be read merely through scrolling the image up and down, which is not restricted by the resolution of the image.

In the sixth embodiment of the present disclosure, the object of the zooming operation may be the whole content of the image, i.e., whole content zooming. The object of the zooming operation may also be designated information. At this time, the terminal device merely performs zooming towards the designated information and the size of other contents remains unchanged.

The designated information includes at least one of the following.

note information;

content related to the note information in the content of the displayed image; and content in a designated area or in a designated type in the note information and the content of the displayed image.

The content related to the note information is the content corresponding to the note information. For example, "current smart phone usually adopts touch screen techniques" is underlined, the content related to the underline is "current smart phone usually adopts touch screen techniques".

1) Whole Document Zooming

When the whole document zooming is performed, if the displayed image has associated note information, a corresponding adaptive layout needs to be applied to the note information.

If the note is of a non-character type, e.g., underline, wavy line, dotted line, etc., after the terminal performs a whole document zooming operation, the position and font size of the characters in the displayed image change. At this time, the terminal device may determine relative position of each trajectory point with respect to the content of the displayed image after the zooming according to the character recognizing result of the displayed image after the zooming and the relative position of each trajectory point with respect to the content of the displayed image before zooming, so as to display the note information after the adaptive layout is applied according to the relative position. The distance between each trajectory point in the note and the characters in the displayed image is adjusted according to the font size and line gap of the characters in the displayed image after the zooming. For example, if the font size and the line gap of the characters in the displayed image increase after the zooming, the distance between each trajectory point and the characters in the displayed image is increased accordingly.

If the note is a triangle, a star, or a star symbol, etc., and the terminal device takes the corresponding picture as the note content, the terminal device may determine the position of the picture in the content of the zoomed image according to the character recognizing result of the zoomed image and the position of the picture in the content of the displayed image before zooming, so as to display the image according to the determined position. The size of the picture may be adjusted according to information such as font size and line gap of the characters in the displayed image after zooming.

If the note is of a character type, e.g., annotation, and the characters are handwritten characters of the user, the terminal device may determine the size of the blank area around the note according to the character recognizing result of the displayed image after zooming, and determine the relative position of each trajectory point with respect to the content of the displayed image after zooming according to the size of the blank area and the relative position of each trajectory point with respect to the content of the displayed image before zooming, so as to display the note information after the adaptive layout is applied according to the relative position. When the terminal device applies adaptive layout to the handwritten characters, automatic word wrap may be realized in the blank area.

If the note is of a character type, e.g., annotation, and the characters are not handwritten characters, the terminal device may determine the size of the blank area around the note according to the character recognizing result of the displayed image after zooming, and determine the coordinates of each character in the content of the displayed image after zooming according to the size of the blank area and the coordinates of each character in the displayed image before zooming. In addition, the font size of each character in the note after the adaptive layout is applied may also be determined according to the size of the blank area and the font size of the characters in the displayed image after zooming. As such, the note information after the adaptive layout is applied may be displayed according to the coordinates and font size of each character of the note in the displayed image after the adaptive layout is applied. When the terminal device applies adaptive layout to non-handwritten characters, automatic word wrap in the blank area is realized.

2) Zooming with Respect to Note Information

If the note is of a non-character type, e.g., underline, wavy line, dotted line, etc., the zooming of the note information performed by the terminal device may be regarded as corresponding increase or decrease to the line thickness of the note.

If the note is triangle, star, star symbol, etc., and the terminal device takes the corresponding picture as the note, the zooming of the note information performed by the terminal device may be regarded as the zooming operation to the corresponding picture.

If the note is of a character type, e.g., annotation, and the characters are handwritten characters of the user, the zooming of the note information performed by the terminal device may be regarded as a zooming operation to the handwritten characters in the blank area, and automatic word wrap is performed to the handwritten characters to be adaptive for the blank area. The terminal device determines the size of the blank area around the note according the character recognizing result of the displayed image, and determines the relative position of each trajectory point with respect to the content of the displayed image according to the size of the blank area, the zooming level of the zooming instruction and the relative position of each trajectory point with respect to the content of the displayed image before zooming, and displays the note information according to the relative position, so as to realize the zooming of the note information.

If the note is of a character type, e.g., annotation, and the characters are non-handwritten characters, the zooming of the note information performed by the terminal device may be regarded as zooming of the font size of the characters with automatic word wrap to the characters to be adaptive for the blank area. The terminal device determines the font size of each character after the zooming according to the zooming level indicated by the zooming instruction and the font size of each character in the note before the zooming. In addition, the coordinates of each character of the note after the zooming in the content of the displayed image are determined according to the size of the blank area and the coordinates of each character in the note in the content of the displayed image before the zooming. The note information is displayed according to the determined relative position and the font size of the character, so as to realize the zooming of the note information.

In the sixth embodiment, the terminal device may perform zooming to the complete note information, i.e., after the user triggers the zooming instruction via a gesture, voice or button, the terminal device performs the zooming operation to all of the note information in the displayed image.

In addition, the terminal device may also perform zooming operation to note information in a designated type or designated note information. For example, the terminal device may perform zooming operation to all annotations in the note information, or perform zooming operation to a particular annotation.

3) Zooming of Content Corresponding to the Note Information

The terminal device may perform zooming operation to the content related to the note information. The zooming operation may be performed to the content related to all of the note information, or the content related to the note information of a designated type, or content related to the designated note information. For example, the terminal device may perform the zooming operation to all underlined text, or to characters corresponding to a particular underline.

Figure 17A:
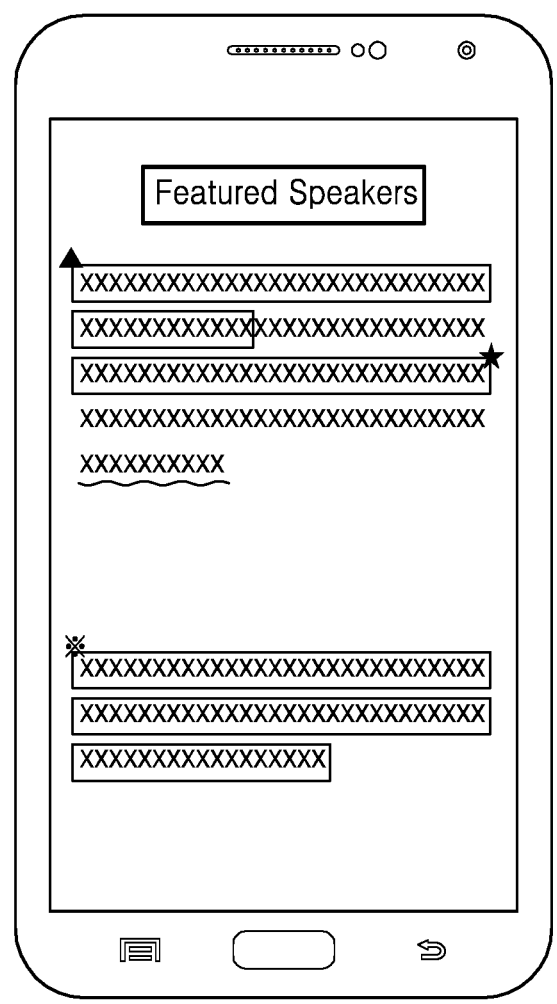
FIG. 17A is schematic diagrams illustrating the note information made by the user before a zooming operation according to the sixth embodiment of the present disclosure.
Figure 17B:
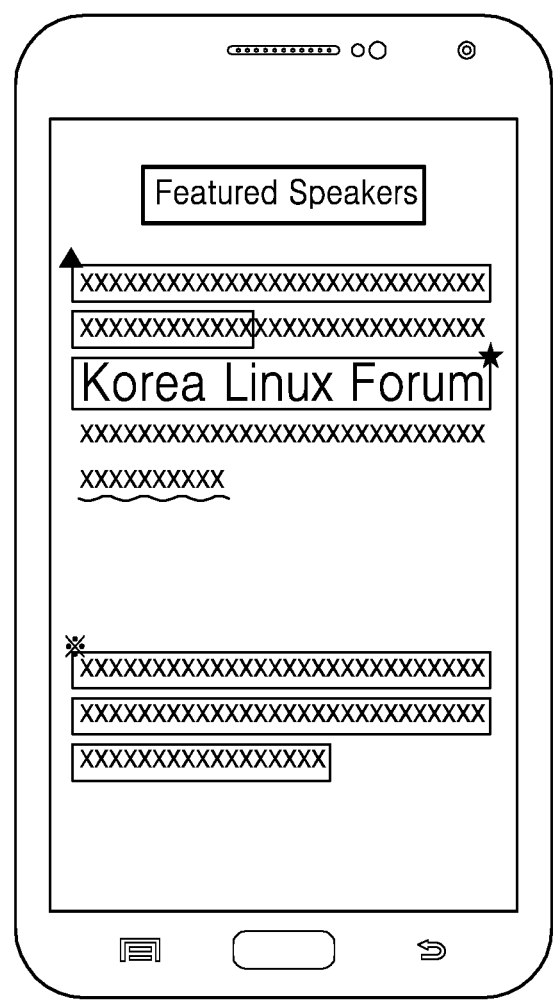
FIG. 17B is a schematic diagram illustrating a zooming operation with respect to content related to a star symbol, according to a sixth embodiment of the present disclosure.
Figure 17C:
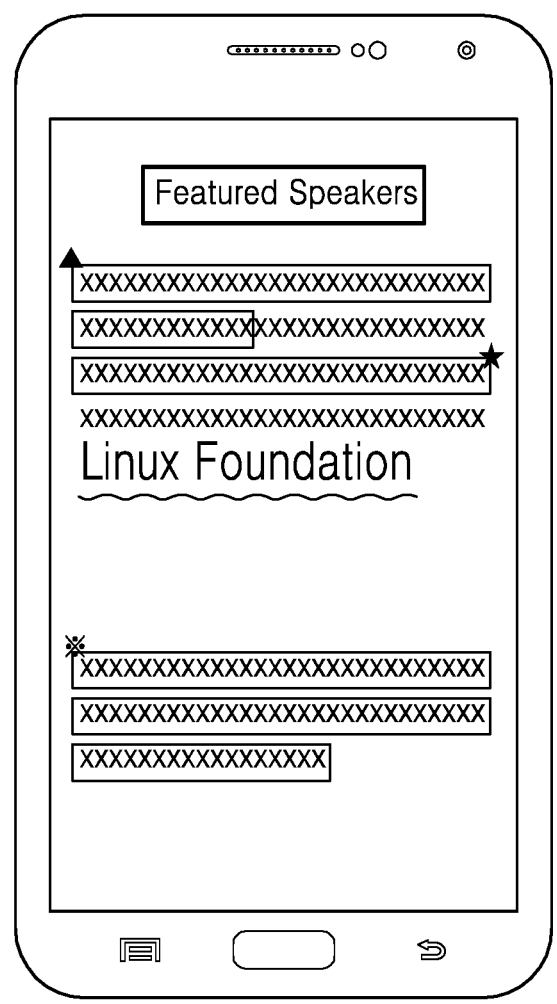
FIG. 17C is a schematic diagram illustrating an example in which a zooming operation is performed to the content related to the wavy line in FIG. 17A according to the sixth embodiment of the present disclosure.

FIG. 17A is schematic diagram illustrating the note information of the user before the zooming operation. FIG. 17B is schematic diagram illustrating the zooming operation performed by the user to the content related to the star symbol. FIG. 17C is a schematic diagram in which the user performs a zooming operation to the content related to the wavy line in FIG. 17A.

In the sixth embodiment of the present disclosure, when performing zooming towards the content related to the note information, the terminal device may apply corresponding adaptive layout to the note information. The manner for applying adaptive layout to the note information is similar to that when zooming is performed to the whole document and is not repeated herein.

4) Zooming of a Designated Area

The user may select a designated area in the note information and the content of the displayed image. Therefore, the terminal device may determine the designated area for performing the zooming operation. After receiving a zooming instruction of the user, the terminal device performs zooming to the content in the designated area and the size of other contents remains unchanged.

The method that the user selects the designated area is similar to the selection of the local area where the user desires to take note in the third embodiment and is not repeated herein.

After the designated area is determined, the terminal device may highlight the information in the designated area through manners such as adding background color or adding a frame. If the user finds that some contents he desires to select are not selected or some content that he does not want to select has been selected, the user may adjust the designated area through dragging the position of the frame of the designated area.

Figure 17D:
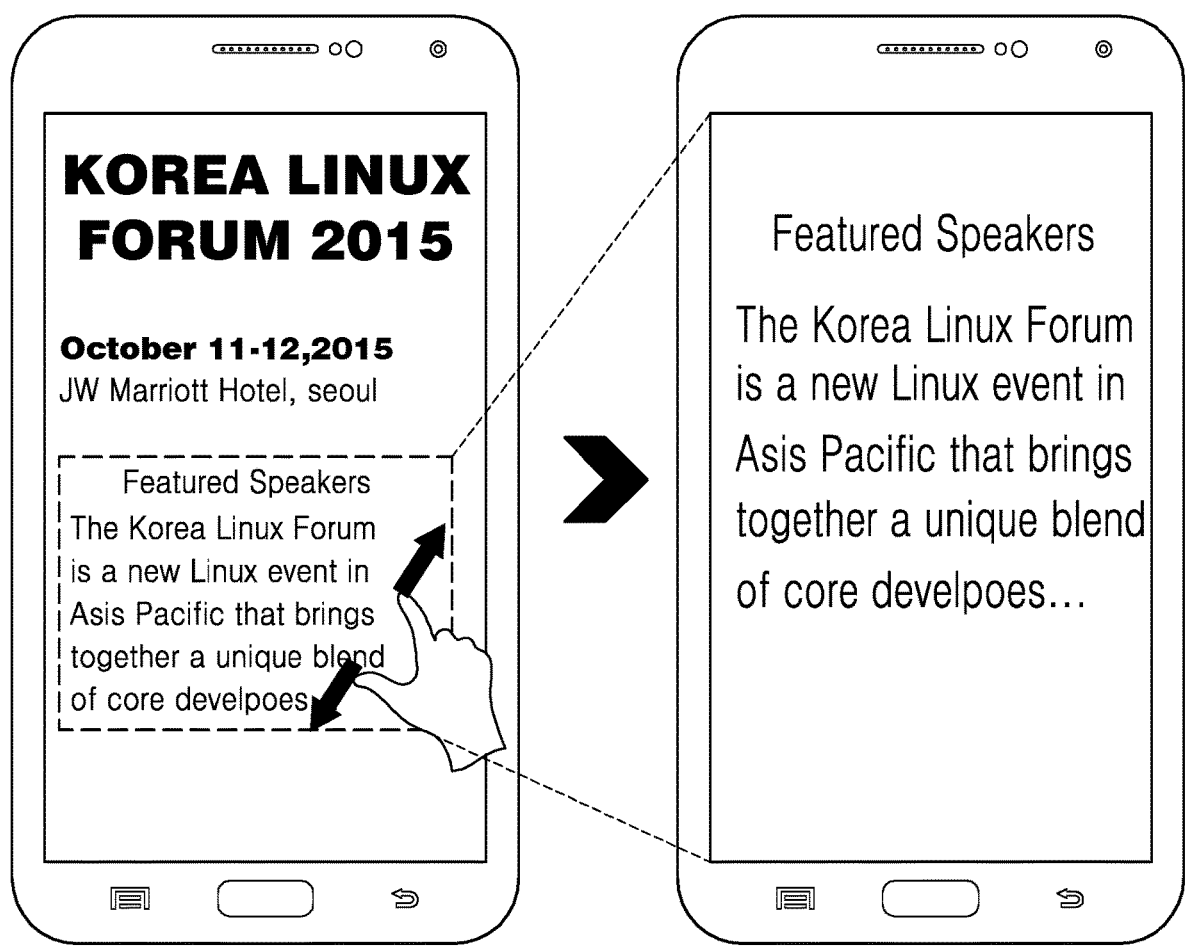
FIG. 17D is schematic diagram illustrating a zooming operation to a designated area by the terminal device according to the sixth embodiment of the present disclosure.

FIG. 17D is schematic diagram illustrating the zooming operation performed by the terminal device to the designated area.

In the sixth embodiment of the present disclosure, when the terminal device zooms the content in the designated area, if the user takes note in the designated area, adaptive layout may also be applied to the note information. The applying of the adaptive layout to the note information is similar to that during the whole document zooming and is not repeated herein.

Figure 17E:
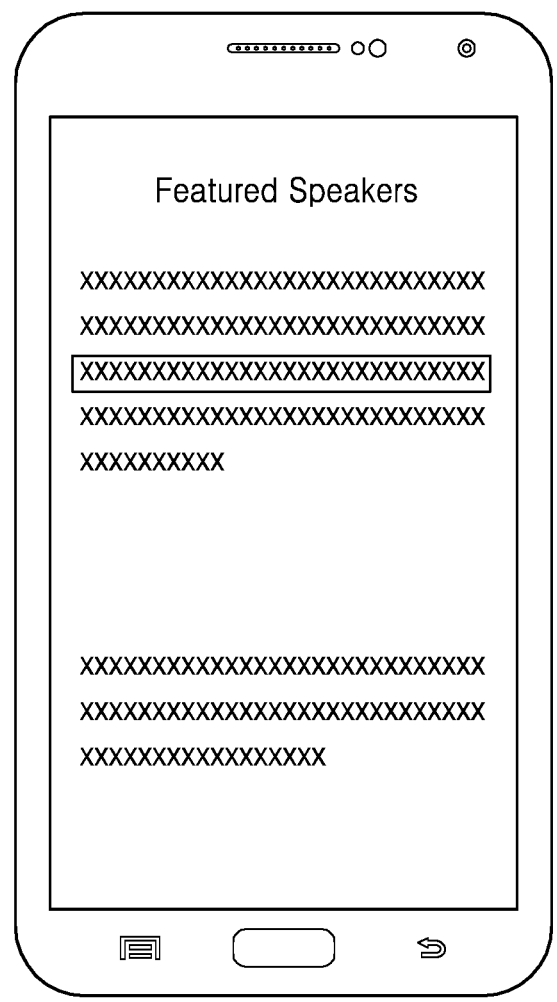
FIG. 17E is a schematic diagram illustrating the designated area selected by the user where a zooming operation is to be performed according to the sixth embodiment of the present disclosure.
Figure 17F:
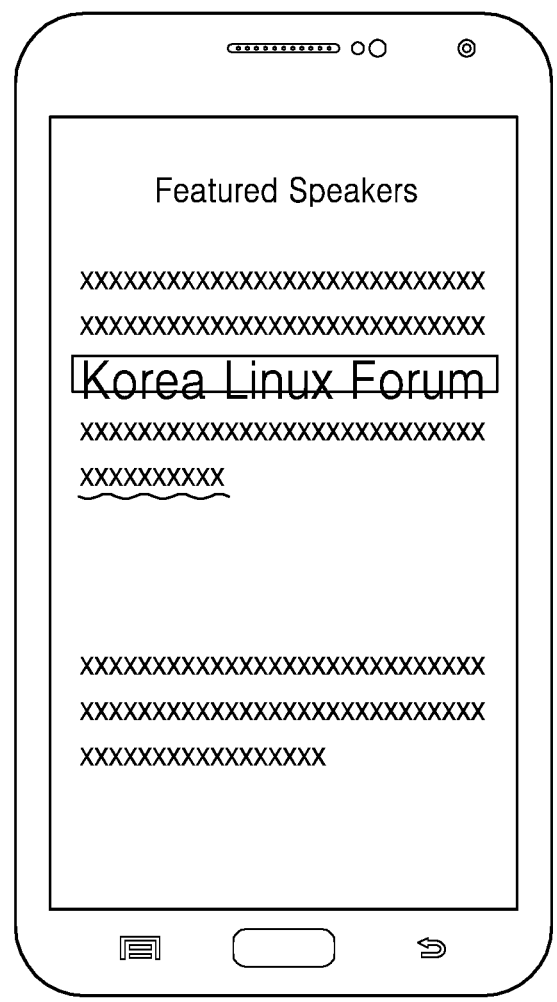
FIG. 17F is a schematic diagram illustrating a frame after a zooming operation to designated content according to the sixth embodiment of the present disclosure.
Figure 17G:
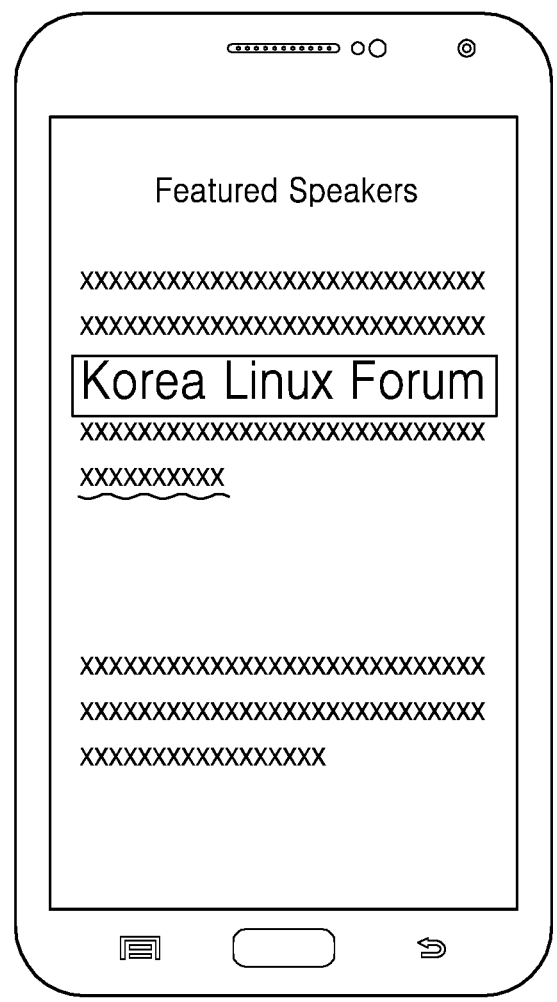
FIG. 17G is a schematic diagram illustrating an adjusted frame according to the sixth embodiment of the present disclosure.

In addition, after the terminal device performs zooming towards the content in the designated area, the frame of the designated area also requires corresponding adjustment. The terminal device adjusts the frame according to the content of the designated area after the zooming. FIG. 17E is a schematic diagram illustrating the designated area selected by the user for performing the zooming operation. FIG. 17F is a schematic diagram illustrating the frame after the designated content are zoomed. FIG. 17G is a schematic diagram illustrating the adjusted frame.

5) Zooming of the Content in a Designated Type

In the sixth embodiment of the present disclosure, the content in the designated type may be but is not limited to: content in a designated typeface, content in a designated format, a designated symbol, title, outline, table of contents, content appears with a relatively high frequency, text or graphic.

Through the character recognizing technique (such as OCR technique), the terminal device may automatic recognize the content in the designated typeface from the displayed image, such as content in boldface, italic content, etc., the terminal device may also recognize content in a designated format, e.g., content in different colors, content in large character font size, highlighted content, etc., the terminal device may also recognize designated symbol (such as quotation marks, book title mark), text, graphic, etc.

In the sixth embodiment of the present disclosure, for a document with standard layout, the terminal device may automatically retrieve the outline or table of contents. The terminal device may recognize a rough structure of the document such as title, subtitle, and key content according to information such as typeface, font size and alignment mode obtained through character recognizing to the displayed image. Through combining the above information, the outline or table of contents of the document can be obtained. The terminal device may associate the content of the document with the outline or table of contents.

Since the outline or table of contents is obtained, it is very convenient for the user when reading a displayed image with many characters. When reading the displayed image, the user may call out the outline or the table of contents at any time and select an interested part. The corresponding content may be displayed on the screen at once, which improves the user's reading efficiency and experience.

In addition, the terminal device may also recognize content appear with a high frequency in the displayed image (e.g., with a frequency higher than a preconfigured frequency threshold) via the character recognizing technique (e.g., OCR technique). The recognized content may be content the user focuses on and therefore may be taken as content in a designated type.

When the terminal device performs zooming towards the content in the designated type, if the user takes note to the content in the designated type, the adaptive layout may be applied to the note information. The applying of the adaptive layout to the note information is similar to that when performing zooming towards the whole document and is not repeated herein.

3. Adaptive Layout with Respect to Edit Operation

In the sixth embodiment of the present disclosure, after the terminal device performs character recognition (such as OCR recognition) to the displayed image, the user may perform edit operations such as cut, copy, paste and erase. The terminal device performs corresponding edit processing to the content according to the edit operation of the user.

When the user performs a copy operation, the terminal device copies the content to be copied selected by the user to a clipboard for subsequent paste operation.

When the user performs operations such as cut, paste and erase, since the content displayed by the terminal device is changed, the terminal device may perform layout rearrangement to the displayed content.

Figure 18A:
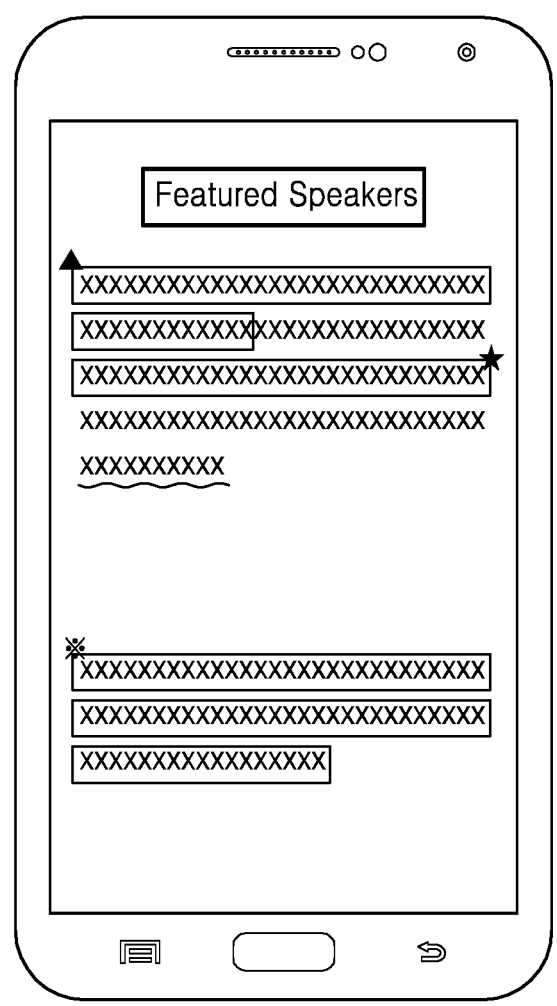
FIG. 18A is schematic diagram illustrating note information made by the user according to the sixth embodiment of the present disclosure.
Figure 18B:
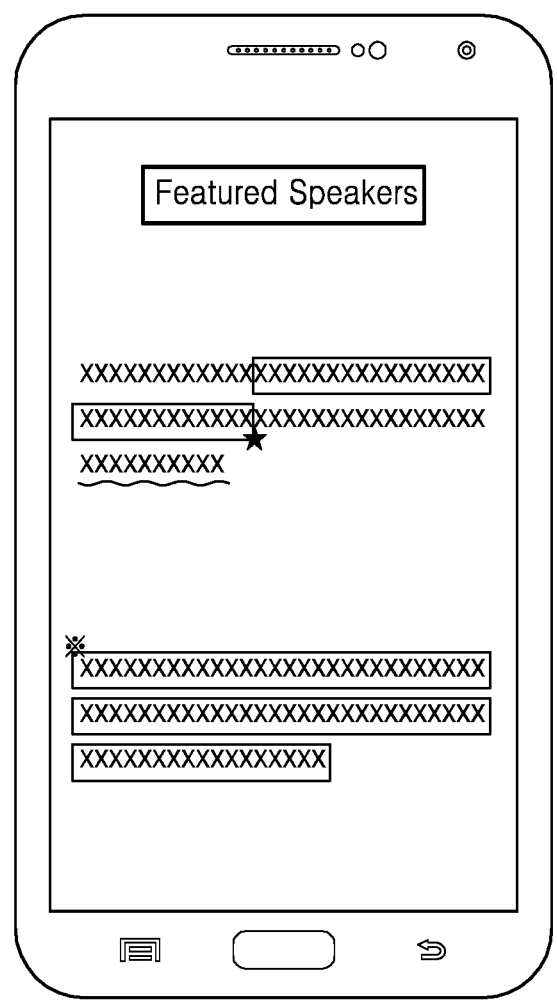
FIG. 18B is schematic diagram illustrating erasing of content related to the note information according to the sixth embodiment of the present disclosure.

In the sixth embodiment of the present disclosure, the terminal device may perform the edit operation to the above designated information. For example, FIG. 18A is schematic diagram illustrating the note information made by the user. As shown in FIG. 18B, the terminal device erases merely the content related to the note information of symbol "▲" in FIG. 18A.

When partial erasing is performed to the displayed content, the user may click an eraser button to transmit an eraser erasing instruction to the terminal device. After receiving the eraser erasing instruction, the terminal device determines the sliding trajectory of a slide operation if detecting the slide operation of the user on the screen, and erases the characters passed through by the slide trajectory from the text area, and re-arranges the layout and displays the remaining content.

Existing eraser erasing function with respect to images allows the user to directly erase in the image. The erased position becomes a blank area. However, in the sixth embodiment of the present disclosure, through re-arranging the layout after the erasing, the position of the erased characters are filled up by surrounding characters and no blank area is generated, which is more beautiful and it is more comfortable for the user to read.

4. Adaptive Layout Applied During Screen Rotation.

When the terminal device rotates the screen, the terminal device may determine the size of the current displayed view again according to the width of the screen after the rotation, and rearrange the content of the displayed image and display the content on the screen according to the newly-determined size of the current displayed view and the character recognizing result of the displayed image.

In an existing image displaying method, when the screen of the terminal device rotates, merely the displaying orientation of the image is changed. If the image is in a vertical type, whereas the screen is in the landscape mode, the image is displayed to have the height stretches to full screen in default. At this time, the size of displayed image is reduced, which is inconvenient for the user to read. In the sixth embodiment of the present disclosure, during the screen rotation, the size of the displayed image is determined again, and the displayed content are rearranged to be adaptive for the screen, which facilitates the reading of the user.

Figure 19A:
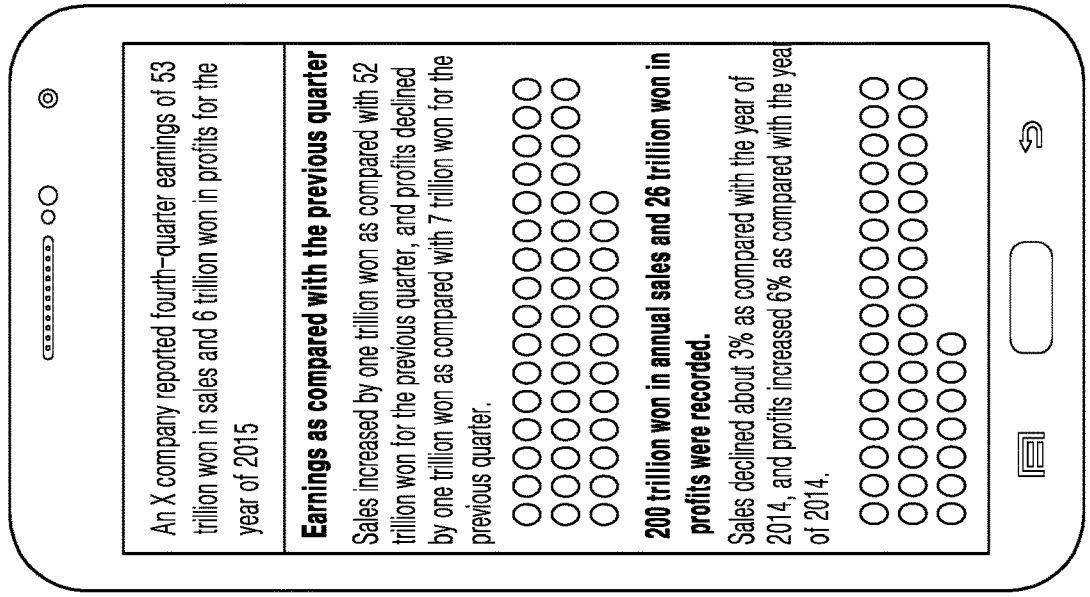
FIG. 19A is schematic diagram illustrating layout rearrangement during screen rotation according to the sixth embodiment of the present disclosure.
Figure 19A:
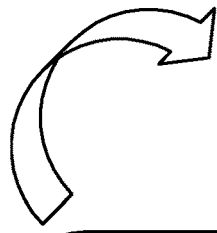

FIG. 19A is schematic diagrams illustrating layout rearrangement and displaying during screen rotation.

The user may change the portrait or landscape displaying mode of the screen through a rotation operation to the terminal device.

In the sixth embodiment of the present disclosure, if the displayed image is associated with note information, when the screen rotates, the position and size of the characters in the displayed image may change. Therefore, adaptive layout may be applied to the note information associated with the displayed image. The applying of the adaptive layout to the note information by the terminal device is similar to that applied to the note information according to the displayed view and is not repeated herein.

Figure 19B:
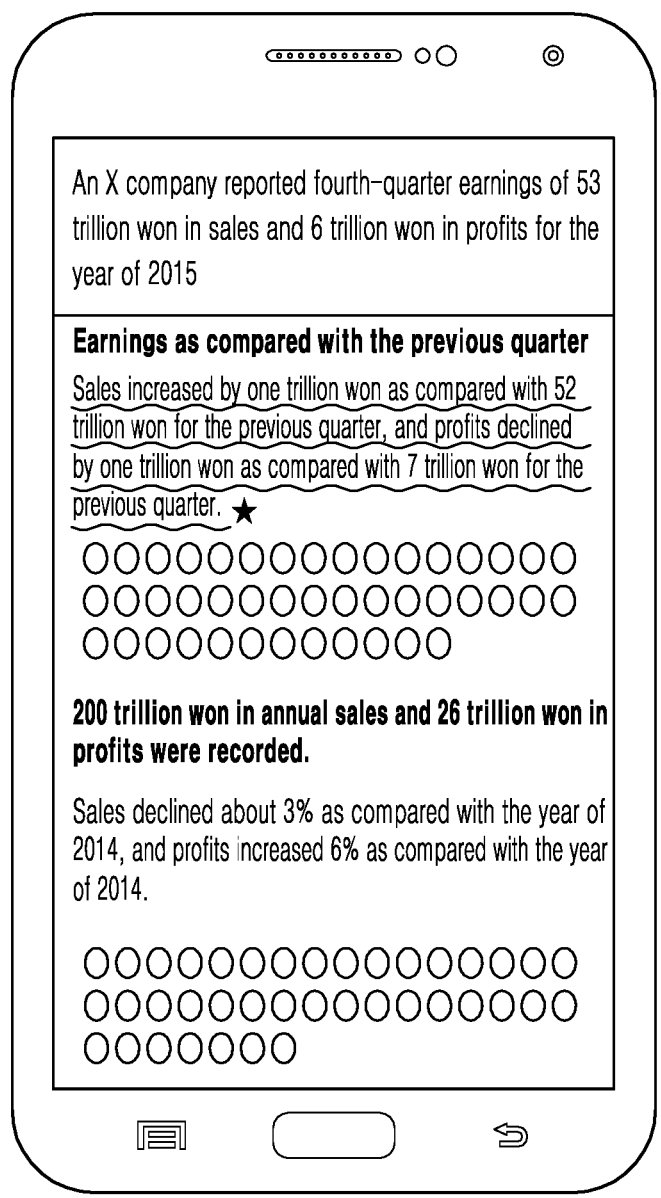
FIG. 19B is schematic diagram illustrating the note information made by the user before the rotation of the screen according to the sixth embodiment of the present disclosure.

FIG. 19B is schematic diagram illustrating the note information made by the user before screen rotation. FIG. 19C is schematic diagram in which adaptive layout is applied to the note information after the screen rotation.

2. Adjust Content According to the Note

If the displayed image is associated with note information, if the user wants to adjust the content of the displayed image according to the note, the content adjusting function may be enabled. After receiving a content adjusting instruction, the terminal device adjusts the content of the displayed image according to the note information, and displays the adjusted content after layout rearrangement.

The terminal device may adjust the content of the displayed image according to at least one of the following manners:

deleting content related to a delete symbol from the content of the displayed image;

inserting content to be inserted in a position indicated by an insertion symbol;

adjusting a position of the content related to a position adjustment symbol in the content of the displayed image; and highlighting the content related to a highlighting symbol in the content of the displayed image.

Figure 20A:
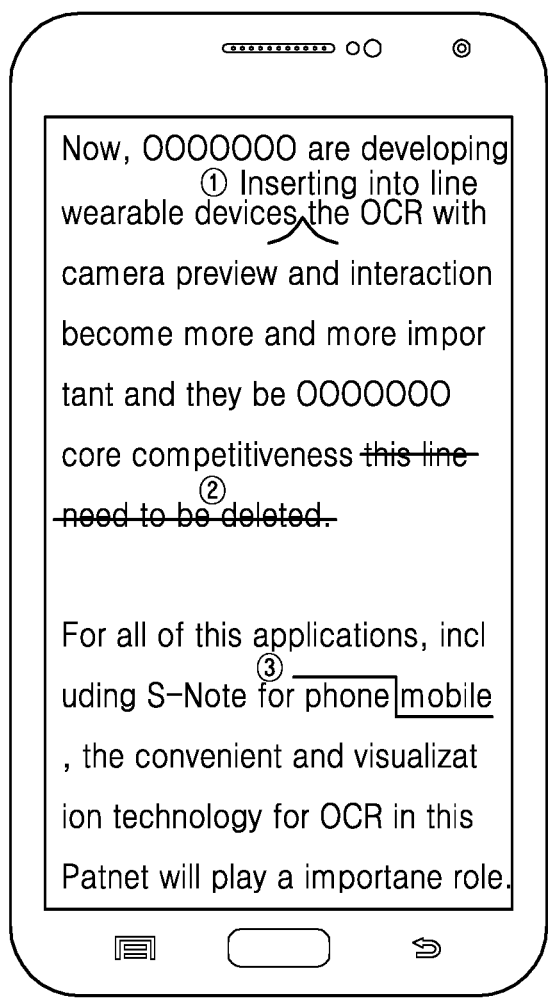
FIG. 20A is schematic diagram illustrating edit information made by the user according to the sixth embodiment of the present disclosure.
Figure 20B:
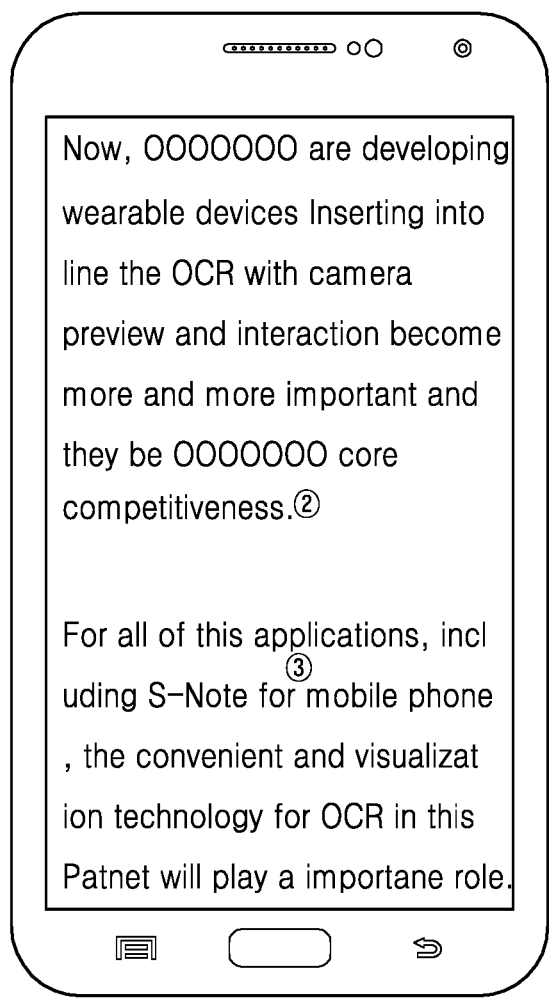
FIG. 20B is schematic diagram illustrating content adjusted according to the edit information according to the sixth embodiment of the present disclosure.

FIG. 20A is schematic diagram illustrating edit information of the user. The edit information ① includes an insertion symbol and inserted content. The edit information ② includes a deletion symbol, the edit information ③ includes a position adjustment symbol. If the user starts the content adjustment function, the terminal device may adjust the content of the image according to the above edit information, the content after the adjustment is as shown in FIG. 20B.

In view of the above, the user may adjust some messy note information and the displayed content into an expected displaying manner through adjusting the displayed content, which improves the experience for viewing the note information.

3. Highlighting

The terminal device may configure a highlighting function. When the user starts the highlighting function, the terminal device receives a highlighting instruction, and highlights designated information. The designated information includes at least one of:

note information;

content related to the note information in the content of the displayed image; and content in a designated area or content of a designated type in the note information and the content of the displayed image.

The terminal device may highlight all of the note information, the note information of the designated type or the designated note information after receiving the highlighting instruction. For example, when shooting a book in real time, the user adds annotation "this paragraph is very good" beside a paragraph. After receiving the highlighting instruction, the terminal device highlights the above annotation through a manner such as adding background color.

The terminal device may highlight content related to all of the note information, or content related to note information of a designated type, or content related to designated note information after receiving the highlighting instruction. For example, when shooting a book in real time, the user underlines a particular paragraph of characters. After receiving the highlighting instruction, the terminal device may highlight the underlined characters via a manner such as displaying with a highlighting color.

The terminal device may highlight content in a designated area after receiving the highlighting instruction. The user may select the designated area in the note information and the content of the displayed image. Subsequently, the terminal device may highlight the content in the designated area. The selection of the designated area is similar to the selection of the local area for taking note by the user in the third embodiment and is not repeated herein.

The terminal device may highlight content in a designated type in the note information and the content of the displayed image after receiving the highlighting instruction. The content in the designated type may be but is not limited to: content in a designated typeface, content in a designated format, designated symbol, title, outline, table of contents, content appears with a high frequency, text, graphic, etc.

The terminal device may highlight the above designated information via manners such as boldface, increased font size, displaying with highlighting color, background color, hiding information other than the designated information.

In the sixth embodiment of the present disclosure, the user may be interested in merely some key information in the note information and the content of the displayed image. At this time, the terminal device may display merely the designated information selected by the user, and hides information other than the designated information. For example, if the designated information selected by the user is text, the terminal device displays merely the text in the content of the displayed image after layout rearrangement according to the size of the currently displayed view and hides the graphics. For another example, if the designated information selected by the user is graphics, the terminal device may display merely the graphics in the content of the displayed image on the screen and hide the text. For still another example, the user writes a lot of notes on the displayed image. Sometimes, the user wants to see a clean document but does not need to view the note. At this time, the terminal device may hide the note information after receiving a hide note instruction of the user, and displays the note information after receiving a display note instruction from the user.

When the information other than the designated information is hid, the user may call out the hidden content at any time. For example, the terminal device may hide the other information via a folding hide manner. The user may unfold the hidden content at any time.

In addition, the terminal device may completely hide other information except for the designated information. If the other information except for the designated information includes graphic, the graphic may be processed to be semi-transparent or vogue and displayed under the designated information as a background.

Figure 21A:
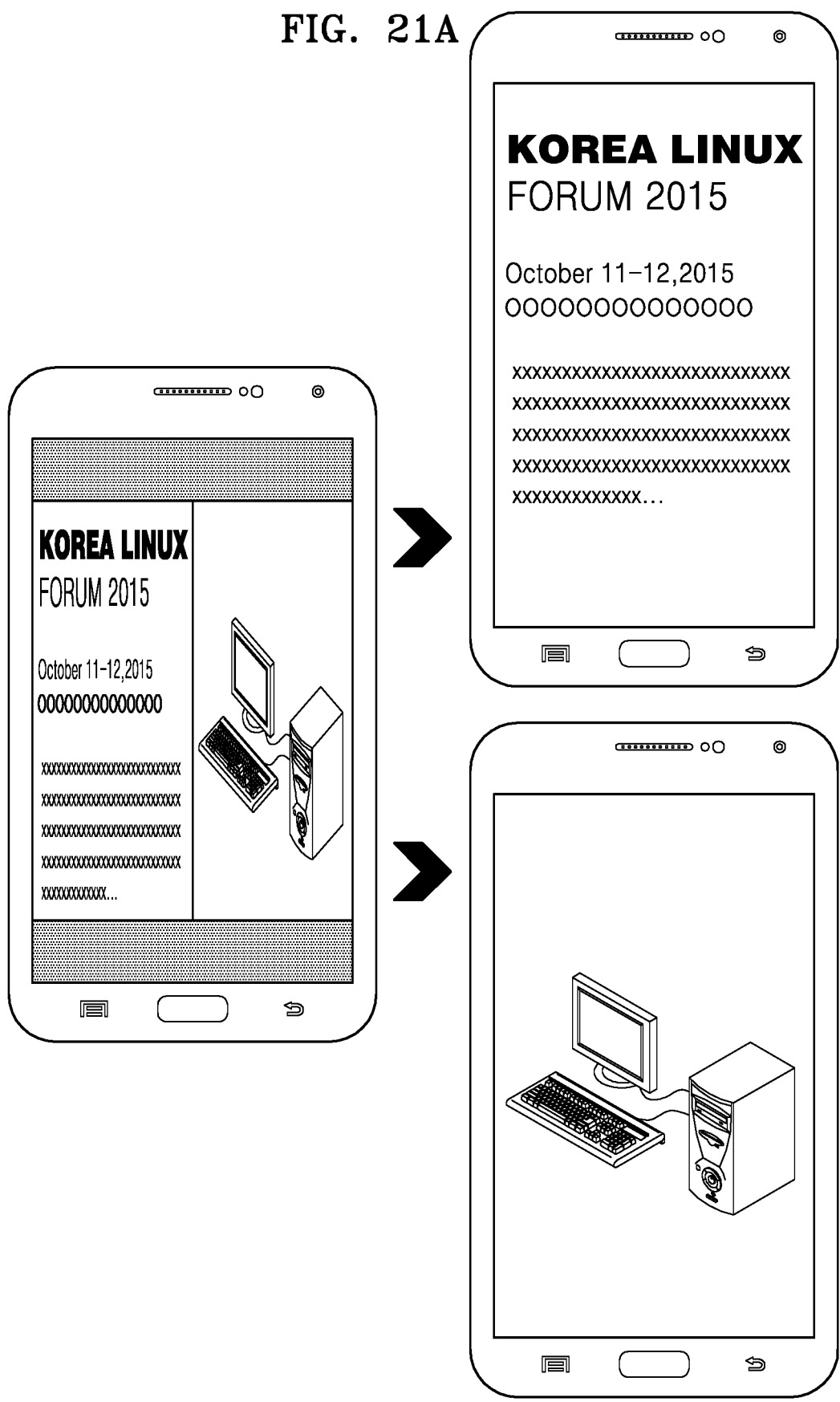
FIG. 21A is schematic diagram respectively illustrating an example in which merely characters or merely graphics are displayed according to the sixth embodiment of the present disclosure.

FIG. 21A is schematic diagram in which terminal device displays merely the text or merely the graphics.

Figure 21B:
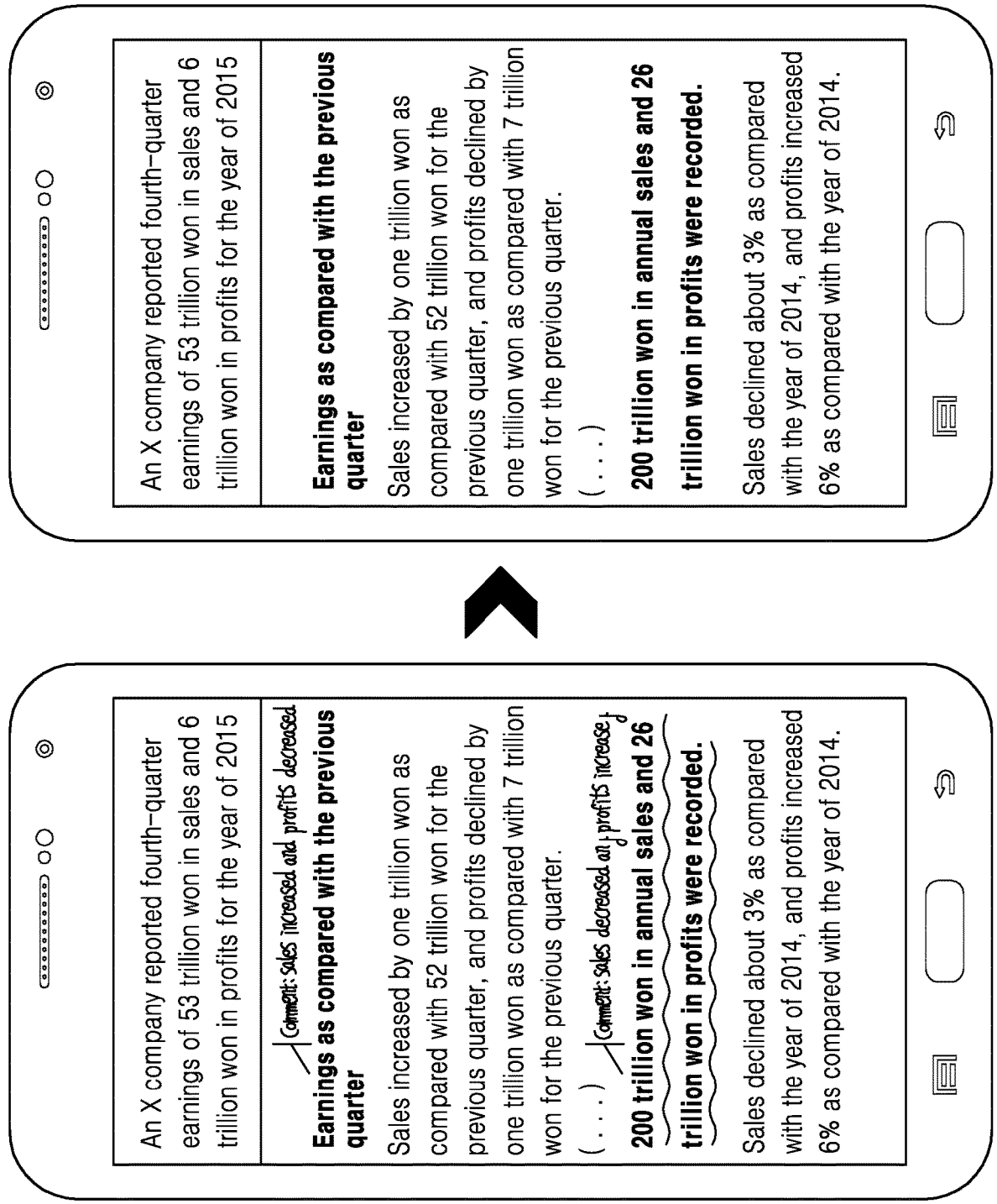
FIG. 21B is a schematic diagram illustrating hiding of an annotation according to the sixth embodiment of the present disclosure.

FIG. 21B is a schematic diagram in which the terminal device hides the annotation.

4. Adjust Content of the Note.

In the sixth embodiment of the present disclosure, when displaying the note information, the terminal device may adjust the note type of the note information according to a user's requirement. The user may firstly select the note information whose note type needs to be adjusted. The terminal device provides a virtual button on the UI for changing the note type. When the user clicks the virtual button, the terminal device provides virtual buttons corresponding to note types frequently used by the user determined according to statistics. The user selects a note type to be used and clicks the corresponding virtual button. The terminal device adjusts the note type of the note information according to the user's selection.

For example, the user draws a wavy line under a particular paragraph of characters. When the user wants to change the wavy line, the user may click the screen in the position where the wavy line is displayed. The terminal device provides virtual buttons for the user on the UI for changing the type of the note. When the user clicks the virtual button, the terminal device determines that the user wants to change the wavy line. Therefore, the terminal device provides virtual buttons corresponding to types of note obtained according to statistics to the user on the UI. The user selects a desired type according to his requirement and clicks the corresponding virtual button. The terminal device adjusts the type of the note according to the user's selection.

Figure 22A:
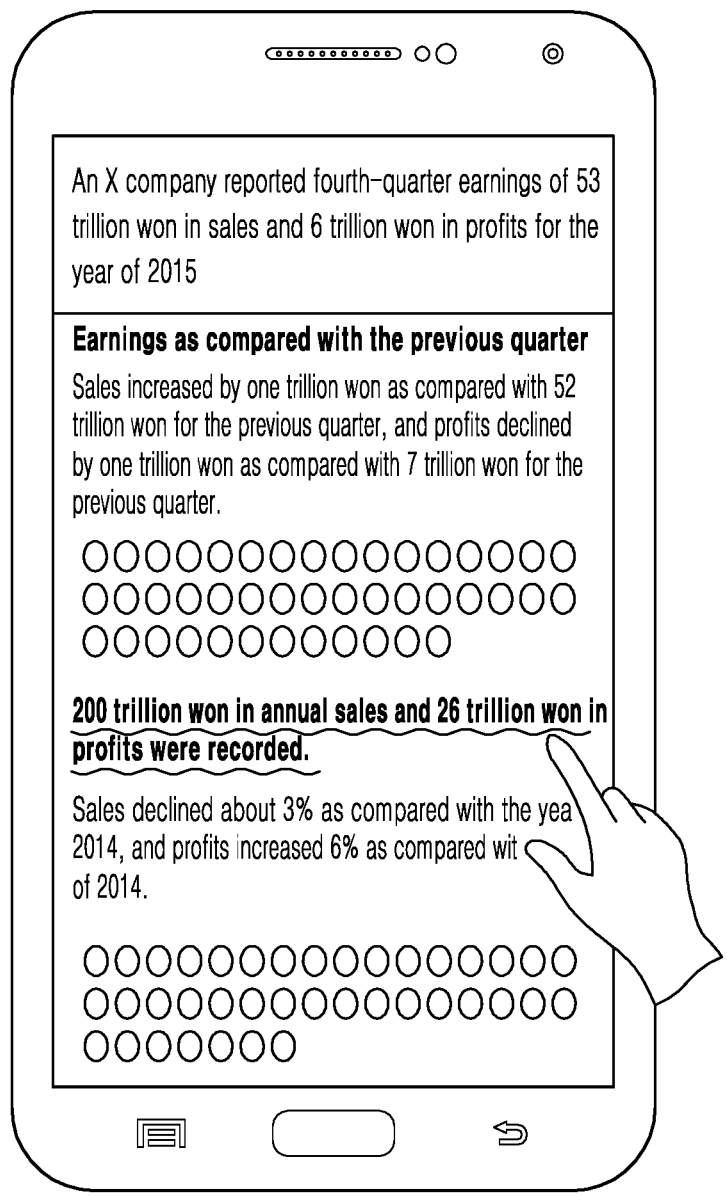
FIG. 22A is schematic diagram respectively illustrating an example in which the user selects the note information whose type is to be adjusted according to the sixth embodiment of the present disclosure.
Figure 22B:
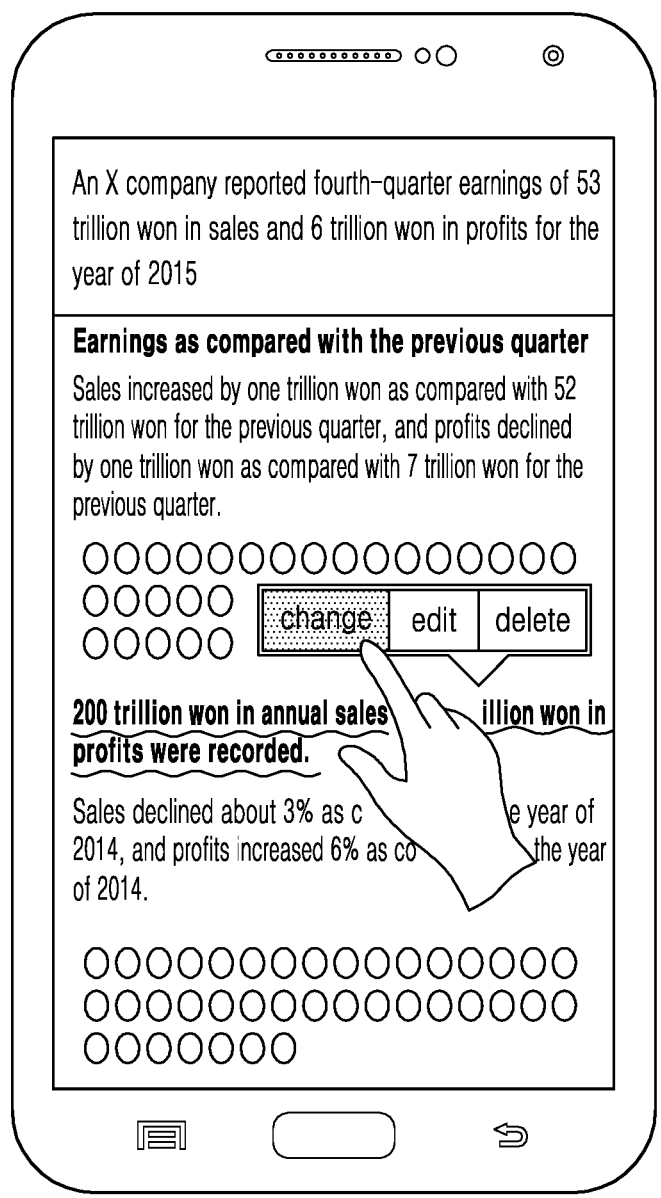
FIG. 22B is schematic diagram respectively illustrating an example in which the terminal device provides a virtual button to the user on a UI for changing the note type according to the sixth embodiment of the present disclosure.
Figure 22C:
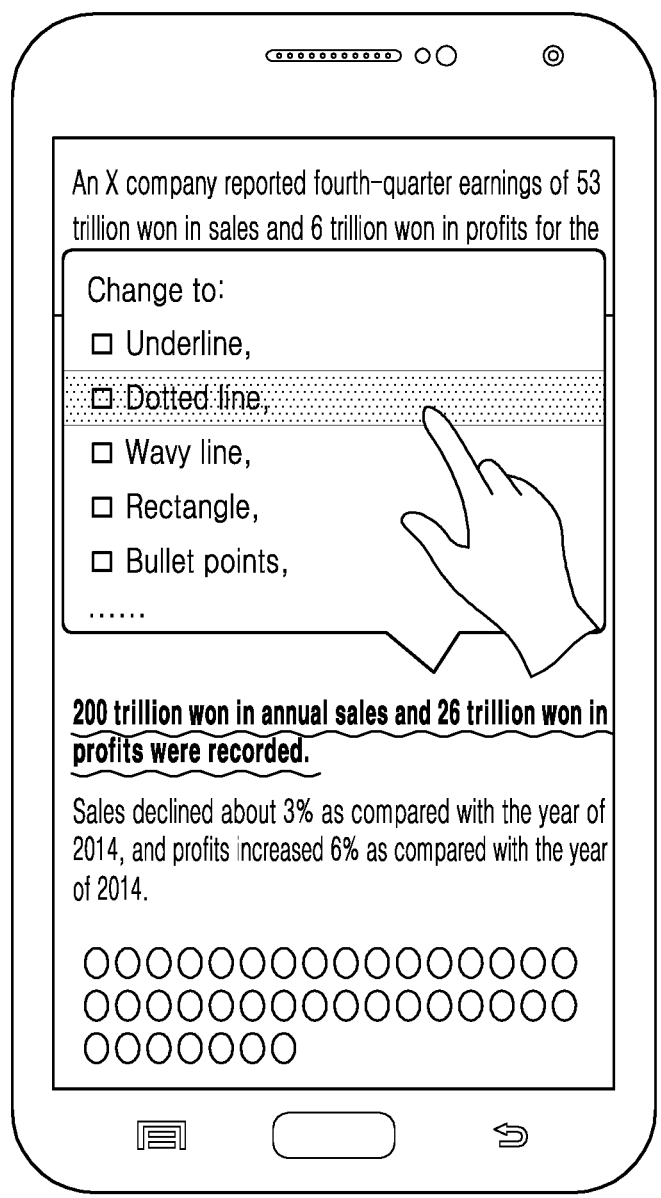
FIG. 22C is schematic diagram illustrating an example in which the terminal device provides the virtual buttons corresponding to the note type determined in advance according to statistics to the user on the UI according to the sixth embodiment of the present disclosure.
Figure 22D:
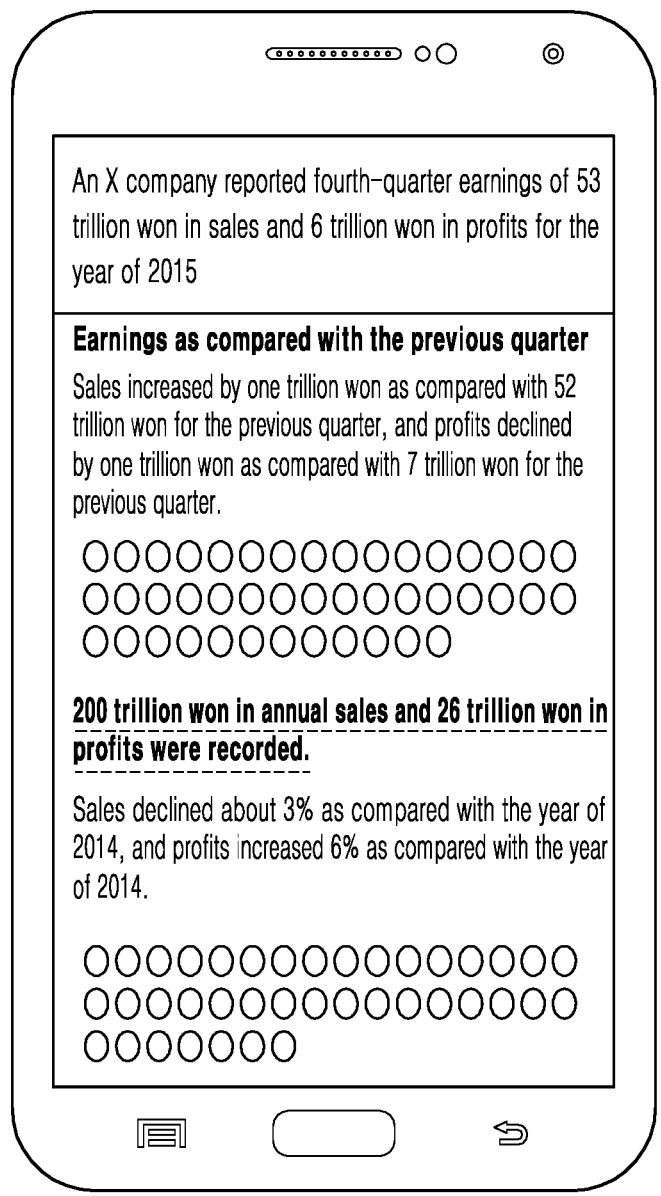
FIG. 22D is schematic diagram respectively illustrating an example in which the terminal device adjusts the note type of the note information according to the user's selection according to the sixth embodiment of the present disclosure.

As shown in FIG. 22A, the user selects the note information of which the user wants to change the note type. As shown in FIG. 22B, the terminal device provides a virtual button on the UI for changing the note type of the note. As shown in FIG. 22C, the terminal device provides virtual buttons corresponding to frequently used note types determined according to statistics to the user on the UI. As shown in FIG. 22D, the terminal device adjusts the note type of the note information according to the user's selection.

In the sixth embodiment of the present disclosure, the terminal device may also adjust the content related to the note information. The user may firstly select the note information whose content requires adjustment. The terminal device provides a virtual button for editing note information for the user on the UI. When the user clicks the virtual button, the terminal device provides virtual buttons for expanding note area and reducing note area to the user on the UI. If the user clicks the virtual button for expanding the note area, the note area may be expanded through up/down slides on the screen. As such, the content related to the note is increased. If the user clicks the virtual button for reducing the note area, the note area may be reduced through up/down slides on the screen. As such, the content related to the note is reduced.

Figure 22E:
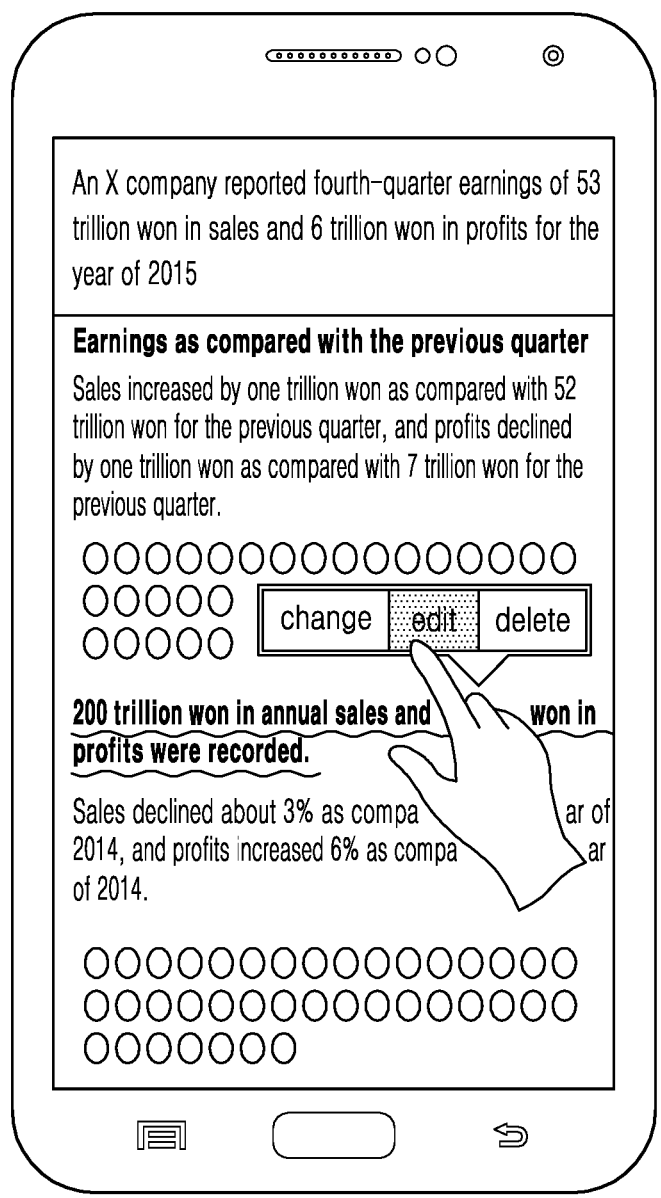
FIG. 22E is a schematic diagram in which a virtual button is provided for editing the note on the UI according to the sixth embodiment of the present disclosure.
Figure 22F:
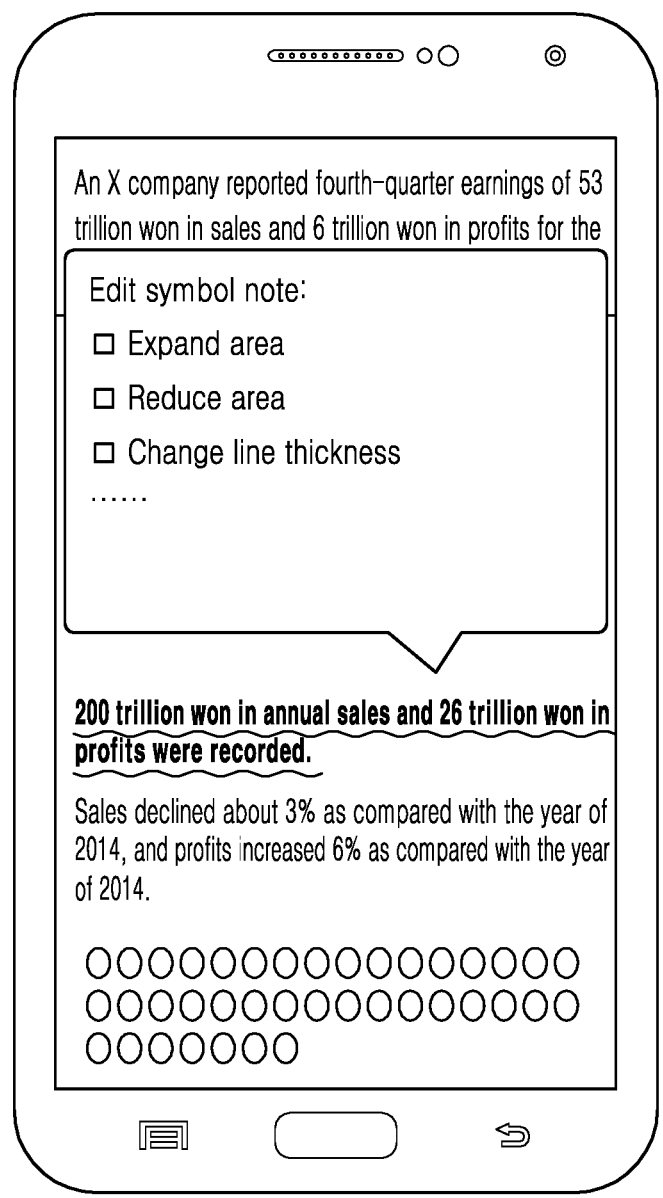
FIG. 22F is a schematic diagram in which virtual buttons for expanding a note area and reducing the note area are provided on the UI according to the sixth embodiment of the present disclosure.
Figure 22G:
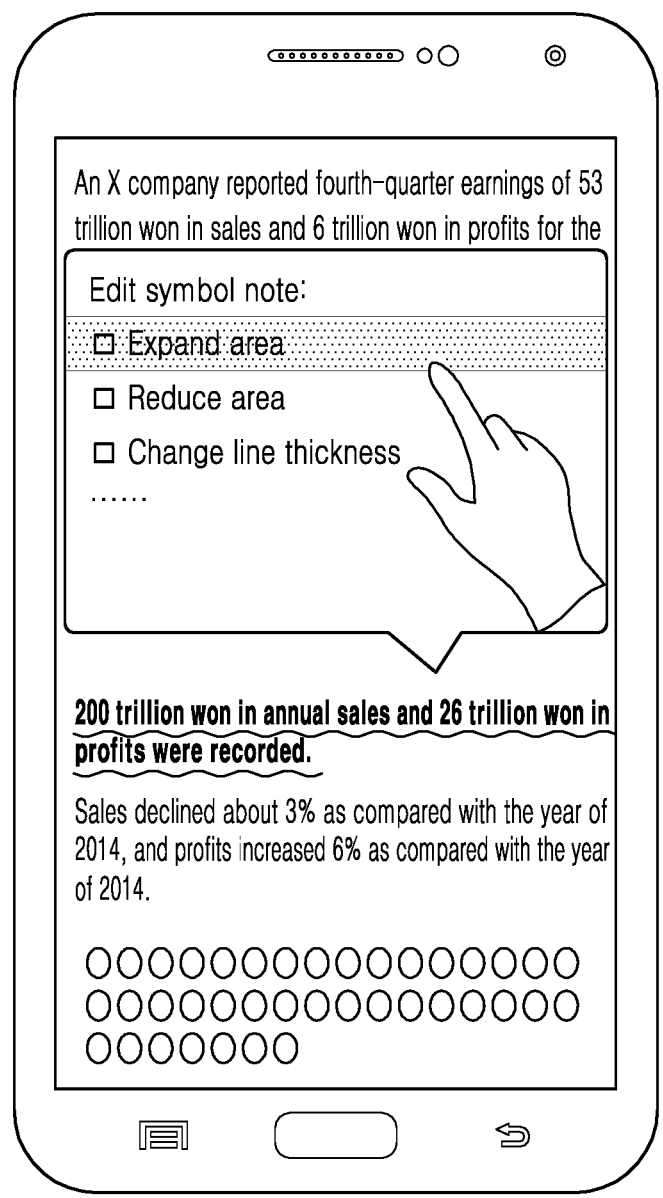
FIGS. 22G and 22I are schematic diagrams in which the user clicks the virtual buttons for expanding and reducing the note area according to the sixth embodiment of the present disclosure.
Figure 22H:
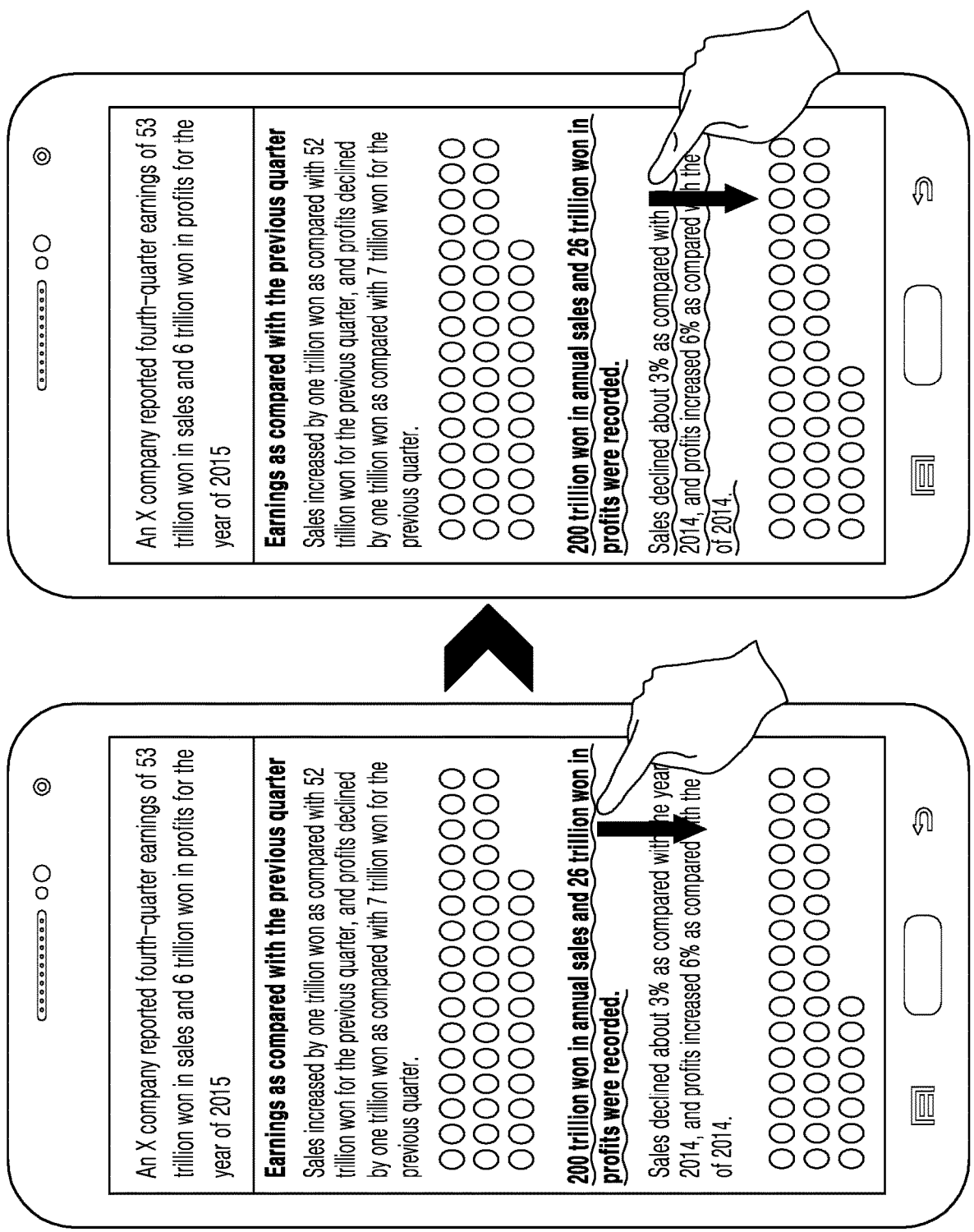
FIGS. 22H and 22J are schematic diagrams in which the user expands or reduces the note area through sliding-up or sliding-down operation on the screen according to the sixth embodiment of the present disclosure.
Figure 22I:
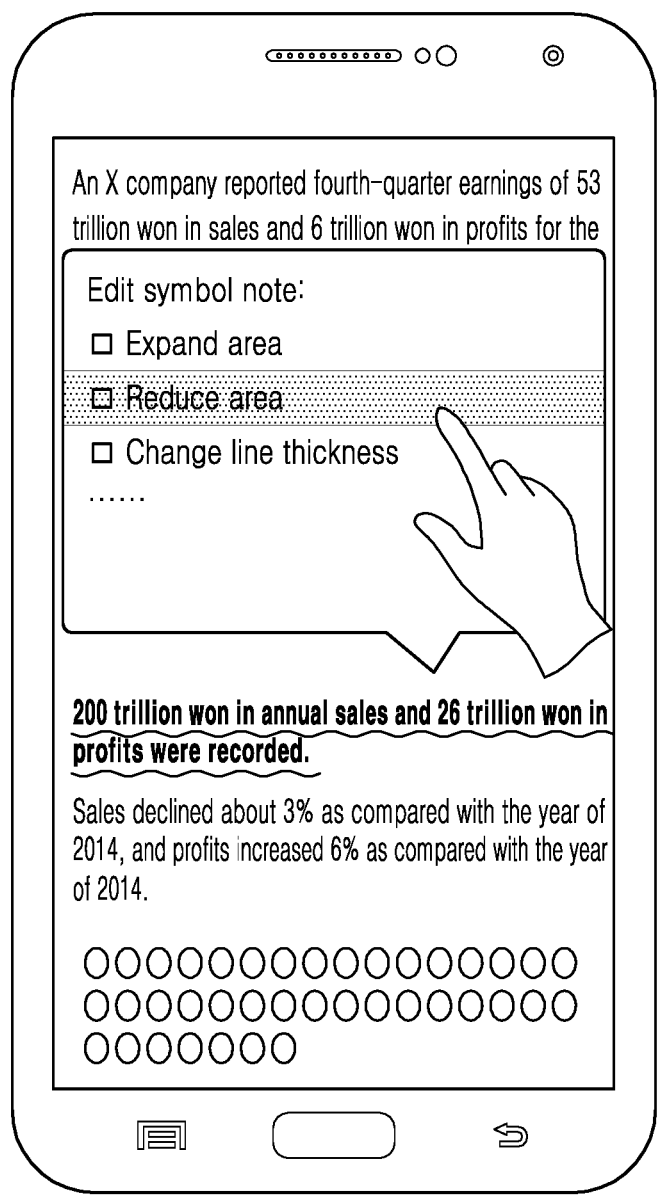
Figure 22J:
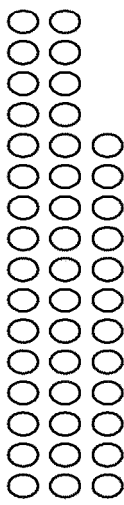
Figure 22J:
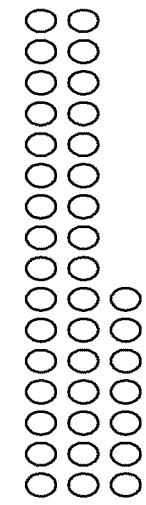
Figure 22J:
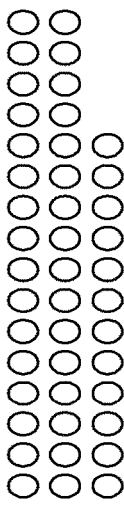
Figure 22J:
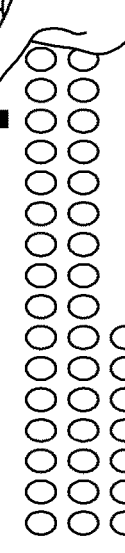

As shown in FIG. 22E, after the user selects the note information of which the note type is to be adjusted, the terminal device provides a virtual button for editing note for the user on the UI. As shown in FIG. 22F, the terminal device provides virtual buttons for expanding or reducing note area for the user on the UI. As shown in FIG. 22G, the user clicks the virtual button for expanding the note area. As shown in FIG. 22H, the user expands the note area through upward/downward slides on the screen. As shown in FIG. 22I, the user clicks the virtual button for reducing the note area. As shown in FIG. 22J, the user reduces the note area through upward/downward slides on the screen.

In addition, if the note written by the user includes handwritten characters, the terminal device may recognize the handwritten characters from the note information, converts the handwritten characters into printed characters and displays the printed characters.

The user may configure the typeface and font size of the characters after conversion. The terminal device may also determine the typeface and font size of the characters after conversion according to the typeface and font size of the characters in the content of the displayed image.

The terminal device may provide a virtual button for converting the format of the characters on the UI after the user selects to input handwritten characters. If the user confirms to convert the handwritten characters into printed characters, the terminal device converts the handwritten characters into printed characters and displays the converted characters.

Figure 22K:
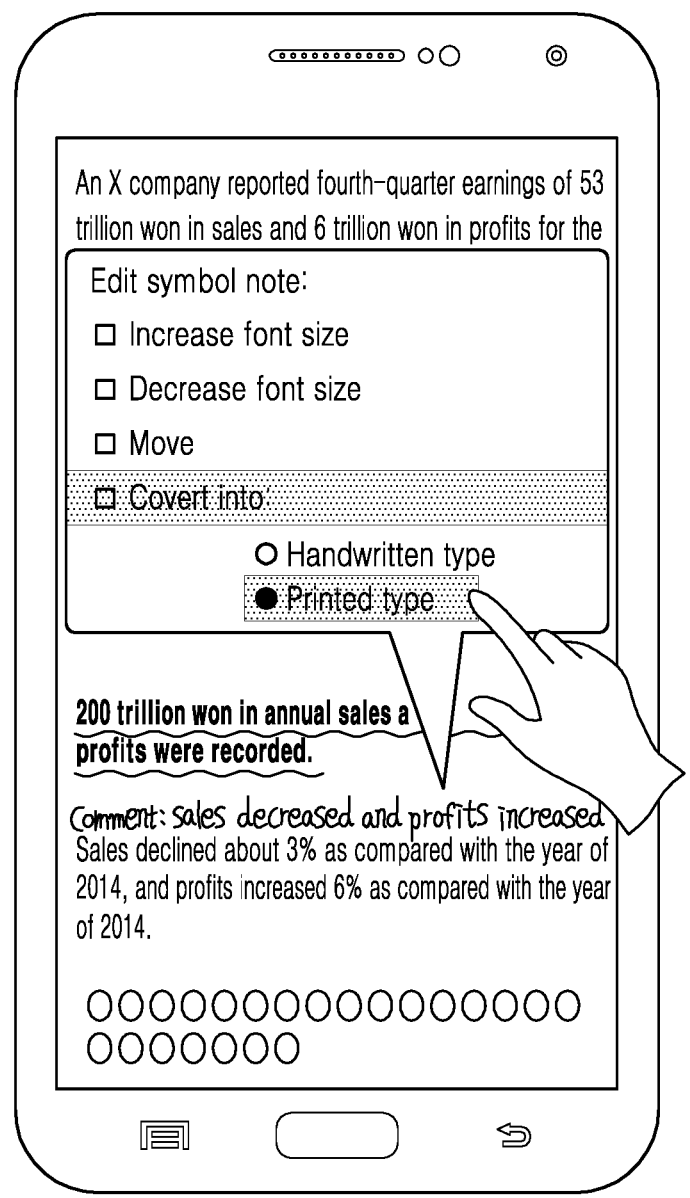
FIG. 22K is a schematic diagram illustrating a virtual button for converting character format on the UI according to the sixth embodiment of the present disclosure.
Figure 22L:
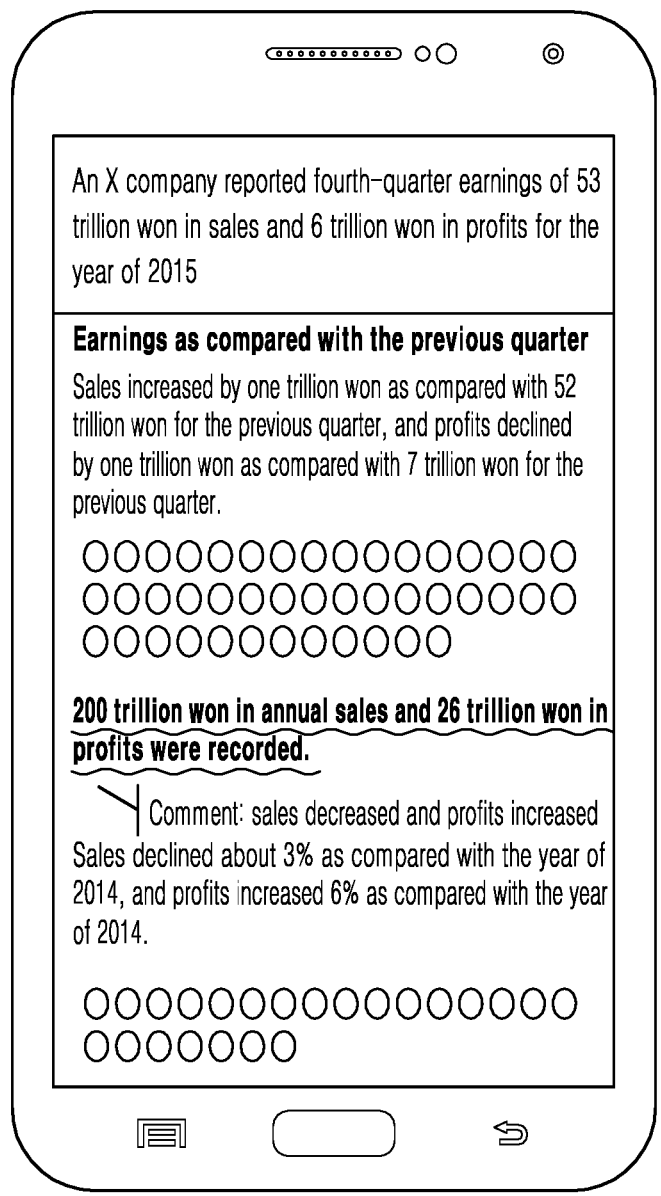
FIG. 22L is a schematic diagram illustrating conversion of the handwritten characters into printed characters according to the sixth embodiment of the present disclosure.

As shown in FIG. 22K, after the user selects to input handwritten characters, the terminal device provides a virtual button for converting character format on the UI. As shown in FIG. 22L, after the user clicks the virtual button for converting the characters into printed characters, the terminal device converts the handwritten characters into printed characters.

In addition, in the sixth embodiment of the present disclosure, the user may also delete some note information according to a requirement. For example, the user deletes an annotation when viewing the note information. When the user clicks the save button subsequently, the terminal device saves the note information in which the annotation is deleted and the displayed image in association.

In the sixth embodiment of the present disclosure, if detecting that there is apparent deviation in the note written by the user, the terminal device may perform a deviation calibration operation automatically, or ask the user whether to perform a deviation calibration operation and perform the deviation calibration operation to the note information after the user confirms.

In order to detect whether there is apparent deviation in the note, with respect to each trajectory point of the note, the terminal device estimates the position of a next trajectory point and compares the estimated position and the actual position of the next trajectory point. If the distance between the estimated position and the actual position of the next trajectory point exceeds a predefined distance threshold, the next trajectory point is taken as a deviated trajectory point. If a predefined number of consecutive trajectory points are all deviated trajectory points, it is regarded that there is apparent deviation in the note. The terminal device may estimate the position of the next trajectory point according to the estimated position of the trajectory point.

When performing the deviation calibration operation, the terminal device performs the deviation calibration operation to each deviated trajectory point according to the estimated position of the deviated trajectory point. For example, the position of the deviated trajectory point in the displayed image may be adjusted to the estimated position of the deviated trajectory point. Subsequently, after the user clicks the save button, the terminal device saves the relative position between the note information and the content of the displayed image after the deviation calibration.

5. Searching Operation

In the sixth embodiment of the present disclosure, the user may search in the content displayed by the terminal device.

In a first implementation, the user inputs a search term on the UI of the terminal device. The terminal device searches in the content of the displayed image according to the search term inputted by the user. Since the above-mentioned designated information (such as the note information or the content related to the note information) is generally the content that the user is interested in, in the sixth embodiment of the present disclosure, the terminal device may preferably search in the designated information when searching in the content of the displayed image according to the search term. If the terminal device displays the search result according to a searching sequence, the user may firstly see the search result in the designated information. Thus, the searching efficiency and user's experience are improved.

After receiving the searching instruction of the user, the terminal device firstly searches in the whole note information, the note information of the designated type, or the designated note information. For example, after the user inputs a search term, the terminal device firstly searches in the content of the annotation inputted by the user. Thus, the terminal device firstly displays the search result in the content of the annotation.

After receiving the searching instruction, the terminal device firstly searches in content related to the whole note information, or content related to the note information of the designated type, or content related to the designated note information. For example, after the user inputs a search term, the terminal device preferably searches in content marked with underline and wavy line. Thus, the terminal preferably displays the search result in the content marked with underline and wavy line.

The terminal device may also preferably search in the content of the designated area after receiving the searching instruction. The selection of the designated area is similar to the selection of the local area where the user needs to take note in the third embodiment of the present disclosure and is not repeated herein.

The terminal device may preferably search in the content of the designated type after receiving the searching instruction. The content in the designated type may include but is not limited to: content in designated typeface, content in designated format, designated symbol, title, outline, table of contents, content appears with a high frequency, text, graphic, etc.

In a second implementation, the terminal device may determine a search term according to the designated information after receiving a searching instruction transmitted by the user and perform search operation according to the determined search term. Since the above-mentioned designated information (such as the note information or the content related to the note information) is generally content that the user is interested in, the terminal device is able to find the information the user needs more rapidly when searching according to the search term determined according to the designated information, which increases the searching efficiency and improves the user's searching experience.

The terminal device may automatically determine the search term for the user according to the designated information. The terminal device may take the complete content of the designated information as the search term, or retrieve key content from the designated information as the search term.

The terminal device may determine the search term according to the whole note information, the note information in the designated type or the designated note information after receiving the searching instruction. For example, the content of the annotation inputted by the user is "We need to focus on children's mental health". After receiving the searching instruction, the terminal device retrieves the key content "mental health" from the content of the annotation as the search term. Then the terminal device searches according to the search term.

The terminal device may determine the search term according to the content related to all note information, or the content related to the note information of the designated type or the content related to the designated note information after receiving the searching instruction. For example, the user draws a wavy line under "mental health" or under "children's mental health is very important". The terminal device may take the "mental health" as the search term after receiving the searching instruction. Then, the terminal device may search according to the search term.

The terminal device may also determine the search term according to the content in the designated area after receiving the searching instruction. The selection of the designated area is similar to the selection of the local area where the user needs to take note in the third embodiment of the present disclosure and is not repeated herein.

The terminal device may also determine the search term according to the content in the designated type after receiving the searching instruction. The content in the designated type may include but is not limited to: content in designated typeface, content in designated format, designated symbol, title, outline, table of contents, content appears with a high frequency, text, graphic, etc.

In addition, the terminal device may also provide, according to the designated information, candidate search information acting as a reference for the user to input search term, so as to help the user to determine the search term accurately and quickly. Since the above-mentioned designated information (such as the note information or the content related to the note information) is generally content that the user focuses on, when the user inputs search term in the search term inputting box provided on the UI, the terminal device may load the reference search terms determined according to the designated information under the inputting box for the user's selection. If the user selects a search term from the reference search terms, the terminal may directly search according to the search term, which is convenient for the user.

The terminal device may implement real-time matching in the above designated information according to partial content of the search term currently inputted by the user and update the currently displayed reference search terms. As such, when the user inputs a part of the content, the terminal device may obtain the search term that the user wants to input in advance via fast matching.

The terminal device may take the complete content of the designated information as the reference search term or retrieve key content from the designated information as the reference search term.

After determining the search term according to the above designated information, the terminal device searches according to a conventional method or searches in the designated information preferably according to the first implementation.

In a third implementation, after receiving the searching instruction, the terminal device may preferably display the search result related to the designated information in the search result. Since the designated information (such as the note information or the content related to the note information) is generally the information that the user is interested in, the user may see the interested information quickly in the search result without searching across the search result, which improves the user's search experience.

After the search operation, the terminal device may preferably display the search result related to all note information, or related to the note information of a designated type, or related to designated note information. For example, the user inputs an annotation with content "We need to focus on children's mental health". After the search operation, the terminal device preferably displays the search result related to "mental health".

After the search operation, the terminal device may preferably display the search result related to content corresponding to all note information, or content corresponding to the note information of a designated type, or content corresponding to designated note information. For example, if the user draws a wavy line under "mental health" or draws a wavy line under "Children's mental health is very important". After the search operation, the terminal device preferably displays the search result related to "mental health".

After the search operation, the terminal device may preferably display the search result related to content in a designated type. The content in the designated type include but is not limited to: content in a designated typeface, content in a designated format, a designated symbol, title, outline, table of contents, content appears with a relatively high frequency, text or graphic.

The terminal device may perform the search operation according to a conventional search method, or according to the above first implementation method, or according to the above second implementation method.

When performing the search operation, the terminal device may search in the data stored in a cloud end, or search in the content stored in the terminal device, or search in the content in the image and the note information currently displayed by the terminal device.

In addition, for facilitating the reading of the user, the terminal device may further highlight the search result, e.g., display with a highlighting color, add a background color, etc.

Figure 23A:
FIG. 23A is schematic diagram illustrating a search result when the search terms are boldface characters according to the sixth embodiment of the present disclosure.
Figure 23B:
FIG. 23B is schematic diagram illustrating the search result according to the sixth embodiment of the present disclosure.

FIG. 23A shows the search result of the terminal device when the search term is characters in boldface. FIG. 23B is a schematic diagram shows the search result of the terminal device when the search term designated by the user is "linux".

6. Background Display.

The terminal device may further display the background of the displayed image when displaying the content of the displayed image.

In one implementation, the terminal device retrieves complete background image from the displayed image and displays the retrieved complete background image as the background image of the displayed image. The terminal device may obtain the complete background image through restoring the background information of the non-character area in the displayed image. The terminal device may also adjust the size of the background image according to the size of the screen. In view of the above, in the method for displaying the background image, if the content of the displayed image is adjusted (e.g., a paragraph of characters is deleted or typeface of the characters is adjusted), the background image is unchanged.

In another implementation, with respect to each character in the displayed image, the terminal device retrieves a corresponding background image and displays the retrieved background image as the background image of the corresponding character. That is to say, the background images corresponding to different characters are different. In view of the above, in this method for displaying background image, if the content of the displayed image is adjusted, the background image is also changed. For example, if a paragraph of characters is deleted, the background image corresponding to the deleted characters is also deleted. For another example, if a paragraph of characters is inserted, the background images corresponding to the inserted characters are fit into the whole background image according to the background images of the surrounding characters.

7. 3D Model Display.

If the shot object being shot by the terminal device in real time is a 3D model displaying page or the static image displayed by the terminal device is an image of a 3D model displaying page, when displaying the image, the terminal device may call and display a 3D model image corresponding to the 3D model displaying page.

A 3D model displaying software may be installed in the terminal device in advance. When the terminal detects that the displayed image includes a 3D model image and the user selects to display the 3D model image, the terminal device calls the 3D model image from the locally stored data or the data stored in a cloud end and displays the 3D model image.

During the real-time shooting, the terminal device adjusts in real time the displaying perspective of the 3D model image according to a shooting angle of the real-time shooting. In particular, at least three identifiers may be configured on the 3D model displaying page. The terminal device may adjust the displaying perspective of the 3D model image in real time according to parameters such as the distance and angle between the camera and each identifier.

8. Thumbnail Display.

In a practical application, the shot object being shot in real time may be a page of a book with a large area, e.g., a page of a magazine, or the image currently displayed by the terminal device may be an image of a page with a large area, the characters in the image are relatively small and are not fit for viewing. Therefore, the user may view a particular local area. At this time, the thumbnail of the local area currently viewed by the user in the global area may be displayed on the screen, such that the user is able to know the position of the local area currently being viewed in the global area.

In addition, during the real-time shooting, if the currently shot area is a local area of the shot object, the terminal device may also display the thumbnail of the currently shot local area in the global area on the screen.

It should be noted that, the method for inputting note information to the image of the shot object provided by the first to sixth embodiments of the present disclosure is applicable for shot objects (books, magazines, etc.) in various languages. Those with ordinary skill in the art would know that, without departing from the principle of the present disclosure, the terminal device may adopt the principle of the present disclosure to execute the above procedures when the shot object is a book or magazine in languages other than Chinese and English, which are also within the protection scope of the present disclosure.

Embodiment 7

Embodiment 7 of the present disclosure provides an apparatus or terminal device for inputting note information to the image of the shot objet.

Figure 24:
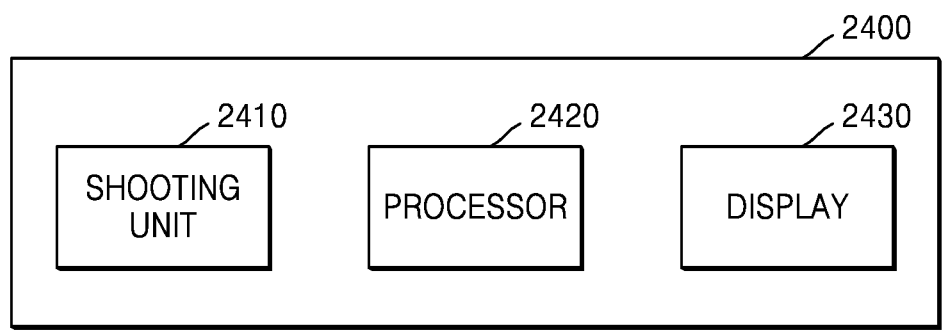
FIG. 24 is a schematic diagram illustrating a structure of an apparatus for inputting note information to the image of the shot object according to a seventh embodiment of the present disclosure.

Referring to FIG. 24, an apparatus for inputting note information to an image of a shot object may include a shooting unit 2410, a processor 2420, and a display 2430. The shooting unit 2410 may shoot an object which is to be shot, and obtain an image of the shot object. The processor 2420 may detect a taking-note operation of a user on the shot object to obtain note information made on the shot object. The taking-note operation of the user on the shot object means an operation of the user of taking note on the shot object or a screen on which the shot object is displayed. The taking-note operation of the user on the shot object includes not only a taking-note operation of the user performed directly on the shot object but also a taking-note operation of the user performed in a space where the shot object exists. The taking-note operation of the user on the screen on which the shot object is displayed includes not only a taking-note operation of the user performed directly on the screen on which the shot object is displayed, but also a taking-note operation of the user performed in a space where the screen on which the shot object is displayed exists. The display 2430 may display an image of the shot object in which the obtained note information has been reflected.

The processor 2420 may obtain the note information made on the shot object by tracing an operation on the shot object or an operation on the screen on which the shot object is displayed.

The operation on the shot object may be a traceable operation or a traceless operation.

If the operation on the shot object is a traceable operation, the processor 2420 is configured to trace a position of a finger top or a nib of a writing utensil and obtain the note information made on the shot object by detecting an operation of the finger top or the nip on the shot object as the taking-note operation of the user or by detecting incremental information between image frames of the shot object as the taking-note operation of the user.

When the processor 2420 determines the note information made on the shot object according to the incremental information of the current image frame, the processor 2420 is adapted to compare a current image frame with a previous image frame, determine the incremental information of the current image frame compared to the previous image frame, combine the incremental information of each image frame to obtain the note information made on the shot object; or, compare the current image frame with an initial image frame, take the incremental information of the current image frame compared to the initial image frame as the note information made on the shot object.

If the operation on the shot object is the traceless operation, the processor 2420 is adapted to trace the position of the hand tip or the nib of the writing utensil, detect the operation of the hand tip or the nib on the writing utensil as the note operation and obtain the note information made on the shot object.

The processor 2420 determines the position of the nib of the writing utensil by: recognizing the nib of the writing utensil from an image shot in real time according to the shape of the writing utensil registered in advance, determining the position of the nib of the writing utensil according to the nib of the recognized writing utensil; or, comparing the image shot in real time and a reference image not containing the writing utensil, recognizing the nib of the writing utensil, and determining the position of the nib of the writing utensil according to the recognized nib of the writing utensil.

The processor 2420 may determine a position of the note information made on the shot object, and may reflect content of the note information in the image of the shot object, based on the determined position of the note information. The display 2430 may display the image of the shot object in which the obtained note information has been reflected.

The processor 2420 is adapted to detect a note position selecting operation on the shot object or the screen, and determine the position of the note information on the shot object according to the note position selecting operation; or, determine the position of the note information on the shot object according to information outputted after voice recognizing to inputted voice.

The processor 2420 is adapted to determine the note type of the note information made on the shot object, and determine the content of the note information on the shot object according to the note type.

The processor 2420 is adapted to determine the note type of the note information made on the shot object via at least one of: user inputted voice, button, gesture, augmented reality human-computer interaction interface, and external controller.

The external controller is a stylus pen.

1. The processor 2420 is adapted to perform character recognition to the image of the shot object shot in real time, determine a relative position of the note information with respect to the content of the shot object according to a character recognizing result, and take the relative position as the position of the note information on the shot object.

2. The processor 2420 is adapted to obtain a global image of the shot object shot in real time, perform character recognition to the global image; perform character recognition to the local image of the shot object shot in real time, determine the position of the local image in the global image and a relative position of the note information with respect to the content of the local image according to the character recognizing results of the local image and the global image; determine the relative position of the note information with respect to the content of the global image according to the position of the local image in the global image and the relative position of the note information with respect to the content of the local image, and take the relative position of the note information in the content of the global image as the position of the note information on the shot object.

If a deviation of the apparatus for inputting the note information to the image of the shot object is detected, the processor 2420 may perform a deviation calibration processing on the note information. If at least one of vibration of the shot object, vibration of the apparatus for inputting the note information to the image of the shot object, and vibration of the writing utensil is detected, the processor 2420 may perform a deviation calibration processing on the note information.

The processor 2420 is adapted to determine the position of the note information on the shot object after the vibration according to the position of the note information on the shot object before the vibration, a vibration direction and a vibration distance; and perform the deviation calibration processing to the note information according to the position of the note information on the shot object after the vibration.

The note information includes: a mark symbol and/or edit information.

The mark symbol includes at least one of: background color, underline, dotted line, wavy line, rectangle, bullet points, brackets, triangle symbol, star, star symbol, number symbol.

The edit information includes at least one of: inserted content, insertion symbol, delete symbol, position adjustment symbol, emphasis symbol, annotation.

The apparatus for inputting note information to the image of the shot object is adapted to adjust the content of the shot object according to the note information after receiving a content adjusting instruction, and display the adjusted content.

According to a content adjusting instruction, the processor 2420 may adjust the content of the image of the shot object, based on the note information. For example, when the note information is edit information indicating deletion, the processor 2420 may adjust the content of the image of the shot object by deleting a content portion corresponding to a portion of the image of the shot object where a deletion symbol is located. The display 2430 may display an image of the shot object including the adjusted content.

The processor 2420 adjusts the content of the shot object by at least one of: deleting content related to the delete symbol from the content of the shot object; inserting content to be inserted in a position indicated by the insertion symbol; adjusting the position of the content related to the position adjustment symbol; and highlighting the content related to the emphasis symbol.

According to a searching instruction, the processor 2420 may search in the content of the image of the shot object, based on designated information. For example, the processor 2420 may search in the designated information after receiving the searching instruction, or determine a search term according to the designated information after receiving the searching instruction and search in the designated information according to the determined search term. The display 2430 may display an image of the shot object on which a search result is shown. For example, the display 2430 may display a search result related to the designated information, in the search result.

The processor 2420 is further adapted to highlight the designated information via at least one of: boldface, increased font size, highlighting color, background color, hiding information other than the designated information.

The designated information includes at least one of: note information, content related to the note information in the content of the shot object; content in a designated area or content in a designated type in the note information or the content of the shot object.

The designated area is determined by: detecting a local area selected in the content of the shot object; adjusting the detected local area according to layout information corresponding to the shot object.

The apparatus for inputting note information to the image of the shot object may further include a 3D displaying unit, adapted to call and display a 3D model image corresponding to a 3D model displaying page if the shot object is the 3D model displaying page.

The 3D displaying unit is further adapted to adjust in real time a displaying perspective of the 3D model image according to a shooting angle of the real time shooting.

The apparatus for inputting note information to the image of the shot object may further include a storage unit, adapted to associatively save the note information with at least one of: the image of the shot object shot in real time, character recognizing result of the image shot in real time, and relative position of the note information with respect to the content of the shot object.

The functions of each unit in the apparatus for inputting note information to the image of the shot object may be seen from the implementations of the method for inputting note information to the image of the shot object.

In view of the above, in the apparatus for inputting the note information to the image of the shot object, according to embodiments of the present disclosure, the shooting unit 2410 may obtain the image of the shot object, the processor 2420 may detect the taking-note operation of the user on the shot object to obtain the note information made on the shot object, and the display 2430 may display the image of the shot object in which the obtained note information has been reflected. As such, the requirement of the user for taking note on the shot object such as books is met. The user is able to take note conveniently even if the book cannot be taken away or it is not allowed to write on the book. The convenience for taking note is improved. In addition, the user may view the note conveniently using the terminal device, which brings great convenience to the user.

Figure 25:
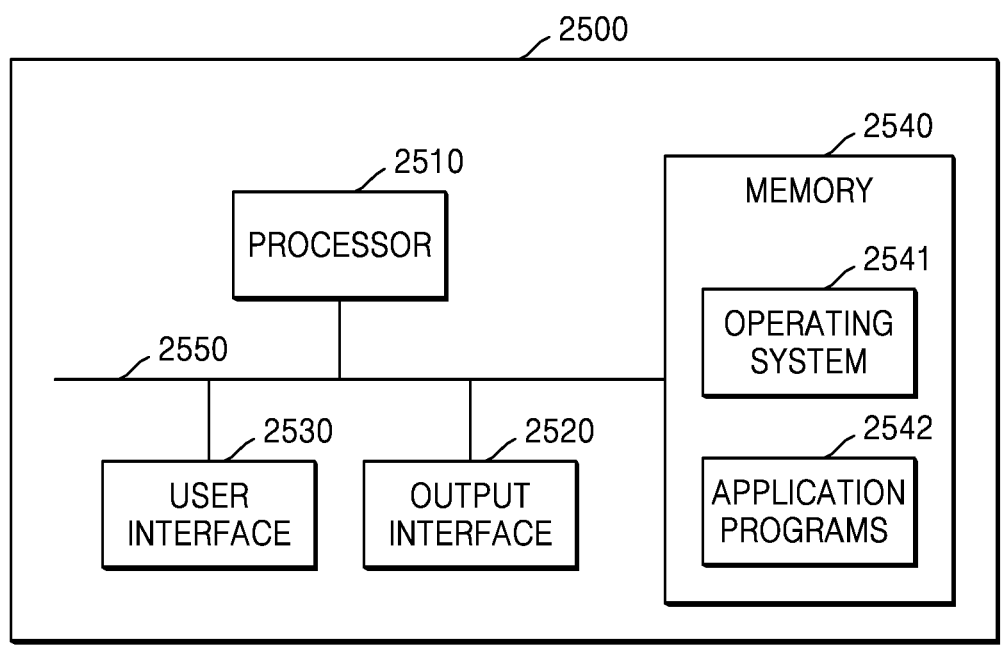
FIG. 25 is a schematic diagram illustrating a structure of a terminal device according to the seventh embodiment of the present disclosure.

FIG. 25 is a schematic diagram illustrating a structure of a terminal device for inputting note information to the image of the shot object according to an embodiment of the present disclosure.

As shown in FIG. 25, the terminal device 2500 includes: at least one processor 2510, such as a Central Processing Unit (CPU), at least one output interface 2520 or other user interface 2530, a memory 2540, at least one communication bus 2550. The communication bus 2550 is used for implementing connections and communications of the above components. Optionally, the terminal device 2500 includes another user interface 2530, a display, keyboard or a clicking device (such as mouse, trackball, touch board or touch screen). The memory 2540 may include a Random Access Memory (RAM), or a non-volatile memory, such as at least one disk memory. The memory 2540 may optionally include at least one storage device remote from processor 2510.

The memory 2540 stores the following elements, executable modules or data structures, or subset of them, or extended set of them:

an operating system 2541, including various system programs, for implementing various basic services and processing hardware-based tasks;

application programs 2542, including various application programs, used for implementing various application services.

The application programs 2542 include but are not limited to:

a note obtaining unit, adapted to shoot note information made on a shot object in real time; and a note associating and displaying unit 2402, adapted to associate and display the shot object and the note information.

The note obtaining unit is adapted to obtain the note information made on the shot object through tracing an operation on the shot object or an operation on a screen.

The operation on the shot object includes a traceable operation or a traceless operation.

If the operation on the shot object is a traceable operation, the note obtaining unit is adapted to trace a position of hand tip or a nib of a writing utensil, detect an operation of the handtip or the nib on the shot object and obtain the note information made on the shot object; or determine the note information made on the shot object according to incremental information of a current image frame.

When the note obtaining unit determines the note information made on the shot object according to the incremental information of the current image frame, the note obtaining unit 2401 is adapted to compare a current image frame with a previous image frame, determine the incremental information of the current image frame compared to the previous image frame, combine the incremental information of each image frame to obtain the note information made on the shot object; or, compare the current image frame with an initial image frame, take the incremental information of the current image frame compared to the initial image frame as the note information made on the shot object.

If the operation on the shot object is the traceless operation, the note obtaining unit is adapted to trace the position of the hand tip or the nib of the writing utensil, detect the operation of the hand tip or the nib on the writing utensil and obtain the note information made on the shot object.

The note obtaining unit determines the position of the nib of the writing utensil by: recognizing the nib of the writing utensil from an image shot in real time according to the shape of the writing utensil registered in advance, determining the position of the nib of the writing utensil according to the nib of the recognized writing utensil; or, comparing the image shot in real time and a reference image not containing the writing utensil, recognizing the nib of the writing utensil, and determining the position of the nib of the writing utensil according to the recognized nib of the writing utensil.

The note obtaining unit includes:

a first position determining sub-unit, adapted to determine the position of the note information on the shot object;

a note content determining sub-unit, adapted to determine the content of the note information made on the shot object; and a note information determining sub-unit, adapted to determine the note information made on the shot object according to the position of the note information on the shot object and the content of the note information.

The first position determining sub-unit is adapted to detect a note position selecting operation on the shot object or the screen, and determine the position of the note information on the shot object according to the note position selecting operation; or, determine the position of the note information on the shot object according to information outputted after voice recognizing to inputted voice.

The note content determining sub-unit is adapted to determine the note type of the note information made on the shot object, and determine the content of the note information on the shot object according to the note type.

The note content determining sub-unit is adapted to determine the note type of the note information made on the shot object via at least one of: user inputted voice, button, gesture, augmented reality human-computer interaction interface, and external controller.

The external controller is a stylus pen.

The note associating and displaying unit includes:

a second position determining sub-unit, adapted to determine the position of the note information on the shot object; and an associating sub-unit, adapted to associate the shot object and the note information according to the position of the note information on the shot object.

The second position determining sub-unit is adapted to perform character recognition to the image of the shot object shot in real time, determine a relative position of the note information with respect to the content of the shot object according to a character recognizing result, and take the relative position as the position of the note information on the shot object.

The second position determining sub-unit is adapted to obtain a global image of the shot object shot in real time, perform character recognition to the global image; perform character recognition to the local image of the shot object shot in real time, determine the position of the local image in the global image and a relative position of the note information with respect to the content of the local image according to the character recognizing results of the local image and the global image; determine the relative position of the note information with respect to the content of the global image according to the position of the local image in the global image and the relative position of the note information with respect to the content of the local image, and take the relative position of the note information in the content of the global image as the position of the note information on the shot object.

The terminal device includes a deviation calibration processing unit, adapted to perform a deviation calibration processing to the note information if a vibration is detected.

The vibration includes at least one of: vibration of the shot object, vibration of the terminal device, and vibration of the writing utensil.

The deviation calibration processing unit is adapted to determine the position of the note information on the shot object after the vibration according to the position of the note information on the shot object before the vibration, a vibration direction and a vibration distance; and perform the deviation calibration processing to the note information according to the position of the note information on the shot object after the vibration.

The note information includes: a mark symbol and/or edit information.

The mark symbol includes at least one of: background color, underline, dotted line, wavy line, rectangle, bullet points, brackets, triangle symbol, star, star symbol, number symbol.

The edit information includes at least one of: inserted content, insertion symbol, delete symbol, position adjustment symbol, emphasis symbol, annotation.

The terminal device further includes a content adjusting unit, adapted to adjust the content of the shot object according to the note information after receiving a content adjusting instruction, and display the adjusted content.

The content adjusting unit adjusts the content of the shot object by at least one of: deleting content related to the delete symbol from the content of the shot object; inserting content to be inserted in a position indicated by the insertion symbol; adjusting the position of the content related to the position adjustment symbol; and highlighting the content related to the emphasis symbol.

The terminal device may further include at least one of:

a first searching unit, adapted to search preferably in designated information after receiving a searching instruction;

a second searching unit, adapted to determine a search term according to designated information after receiving the searching instruction, and search according to the determined search term;

a third searching unit, adapted to display, in the search result, preferably the search result related to the designated information after receiving the searching instruction;

a highlighting unit, adapted to highlight designated information after receiving a highlighting instruction;

a zooming unit, adapted to zoom designated information after receiving a zooming instruction.

The highlighting unit is further adapted to highlight the designated information via at least one of: boldface, increased font size, highlighting color, background color, hiding information other than the designated information.

The designated information includes at least one of: note information, content related to the note information in the content of the shot object; content in a designated area or content in a designated type in the note information or the content of the shot object.

The designated area is determined by: detecting a local area selected in the content of the shot object; adjusting the detected local area according to layout information corresponding to the shot object.

The terminal device may further include a 3D displaying unit, adapted to call and display a 3D model image corresponding to a 3D model displaying page if the shot object is the 3D model displaying page.

The 3D displaying unit is further adapted to adjust in real time a displaying perspective of the 3D model image according to a shooting angle of the real time shooting.

The terminal device may further include a storage unit, adapted to associatively save the note information with at least one of: the image of the shot object shot in real time, character recognizing result of the image shot in real time, and relative position of the note information with respect to the content of the shot object.

The processor 2510 executes corresponding steps through calling programs or instructions stored in the memory 2540.

Embodiment 8

Figure 26:
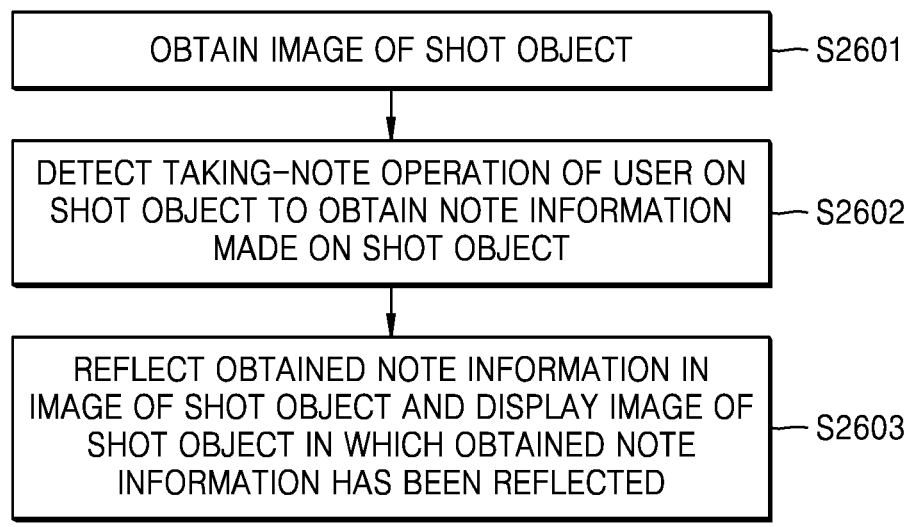
FIG. 26 is a flowchart illustrating a method of inputting note information to an image of a shot object, according to an eighth embodiment of the present disclosure.

As shown in FIG. 26, a method of inputting note information to an image of a shot object, according to Embodiment 8 of the present disclosure, includes blocks S2601 through S2603. Although omitted, descriptions of the apparatus or terminal device for inputting note information to an image of a shot object, according to Embodiment 7, also apply to the method of inputting note information to an image of a shot object, according to Embodiment 8.

In block S2601, the apparatus 2400 for inputting note information to an image of a shot object may obtain an image of a shot object.

In block S2602, the apparatus 2400 for inputting note information to an image of a shot object may detect a taking-note operation of a user on the shot object to obtain note information made on the shot object. The apparatus 2400 for inputting note information to an image of a shot object may detect the taking-note operation of the user on the shot object or a screen on which the shot object is displayed, and determine the note information made on the shot object corresponding to the detected taking-note operation.

The apparatus 2400 for inputting note information to an image of a shot object may trace a position of a finger top or a nib of a writing utensil to detect an operation of the finger top or the nip on the shot object as the taking-note operation of the user. The apparatus 2400 for inputting note information to an image of a shot object may also detect incremental information between image frames of the shot object as the taking-note operation of the user.

In block S2603, the apparatus 2400 for inputting note information to an image of a shot object may reflect the obtained note information in the image of the shot object and display an image of the shot object in which the obtained note information has been reflected. The apparatus 2400 for inputting note information to an image of a shot object may determine a position of the note information made on the shot object, and may reflect content of the note information in the image of the shot object, based on the determined position of the note information. The apparatus 2400 for inputting note information to an image of a shot object may display the image of the shot object in which the note information has been reflected.

The apparatus 2400 for inputting note information to an image of a shot object may obtain a global image and a local image of the shot object, and may perform character recognition on each of the global image and the local image. The apparatus 2400 for inputting note information to an image of a shot object may determine a relative position of the note information with respect to content of the global image as the position of the note information made on the shot object, based on a character recognizing result on each of the global image and the local image.

If at least one of vibration of the shot object, vibration of the apparatus for inputting the note information to the image of the shot object, and vibration of the writing utensil is detected, the apparatus 2400 for inputting the note information to the image of the shot object may further perform a deviation calibration processing on the note information.

The apparatus 2400 for inputting the note information to the image of the shot object may adjust the content of the image of the shot object, based on the note information, according to a content adjusting instruction, and may display an image of the shot object including the adjusted content. The apparatus 2400 for inputting the note information to the image of the shot object may search in the content of the image of the shot object, based on designated information, according to a searching instruction, and may display an image of the shot object on which a search result is shown.

An apparatus according to the present invention may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Computer programs installed in the devices may be selectively activated or reconstructed. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). Of course, embodiments are not limited thereto. The computer readable recording medium can also be distributed over network coupled computer systems so that the computer readable code is stored and executed in a distributive manner. This media can be read by the computer, stored in the memory, and executed by the processor.

One of ordinary skill in the art would understand that, the computer program instructions may be utilized to realize each block and combinations in the block diagrams and/or schematic diagrams and/or flowcharts. One of ordinary skill in the art would know that, the computer program instructions may be provided to general-purpose computers, professional computers, or processors for other programmable data processing methods, so as to realize each block and combinations in the block diagrams and/or schematic diagrams and/or flowcharts of the present disclosure.

Those with ordinary skill in the art would understand that, the computer program instructions may be utilized to realize each block and combinations in the block diagrams and/or schematic diagrams and/or flowcharts. Those with ordinary skill in the art would know that, the computer program instructions may be provided to general purpose computer, professional computer or processor for other programmable data processing methods, so as to realize the solution disclosed by the block diagrams and/or schematic diagrams and/or flowcharts of the present disclosure through the computer or the processor of other programmable data processing methods.

Those with ordinary skill in the art would know that, some alternations, modifications, combinations or deletions may be performed to various operations, methods, steps, actions and solutions in the present disclosure. Furthermore, other steps, actions and solutions which contain various operations, methods and flows described in the present disclosure may also be altered, modified, rearranged, decomposed, combined or deleted. Furthermore, steps, actions or solutions in the related art containing various operations, methods and flows in the present disclosure may also be altered, modified, rearranged, decomposed, combined or deleted.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. An apparatus comprising:
a display; and
a processor configured to:
  detect a note-taking operation that inserts note information, performed by an input of a user, on a first area of an image of a shot object, the note information comprising handwritten characters;
  detect an association operation, performed by another input of the user, that associates the note information with a position for content related to the note information; and
  after the association operation is detected, detect a distance between the first area and the position for the content related to the note information and automatically adjust a display position and a display size of the handwritten characters when the distance between the first area and the position for the content related to the note information is larger than a predefined threshold distance,
  wherein the processor is configured to automatically adjust the display position and the display size of the handwritten characters by:
    identifying a blank area of the image adjacent to the position for the content related to the note information, the blank area being different than the first area;
    identifying, based on a size of the identified blank area, a display size of the handwritten characters of the note information to be displayed in the blank area;
    controlling the display to display an image of the shot object in which the handwritten characters having the identified display size are displayed in the blank area;
    converting the handwritten characters of the note information into printed characters; and
    controlling the display to display an image of the shot object in which the printed characters are displayed in the blank area.

2. The apparatus of claim 1, wherein the processor is further configured to detect the note-taking operation of the user on the image of the shot object or a screen on which the image of the shot object is displayed, and determine the note information made on the shot object corresponding to the detected note-taking operation.

3. The apparatus of claim 1, wherein the processor is further configured to trace a position of a finger tip of the user or a nib of a writing utensil to detect an operation of the finger tip or the nib on the shot object as the note-taking operation.

4. The apparatus of claim 1, wherein the processor is further configured to:
apply an adaptive layout to the image of the shot object, and
when the adaptive layout is applied to the image of the shot object:
  perform character recognition on the image of the shot object; and
  determine a change of a font size or performance of word wrapping of the printed characters based on a result of the character recognition.

5. The apparatus of claim 1, wherein the note information comprises edit information,
wherein the edit information comprises at least one of an insertion symbol, inserted content, a deletion symbol, or a position adjustment symbol, and
wherein content of the image is adjusted according to the edit information.

6. The apparatus of claim 1, wherein, if at least one of a vibration of the shot object, a vibration of the apparatus for inputting the note information to the image of the shot object, or a vibration of a writing utensil is detected, the processor is further configured to perform a deviation calibration processing on the note information.

7. A method comprising:
obtaining an image of a shot object;
detecting a note-taking operation that inserts note information, performed by an input of a user, on a first area of the image of the shot object, the note information comprising handwritten characters;
detecting an association operation, performed by another input of the user, that associates the note information with a position for content related to the note information; and
after the association operation is detected, detecting a distance between the first area and the position for the content related to the note information and automatically adjusting a display position and a display size of the handwritten characters when the distance between the first area and the position for the content related to the note information is larger than a predefined threshold distance,
wherein the automatically adjusting of the display position and the display size of the handwritten characters includes:

identifying a blank area of the image adjacent to the position for the content related to the note information, the blank area being different than the first area;

identifying, based on a size of the identified blank area, a display size of the handwritten characters of the note information to be displayed in the blank area;

displaying an image of the shot object in which the handwritten characters having the identified display size are displayed in the blank area;

converting handwritten characters of the note information into printed characters; and displaying an image of the shot object in which the printed characters are displayed in the blank area.

8. The method of claim 7, wherein the obtaining of the note information comprises:

detecting the note-taking operation of the user on the image of the shot object or a screen on which the image of the shot object is displayed; and determining the note information made on the shot object corresponding to the detected note-taking operation.

9. The method of claim 7, wherein the detecting of the note-taking operation comprises detecting incremental information between image frames of the shot object as the note-taking operation.

10. The method of claim 7, further comprising:

applying an adaptive layout to the image of the shot object, and when the adaptive layout is applied to the image of the shot object:

performing character recognition on the image of the shot object; and determining a change of a font size or performance of word wrapping of the printed characters based on a result of the character recognition.

11. The method of claim 7, wherein the note information comprises edit information, wherein the edit information comprises at least one of an insertion symbol, inserted content, a deletion symbol, or a position adjustment symbol, and wherein content of the image is adjusted according to the edit information.

12. The method of claim 7, further comprising, if at least one of a vibration of the shot object, a vibration of an apparatus for inputting the note information to the image of the shot object, or a vibration of a writing utensil is detected, performing a deviation calibration processing on the note information.

13. A non-transitory computer-readable recording medium having recorded thereon a computer program, which, when executed by a computer, performs the method of claim 7.

* * * * *